(12) United States Patent
Yun et al.

(10) Patent No.: US 10,732,729 B2
(45) Date of Patent: Aug. 4, 2020

(54) TRANSPARENT DISPLAY APPARATUS AND METHOD THEREOF

(71) Applicant: SAMSUNG ELECTRONICS CO., LTD., Suwon-si (KR)

(72) Inventors: Il-kook Yun, Suwon-si (KR); Geun-ho Lee, Seongnam-si (KR); Chang-soo Lee, Seosan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 15/935,448

(22) Filed: Mar. 26, 2018

(65) Prior Publication Data

US 2018/0217678 A1    Aug. 2, 2018

Related U.S. Application Data

(63) Continuation of application No. 13/858,190, filed on Apr. 8, 2013, now Pat. No. 9,958,957.

(30) Foreign Application Priority Data

Apr. 8, 2012    (KR) .......................... 10-2012-0036475

(51) Int. Cl.
*G06F 3/03*    (2006.01)
*G06K 9/00*    (2006.01)
*G06F 3/01*    (2006.01)
*G06F 3/0481*    (2013.01)
(Continued)

(52) U.S. Cl.
CPC ............ *G06F 3/0304* (2013.01); *G06F 3/011* (2013.01); *G06F 3/04815* (2013.01); *G06K 9/00671* (2013.01); *G09G 3/20* (2013.01);
*G09G 3/3208* (2013.01); *G09G 2320/0261* (2013.01); *G09G 2340/0464* (2013.01); *G09G 2340/12* (2013.01);
(Continued)

(58) Field of Classification Search
CPC ... G02B 27/01–0189; G02B 2027/0105–0198; G09G 3/001; G06F 2203/04804; B60K 2370/1529
See application file for complete search history.

(56) References Cited

U.S. PATENT DOCUMENTS 6,919,866 B2    7/2005    Kanevsky et al.
7,361,519 B2    4/2008    Yamazaki et al.
(Continued)

FOREIGN PATENT DOCUMENTS

EP    2 194 468 A1    6/2010
EP    2 431 916 A2    3/2012
(Continued)

OTHER PUBLICATIONS

Communication dated Mar. 29, 2019, issued by the Indian Patent Office in counterpart Indian Application No. 9252/DELNP/2014.
(Continued)

*Primary Examiner* — Gene W Lee
(74) *Attorney, Agent, or Firm* — Sughrue Mion, PLLC

(57) ABSTRACT

A transparent display apparatus and method for displaying information thereon includes sensing a position of an object, sensing a position of a user, determining an area of the transparent display through which the object is viewable by the user, and displaying the information on the transparent display based on the area.

19 Claims, 36 Drawing Sheets

(51) Int. Cl.
*G09G 3/20* (2006.01)
*G09G 3/3208* (2016.01)

(52) U.S. Cl.
CPC ..... *G09G 2340/14* (2013.01); *G09G 2354/00* (2013.01); *G09G 2380/10* (2013.01)

(56) References Cited

U.S. PATENT DOCUMENTS

| | | | | |
|---|---|---|---|---|
| 8,698,771 | B2* | 4/2014 | Lee | G06F 1/1643 345/173 |
| 8,823,741 | B2* | 9/2014 | Lee | G06F 3/011 345/633 |
| 2008/0150964 | A1 | 6/2008 | Cho | |
| 2008/0192027 | A1 | 8/2008 | Morrison | |
| 2009/0122080 | A1 | 5/2009 | Awata | |
| 2009/0138811 | A1 | 5/2009 | Horiuchi et al. | |
| 2009/0295731 | A1 | 12/2009 | Kim et al. | |
| 2010/0053151 | A1 | 3/2010 | Marti | |
| 2010/0146461 | A1 | 6/2010 | Ryu et al. | |
| 2010/0302274 | A1 | 12/2010 | Lee et al. | |
| 2012/0072873 | A1 | 3/2012 | Park et al. | |
| 2012/0102438 | A1* | 4/2012 | Robinson | G06F 3/011 715/863 |
| 2012/0256886 | A1 | 10/2012 | Ryu et al. | |
| 2013/0009863 | A1 | 1/2013 | Noda | |
| 2014/0098088 | A1 | 4/2014 | Ryu | |
| 2014/0204023 | A1 | 7/2014 | Kumar | |

FOREIGN PATENT DOCUMENTS

| | | |
|---|---|---|
| EP | 2 544 071 A2 | 1/2013 |
| EP | 2 757 549 A1 | 7/2014 |
| JP | 2001-117684 A | 4/2001 |
| JP | 2005-258015 A | 9/2005 |
| JP | 2011-118807 A | 6/2011 |
| JP | 2012-3690 A | 1/2012 |
| KR | 10-2011-0136012 A | 12/2011 |
| KR | 10-2012-0029228 A | 3/2012 |
| WO | 02-33688 A2 | 4/2002 |
| WO | 2008012716 A2 | 1/2008 |

OTHER PUBLICATIONS

Communication dated Jul. 9, 2018, issued by the State Intellectual Property Office of P.R. China in counterpart Chinese Application No. 201380019007.1.
Communication dated Nov. 1, 2018, issued by the State Intellectual Property Office of the People's Republic of China in counterpart Chinese Patent Application No. 201380019007.1.
International Search Report dated Jul. 24, 2013, issued by the International Searching Authority in counterpart International Application No. PCT/KR2013/002759.
Written Opinion dated Jul. 24, 2013, issued by the International Searching Authority in counterpart International Application No. PCT/KR2013/002759.
Communication dated Aug. 15, 2014, issued by the Australian Patent Office in counterpart Australian Application No. 2013203007.
Communication dated Dec. 1, 2014 by the Australian Government, IP Australia in related application No. 2013203007.
Communication dated May 5, 2016, issued by the State Intellectual Property Office of P.R. China in counterpart Chinese application No. 201380019007.1
Communication dated Dec. 15, 2016 issued by European Patent Office in counterpart European Patent Application No. 13162683.0.
Communication dated Jan. 12, 2017 issued by Korean Intellectual Property Office in counterpart Korean Application No. 10-2012-0036475.
Communication dated Jan. 11, 2017 issued by the State Intellectual Property Office of P.R. China in counterpart Chinese Application No. 201380019007.1.
Communication dated Dec. 19, 2017, issued by the European Patent Office in counterpart European Patent Application No. 13162683.0.
Communication dated Jan. 3, 2018, issued by the State Intellectual Property Office of the People's Republic of China in counterpart Chinese Patent Application No. 201380019007.1.
Communication dated Jun. 26, 2019, issued by the European Patent Office in counterpart European Application No. 19169668.1.
Communication dated Oct. 11, 2019, issued by the European Patent Office in counterpart European Application No. 19169668.1.

* cited by examiner

FIG. 7

|  | V1 | V2 | .... | Vn | Vn+1 | Vn+2 | Vn+3 | Vn+4 | Vn+5 | Vn+6 | Vn+7 | .... | Vx |
|---|---|---|---|---|---|---|---|---|---|---|---|---|---|
| H1 | 0 | 0 | 0 | 0 | 0 | 0 | 0 | 0 | 0 | 0 | 0 | 0 | 0 |
| H2 | 0 | 0 | 0 | 0 | 0 | 0 | 0 | 0 | 0 | 0 | 0 | 0 | 0 |
| ⋮ | 0 | 0 | 0 | 0 | 0 | 0 | 0 | 0 | 0 | 0 | 0 | 0 | 0 |
| Hm | 0 | 0 | 0 | 0 | 0 | 0 | 0 | 0 | 0 | 0 | 0 | 0 | 0 |
| Hm+1 | 0 | 0 | 0 | 0 | 0 | 0 | 0 | 0 | 1 | 1 | 0 | 0 | 0 |
| Hm+2 | 0 | 0 | 0 | 0 | 0 | 0 | 0 | 0 | 3 | 3 | 3 | 2 | 0 | 0 | 0 | 0 |
| Hm+3 | 0 | 0 | 0 | 0 | 0 | 0 | 0 | 1 | 3 | 3 | 3 | 2 | 0 | 0 | 0 | 0 |
| Hm+4 | 0 | 0 | 0 | 0 | 0 | 0 | 0 | 1 | 3 | 3 | 3 | 2 | 0 | 0 | 0 | 0 |
| Hm+5 | 0 | 0 | 0 | 0 | 0 | 0 | 0 | 1 | 3 | 3 | 3 | 2 | 0 | 0 | 0 | 0 |
| Hm+6 | 0 | 0 | 0 | 0 | 0 | 0 | 0 | 0 | 1 | 1 | 0 | 0 | 0 |
| Hm+7 | 0 | 0 | 0 | 0 | 0 | 0 | 0 | 0 | 1 | 1 | 0 | 0 | 0 |
| ⋮ | 0 | 0 | 0 | 0 | 0 | 0 | 0 | 0 | 1 | 1 | 0 | 0 | 0 |
|  | 0 | 0 | 0 | 0 | 0 | 0 | 0 | 0 | 0 | 0 | 0 | 0 | 0 |
| Hy | 0 | 0 | 0 | 0 | 0 | 0 | 0 | 0 | 0 | 0 | 0 | 0 | 0 |

~700

TRANSPARENT DISPLAY APPARATUS AND METHOD THEREOF

CROSS-REFERENCE TO RELATED APPLICATIONS

This application is a continuation Application of U.S. application Ser. No. 13/858,190 filed on Apr. 8, 2013, in the U.S. Patent and Trademark Office, which claims priority from Korean Patent Application No. 10-2012-0036475, filed on Apr. 8, 2012, in the Korean Intellectual Property Office, the disclosures of which are incorporated herein by reference in their entireties.

BACKGROUND OF THE INVENTION

Background

1. Field

Apparatuses and methods consistent with exemplary embodiments relate to a transparent display apparatus and a display method thereof, and more particularly, to a transparent display apparatus that displays an object on the transparent display in consideration of a user's ability to discern objects displayed on the transparent display on respective regions of the transparent display in view of objects behind the transparent display, and a display method thereof.

2. Description of the Related Art

Advancement in the electronic technology has introduced use of a variety of display apparatuses in many fields, and increasing numbers of studies and discussions are focused on the next-generation display apparatuses, such as a transparent display apparatus.

A transparent display apparatus refers to an apparatus having a transparency property that permits a user to see through the back of the transparent display apparatus. Conventionally, a non-transparent semiconductor compound, such as silicon (Si) or gallium ascenide (GaAs), was used to fabricate a display panel. However, as various application areas have been explored to expand the abilities of existing display panels, efforts continue to develop new forms of electronic devices. The transparent display apparatus is one of the outcomes obtained by these efforts.

A transparent display apparatus generally includes a transparent oxide semiconductor layer to confer the transparent property to the transparent display apparatus. A user of the transparent display apparatus is thus enabled to see desired information on the screen of the transparent display apparatus, while also viewing objects behind the transparent display apparatus through the back of the transparent display apparatus. That is, spatial and temporal limitations of the related art display apparatuses are removed.

A transparent display apparatus can be conveniently used in various environments. For example, in show window of a shop, an advertisement may be displayed on the show window as a prospective customer passes by the show window, thereby attracting the user's interest. Alternatively, a transparent display apparatus may be installed on a window of a house, which allows a user to watch multimedia content on the home window, while still enabling the user to view outside the house.

While the transparent property gives many improved advantages compared to the related art display apparatuses, the transparent display apparatus also has drawbacks due to its transparent property. For example, about poor visibility of the information displayed on the transparent display apparatus may be due to transparency of the screen and interference by other objects viewable through the transparent display.

Accordingly, a technology is necessary, which enables use of a transparent display apparatus for move easily viewing the information displayed thereon.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

According to an aspect of an exemplary embodiment there is provided a transparent display apparatus including a transparent display, at least one sensor which senses a position of an object and a position of a user, and a controller which determines an area of the transparent display through which the object is viewable by the user, based on the position of the object and the position of the user, and controls the transparent display to display information on the transparent display based on the area.

The position of the object may be a position relative to a position of the transparent display apparatus and the position of the user may be a position relative to the position of the transparent display apparatus.

The at least sensor may include at least one camera that photographs the object and the user and senses the position of the object based on a photograph of the object and senses the position of the user based on a photograph of the user.

The controller may determine a line of sight between the user and the object and may determine the area based on the line of sight.

The controller may determine the area based on the line of sight.

The controller may control the transparent display to display the information on another area of the transparent display that does not overlap with the area.

The controller may control the transparent display to display the information in a first color that is different from a second color of the object.

The controller may control the transparent display to display the information at a first position on the transparent display, determine that the first position overlaps with the area in response to the at least one sensor sensing at least one of the position of the object and the position of the user, and determine a second position that does not overlap the area in response to determining the first position overlaps with the area.

The controller may control the transparent display apparatus to display the information at the second position.

The transparent display apparatus may be interposed between the object and the user.

The controller may control the transparent display to display the information at a first position on the transparent display, determine that the first position overlaps with the area in response to the at least one sensor sensing at least one of the position of the object and the position of the user, and adjust an attribute of the information.

The attribute may be color, and the controller may control the transparent display to display the information in a first color that is different from a second color of the object.

The attribute may be at least one of size, color, font, opacity, thickness, and a background color.

The at least one sensor may include a first photographing unit which captures a photograph of the object, a first detector which senses an edge using image pixel information of the photograph, and a second detector which identifies the object in the photograph using the sensed edge and senses the position of the identified object and an identifying area at which the object is identified.

The controller may estimate the area using a size and a position of the sensed identifying area.

The controller may estimate a virtual area of virtual segment areas into which the transparent display is divided occupied by the identifying area to be the area.

The virtual segment areas may be mapped into a matrix table and the controller may adjust the position of the information according to a correlation of cells of the matrix table, between cells mapped to the area and cells mapped to the information.

The controller may change attributes of the information, while adjusting a position of the information and the attributes may be at least one of size, opacity, color, thickness, font, and background color.

The transparent display apparatus may further include a memory which stores the matrix table, and the controller may adjust the position of the information, to omit overlapping of cells matching the position of the object sensed by the first sensor.

The first photographing unit may include a plurality of first photographing units, and the controller may selectively drive a photographing unit among the plurality of first photographing units which corresponds to the position of the user sensed by the second sensor to perform photographing.

The first photographing unit may be rotatable according to the position of the user.

The at least one sensor may further include a second photographing unit which captures a photograph of the user, and a user position detector which senses a position of the user using the photograph, and the controller may estimate a field of vision of the user using the position of the user, and display the information within the field of vision.

The controller may determine a distance of the user to the transparent display apparatus based on the position of the user, and display the information based on the area and the distance.

The controller may display a user interface (UI) at an area corresponding to the position of the user.

According to an aspect of another exemplary embodiment, there is provided a method of displaying information on a transparent display, including sensing a position of an object, sensing a position of a user, determining an area of the transparent display through which the object is viewable by the user, and displaying the information on the transparent display based on the area.

According to an aspect of another exemplary embodiment, there is provided a non-transitory computer-readable medium having recorded thereon a program that causes a computer to execute a method of displaying information on a transparent display, the method including sensing a position of an object, sensing a position of a user, determining an area of the transparent display through which the object is viewable by the user, and displaying the information on the transparent display based on the area Accordingly, in various embodiments, visibility of an object displayed on a transparent display apparatus is improved.

BRIEF DESCRIPTION OF THE DRAWINGS

The above and other aspects will be more apparent by describing certain exemplary embodiments with reference to the accompanying drawings, in which:

FIG. 7 is a view provided to explain a method for recording area with deteriorating visibility, using a matrix table mapped to the transparent display of FIG. 6;

DETAILED DESCRIPTION OF EXEMPLARY EMBODIMENTS

Figure 1:
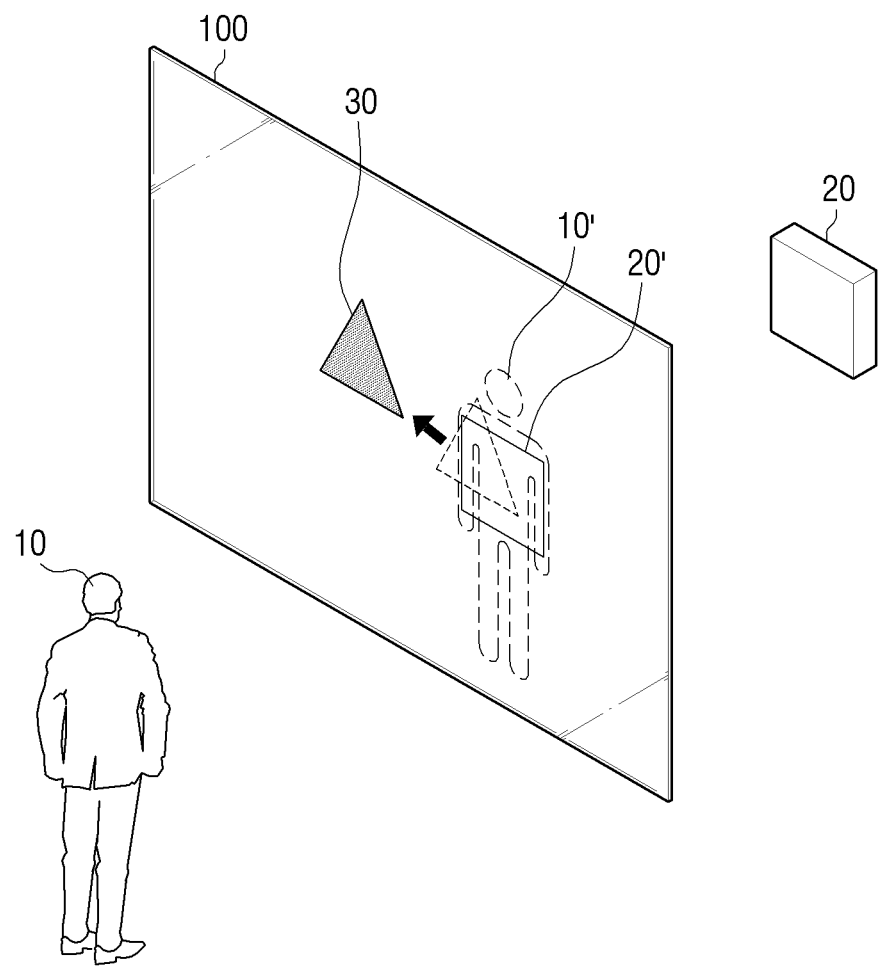
FIG. 1 illustrates an operation of a transparent display apparatus according to an exemplary embodiment.

Exemplary embodiments will now be described in greater detail with reference to the accompanying drawings.

In the following description, the same drawing reference numerals are used for the same elements in different drawings. The matters defined in the description, such as detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail since they would obscure the description with unnecessary detail.

FIG. 1 illustrates a transparent display apparatus according to an exemplary embodiment.

Referring to FIG. 1, the transparent display apparatus 100 may include a transparent display screen that allows a user to see through the back of the transparent display apparatus 100. As discussed above, a drawback of the transparent display apparatus 100 is that information displayed on the transparent display apparatus 100 may overlap or interfere with the background that is visible through the transparent display apparatus 100, resulting in deteriorated visibility of the displayed information.

Referring to FIG. 1, if an object 20 is positioned with respect to a first direction of the transparent display apparatus 100, and a user 10 is positioned with respect to a second direction of transparent display apparatus 100, the user 10 is able to view the object 20 through the transparent display apparatus 100. For convenience of explanation, the first and second directions with respect to the transparent display apparatus 100 will be referred to as a front and rear directions, so that the second direction at which the user is positioned will be referred to as a front direction facing a front of the transparent display apparatus 100, while the first direction opposite to the user will be referred to as the rear direction facing a rear of the transparent display apparatus 100. The directions are not limited to front and rear directions, as the user and objects may be positioned with respect to any direction from the transparent display apparatus 100, such as with respect to a top, bottom, or sides of the transparent display apparatus 100.

The transparent display apparatus 100 may determine the position of the object 20 relative to the transparent display apparatus 100 and the position of the user 10 relative to the transparent display apparatus 100 and then determine attributes of the information to be displayed on the transparent display apparatus 100 based on the determined positions. The attributes of the information may be position, color, or size of the information. The transparent display apparatus 100 may then display the information according to the result of evaluation, for example setting a position, color, or size of the information displayed on the transparent display apparatus 100 to account for interference due to the presence of the object 20.

A method for implementing a transparent display apparatus 100 and a structure of a transparent display apparatus 100 will be explained in greater detail below with reference to the accompanying drawings.

As used herein, the 'object' 20 may be any one or more of various objects including purchasable goods, animals, plants, furniture, walls, or wallpaper, etc.

The transparent display apparatus 100 may display the information 30 accounting for the object 20 being viewable through the transparent display apparatus 100. As used herein, the 'information' 30 displayed on the transparent display apparatus 100 may refer to images, text, graphics, a screen on which content is reproduced, a screen on which an application is executed, a web browser screen, or other various graphic objects displayable on the transparent display apparatus 100.

The transparent display apparatus 100 may detect the positions of the user 10 and the object 20, respectively, and estimate an area of the transparent display through which the object 20 is viewed by the user. That is, the transparent display apparatus 100 may determine a line of sight from the user through the transparent display apparatus to the object 20, and determine the area of the transparent display apparatus 100 through which the user perceives the object 20 based on the line of sight. For convenience of explanation, the area through which the object is seen will be simply referred to as an 'transmissive area'. If the information is displayed on the transmissive area, visibility of the information 30 displayed on the transparent display apparatus 100 deteriorates due to the presence of the object that is also viewed through the transparent display apparatus. Accordingly, the transmissive area may also be referred to as an 'area of deteriorated visibility'.

The transparent display apparatus 100 may segment the entire area of the transparent display apparatus 100 into virtual segment areas of preset sizes to estimate the transmissive area. Using the divided virtual segment areas, the transparent display apparatus 100 may estimate the transmissive area based on the position of the user 10 and the position of the object 20.

In one example, the transparent display apparatus 100 may estimate the transmissive area, by considering a correlation between a mapping area 10' that maps the position and shape of the user 10 to the display surface, and a mapping area 20' that maps the position and shape of the object 20 to the display surface. For example, an overlapping area 10'∩20' of the two mapping areas may be estimated to be the transmissive area.

The transparent display apparatus 100 may map the virtual segment areas into a matrix table to calculate the respective mapping areas 10' and 20' with accuracy. Within the matrix table, the overlapping is determined, considering the correlation between cells mapped to the mapping area 10' of the user and cells mapped to the mapping area 20' of the object 20 to display the information 30. If the two mapping areas 10' and 20' overlap, the transmissive area may be determined, and the transparent display apparatus 100 may adjust a location at which the information 30 is displayed to account for the transmissive area.

That is, if the transmissive area is estimated, the transparent display apparatus 100 may move the information 30 displayed on the transmissive area to another area to avoid degraded visibility, and display the information 30 at the different position. The method of moving the information 30 may be determined in consideration of the degree of overlapping between the transmissive area and the information 30, the position of the overlapping area on the transparent display apparatus 100, or the position of another area of the transparent display apparatus 100 at which visibility of the information 30 may be ensured.

The transparent display apparatus 100 may adjust various display attributes of the information 30, including size, color, thickness or font, together with, or separately from the position of the information 30.

In an exemplary embodiment, the transparent display apparatus 100 may compare a characteristic of the object 20 with the display attributes of the information. For example, the transparent display apparatus 100 may determine a size of the transmissive area overlapping the displayed information 30, a color of the object 20 overlapping the displayed information 30, a distance between the object 20 and the transparent display apparatus 100, or a distance between the user 10 and the transparent display apparatus 100, and change the display attributes of the information 30 according to the result of determination.

In other words, if the color of the object 20 in the in the transmissive area is similar to the color of the displayed information 30, the color of the information 30 may be changed and the information may be displayed having the changed color to distinguish the information 30 from the object 20 and improve visibility of the information 30. Further, if the user is farther away from the transparent display apparatus 100, the size of the displayed information may be enlarged, while the size may be reduced if the user is closer to the transparent display apparatus 100. If the size of the transmissive area is relatively wide, since the distance the position to display the information is lengthened, the layout of the information may be changed to conform to a form that suits the lengthened direction. If the object 20 is far away, an enlarged image of the object 20 may be provided as the information 30.

Adjusting the displayed information 30 may be automatically performed. For example, the transparent display apparatus 100 may determine the position of the object 20 and the position of the user 10 to detect the transmissive area and change the position of the displayed information 30 according to the transmissive area. However, the dynamic display of the information 30 may be set according to additional conditions, for example if the user turns on the function to automatically execute adaptive display of the information 30. Alternatively, the condition may be a period of time in which the position of displayed information 30 is included within the transmissive area, and the information 30 may be adjusted if the position of the information 30 is within the transmissive area for more than a preset time.

Figure 2:
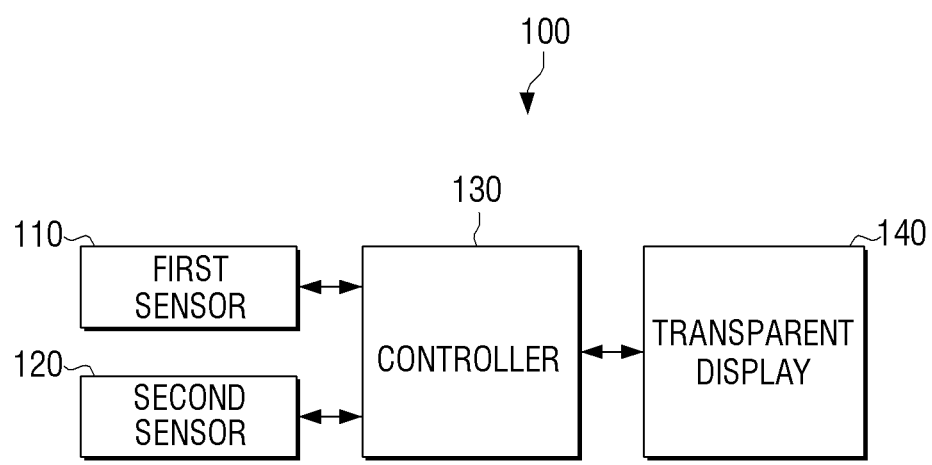
FIG. 2 is a block diagram of a transparent display apparatus according to an exemplary embodiment.

FIG. 2 is a block diagram of a transparent display apparatus according to an exemplary embodiment.

Referring to FIG. 2, the transparent display apparatus 100 may include a first sensor 110, a second sensor 120, a controller 130, and a transparent display 140.

The first sensor 110 may detect the position of an object relative to the transparent display apparatus 100. The second sensor 120 may detect the position of the user relative to the transparent display apparatus 100. The controller 130 may display the information on the transparent display 140 in consideration of the sensed positions of the object and the user.

The first and second sensors 110, 120 may detect the positions of the object and the user in various manners. For convenience of description, the first and second sensors 110, 120 are separately described, but a single sensor may detect the positions of the object and the user. Hereinbelow, the method for sensing at the first and second sensors 110, 120 according to various embodiments will be explained.

In one exemplary embodiment, the first sensor 110 may photograph a background image using a photographing device, such as a camera, analyze the photographed background image, and detect a distance to the object or the position of the object. This will be explained in detail below with reference to FIG. 5.

In another exemplary embodiment, the first sensor 110 may detect the intensities of the light received from a particular direction, such as light received at the front of the transparent display apparatus 100, using an optical sensor, and detect the position of the object by analyzing the distribution of the intensities of the light.

The optical sensor may be implemented as a photo diode, a photo transistor, or a charge coupled device (CCD), etc., and may be distributed evenly over the entire area of the transparent display 140. The respective optical sensors may calculate the intensities of incoming light from all directions. Generally, if the object 20 and the background on which the object 20 is placed are differently colored, the intensity of the light reflected from the object 20 and that of the light reflected from the background differ. Accordingly, the position of the object 20 may be determined by sensing the intensities of the reflective lights passing through the transparent display 140 and determining the position of the object 20 based on the intensities.

In another exemplary embodiment, the user may determine the position of the object and input the position to the transparent display apparatus 100. In such a case, the first sensor 110 may be implemented as an input means, such as a touch screen, a keyboard, a mouse, a joystick, a touchpad, or buttons etc.

The entire area of the transparent display 140 may be segmented into a plurality of areas (e.g., 9 areas). If the user selects one or more of the areas, the selected areas may be directly determined as a display area corresponding to the transmissive area. Accordingly, information may be displayed on areas other than the transmissive area selected by the user.

In yet another exemplary embodiment, the first sensor 110 may be implemented as a short-range wireless communication module. The short-range wireless communication module may refer to a module including a short-range wireless communication tag, or a short-range wireless communication reader, or both. The short-range wireless communication reader operates to read the information written on the short-range wireless communication tag according to short-range wireless communication, when within communication range with an external object to which the short-range wireless communication tag is attached. This may be referred to as 'tagging', in which the short-range wireless communication tag and the short-range wireless communication reader are within communication range of each other. One example of the short-range wireless communication may be near field communication (NFC). NFC is a contactless wireless communication method in which devices communicate over a short distance, which utilizes 13.56 Mz frequency band. With the NFC technique, it is possible to transmit and receive data when a plurality of terminals approach each other within a predetermined distance, such as approximately 10 cm.

In one exemplary embodiment, if the object to which a NFC tag is attached is tagged with the first sensor 110, the first sensor 110 may receive information about the position the object from the NFC tag, and determine the position of the object based on the data received from the NFC tag.

In another exemplary embodiment, the first sensor 110 may be an integrated photographing unit and NFC module. In this case, as an object with the NFC tag attached thereto is tagged, and attribute information including shape or color of the object recorded in the NFC tag may be received. The actual position of the object may then be determined by sensing an area that corresponds to the attribute information, from among the images captured by the photographing unit.

As explained above, in various exemplary embodiments, the first sensor 110 may detect the position of the object. However, the first sensor 110 may sense information other than the position of the object, such as color of the object, text written on the object, or an image printed on or attached to the object. For example, to sense color, an edge may be sensed based on the image photographed with the camera, and the color of the interior of the sensed edge may be sensed. Alternatively, the color information of the intended object may be provided via the NFC tag. Text or image data may also be sensed by reading the image captured through the camera, by an image reading algorithm, or by short-range wireless communication. When color, text, or images are sensed, the transparent display apparatus 100 may determine the type of the object and display corresponding information. Although the first sensor 110 may detect the position of the object, the position of the object may be input and set in the transparent display apparatus, and therefore the position of the object may be known and the first sensor 110 may be omitted.

The second sensor 120 may detect the position of the user, for example the position of the user in front of the transparent display apparatus 100.

Like the first sensor 110, the second sensor 120 may also use a photographing device or an optical sensor to detect the position of the user.

In another exemplary embodiment, the second sensor 120 may be implemented as a plurality of short-range wireless communication modules located in different positions. The position of the user may be determined to be a position a sensor when the user employs NFC tagging with the sensor.

The second sensor 120 may include a plurality of short-range wireless communication modules and sense the transmissive area based on an area of the transparent display where the tagged module is installed. To be specific, if the transparent display apparatus 100 is implemented as a large-scale show window, a plurality of short-range wireless communication modules may be installed at predetermined intervals on the outer surface of the show window or around the show window.

A passer-by may stop at a position where the passer-by sees the goods in which the passer-by is interested and tag a user terminal device with respect to the short-range wireless communication module in the proximity. The 'user terminal device' as used herein may be a mobile phone, a PDA, a tablet PC, or a MP3 player equipped with short-range wireless communication module. Alternatively, the user may tag a short-range wireless communication module with a name card or credit care in which the short-range wireless communication tag is equipped. If the user performs the tagging, the second sensor 120 determines that there is a user at a position of the tagged short-range wireless communication module, and estimates a transmissive area by considering the position of the object behind the show room window and the position of the user.

Alternatively, the second sensor 120 may include a plurality of sensors arranged on a floor in a direction with respect to the transparent display 140. The sensors may be optical sensor, pressure sensors, or motion recognition sensors. Accordingly, as the user stands at a predetermined point, the sensor arranged at that point senses the user's presence. The second sensor 120 may determine the position of the sensor sensed that senses the user's presence as the position of the user.

As explained above, the manner of sensing the positions of the object and the user at the first and second sensors 110, 120 may vary Based on the positions of the object 20 and the user 10 sensed at the first and second sensors 110, 120, respectively, the controller 130 may estimate the transmissive area, i.e., estimate the area on the transparent display 140 where the object 20 is seen when the user 10 looks at the transparent display 140.

The controller 130 may then determine if the transparent display 140 displays the information 30 within the transmissive area, and determine to move the position of displaying the information to another area. As discussed above, the controller 130 may adjust other properties of the information 30, such as color or size, instead of changing position.

The transparent display 140 may display the information 30 in a state that the user's perception of the object 20 through the transparent display 140 is not obscured by the information 30. As explained above, the information may be implemented in various manners. If the information 30 and the transmissive area overlap, the transparent display 140 may move the information 30 to a position determined by the controller 130 that does not overlap with the transmissive area. Accordingly, since the information 30 is adjusted, the user may more easily distinguish the information 30 from the object, and therefore, the visibility of the information 30 increases.

The transparent display 140 may be implemented as a transparent liquid crystal display (LCD) type, a thin-film electroluminescent panel (TFEL) type, a transparent OLED type, a projection type or many others. Hereinbelow, the structure of the transparent display 140 according to various embodiments will be explained.

The 'transparent LCD' refers to a transparent display apparatus implemented by removing a backlight unit from a currently-available LCD apparatus, and using a pair of polarization panels, optical films, transparent thin film transistors, and transparent electrodes. The transparent LCD apparatus provides the advantage of implementing wide area transparent display, although a drawbacks may include deteriorated transmissivity due to use of polarization panels or optical films and deteriorated optical efficiency, as the transparent LCD needs to use ambient light instead of the backlight unit.

The 'transparent TFEL' refers to an apparatus that uses an AC inorganic thin film electroluminescent display (AC-TFEL) made of transparent electrodes, inorganic fluorescent substance, or insulating layers. AC-TFEL is a display that illuminates as the electrons accelerated within the organic fluorescent excite the fluorescent substance upon passing therethrough. The controller 130 may determine the position of displayed information by controlling so that the electrons are projected to a proper position. Due to transparent property of the inorganic fluorescent substance and the insulating layers, a fairly transparent display may be implemented.

The 'transparent OLED' refers to a transparent display apparatus that uses a self-illuminating OLED. Because the organic light emitting layer is transparent, a transparent display apparatus may be constructed by employing transparent electrodes on both sides. OLED illuminates as the electrons and holes are injected on both sides of the organic light emitting layer to couple with each other within the organic light emitting layer. The transparent OLED apparatus utilizes the above principle to display information, i.e., by injecting electrons and holes to a desired position.

Figure 3:
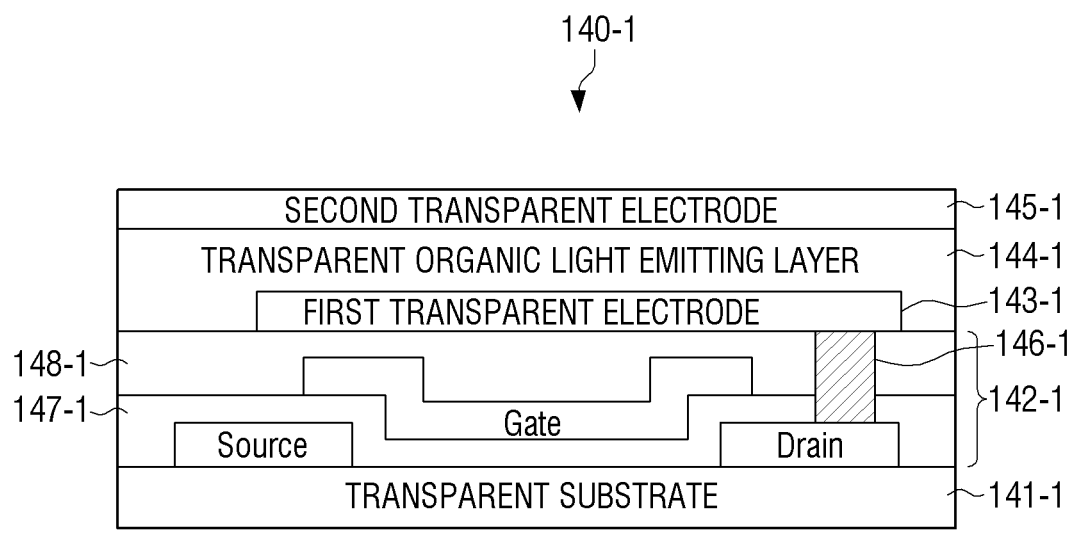
FIG. 3 illustrates a transparent display implemented in a transparent display apparatus according to an exemplary embodiment.

FIG. 3 illustrates detailed structure of a transparent display of the transparent OLED type. For convenience of explanation, the transparent display of the transparent OLED type will be referred by a reference numeral '140-1'.

Referring to FIG. 3, the transparent display 140-1 may include a transparent substrate 141-1, a transparent transistor layer 142-1, a first transparent electrode 143-1, a transparent organic light emitting layer 144-1, a second transparent electrode 145-1 and a connecting electrode 146-1.

The transparent substrate 141-1 may use polymer material, such as plastic having a transparent property or glass. The material for the transparent substrate 141-1 may be determined depending on the environment in which the transparent display apparatus 100 is used. For example, the polymer material may be used for a portable display apparatus due to light-weight and flexibility advantages, while glass may be used for durability and strength in a show window of a shop or building windows.

The 'transparent transistor' 142-1 refers to a layer that includes a transistor made from a transparent material, such as zinc oxide, or titanium oxide instead of silicon of a conventional nontransparent thin film transistor. The transparent transistor layer 142-1 may include therein a source, a gate, a drain and other various dielectric layers 147-1, 148-1, and may also include a connecting electrode 146-1 to electrically connect the drain to the first transparent electrode 143-1. Although FIG. 3 illustrates only one transparent transistor including a source, a gate, and a drain within the transparent transistor layer 142-1, in actual implementation, a plurality of transparent transistors may be evenly distributed over the entire area of the display surface. The controller 130 may apply a control signal to the gates of the respective transistors of the transparent transistor layer 142-2 to drive the corresponding transparent transistors to display information.

The first and second transparent electrodes 143-1, 145-1 may be arranged opposite to each other with reference to the transparent organic light emitting layer 144-1. The first transparent electrode, the transparent organic light emitting layer, and the second transparent electrodes 143-1, 144-1, 145-1 may construct an organic light emitting diode.

The transparent organic light emitting diodes may be largely categorized into a passive matrix OLED (PMOLED) type and an active matrix OLED (AMOLED) type. PMOLED has a structure in which the first and second transparent electrodes 143-1, 145-1 form pixels at a crossing portion. AMOLED has a structure that employs thin film transistor (TFT) to drive the respective pixels. FIG. 3 illustrates AMOLED.

The first and second transparent electrodes 143-1, 145-1 each include a plurality of line electrodes arranged in a perpendicular relationship with each other. For example, if the line electrodes of the first transparent electrode 143-1 are arranged in a horizontal direction, the line electrodes of the second transparent electrodes 145-1 are arranged in a vertical direction. Accordingly, a plurality of intersections are defined between the first and second transparent electrodes 143-1, 145-1. Referring to FIG. 3, the transparent transistor is connected to the respective intersections.

The controller 130 causes potential difference to be formed at the respective intersections, using the transparent transistor. The light is emitted, as the electrons and the holes are introduced into the transparent organic light emitting layer 144-1 from the respective electrodes within the intersections at which the potential difference is formed. On the contrary, the intersections at which potential difference is not formed do not emit light, and therefore, the objects at the background are visible.

The indium tin oxide (ITO) may be used for the first and second transparent electrodes 143-1, 145-1. Alternatively, new material, such as graphene, may be used. Graphene has transparent property and has a planar web-like structure in which carbon atoms are connected to each other. Other various materials may be used for the transparent organic light emitting layer 144-1.

As explained above, the transparent display 140 may be implemented as a transparent LCD type, a transparent TFEL type, a transparent OLED type or a projection type. The 'projection type' refers to a type of displaying by projecting an image on a transparent screen such as head up display (HDD).

Figure 4:
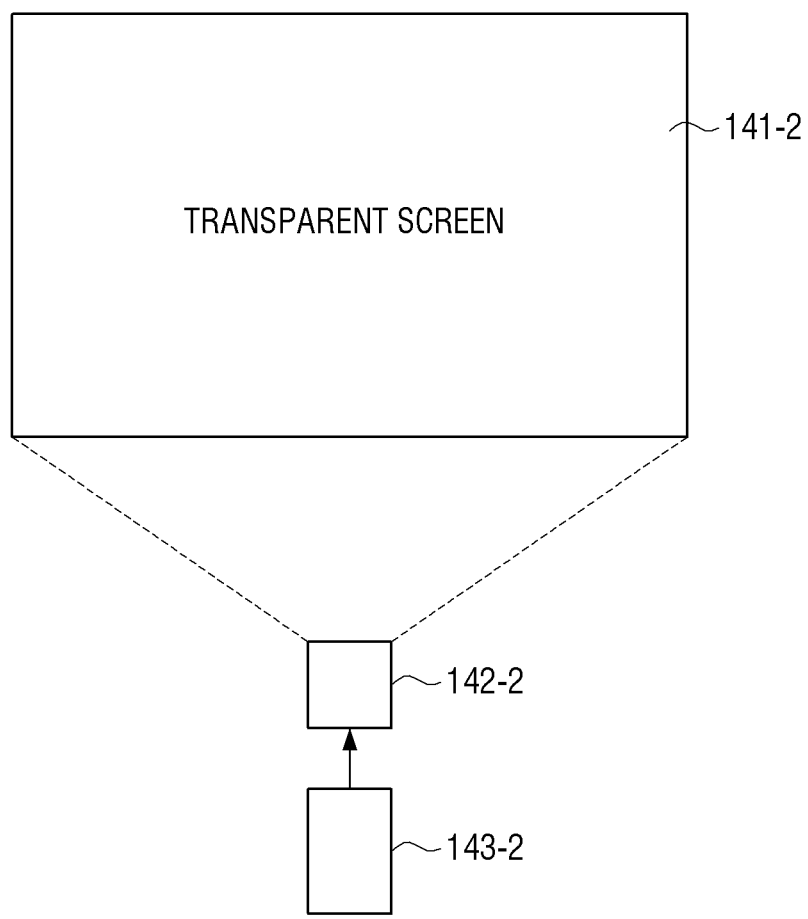
FIG. 4 illustrates a transparent display implemented in a transparent display apparatus according to an exemplary embodiment.

FIG. 4 illustrates detailed constitution of a transparent display implemented as a projection type transparent display apparatus. In one exemplary embodiment, the transparent display of the projection type will be referred to by a reference numeral '140-2'.

The projection type transparent display 140-2 may include a transparent screen 141-2, an optical device 142-2 and an optical source 143-2.

The optical source 143-2 may irradiate lights to mark information using a variety of light sources including vacuum fluorescent display (VFD), a cathode ray tube (CRT), an LCD, or an LED, etc.

The optical device 142-2 transmits the light irradiated from the optical source 143-2 toward the transparent screen 141-2 to project the same. The optical device 142-2 may be implemented as a light guide panel that may include one or more lenses and mirrors.

The optical source 143-2 and the optical device 142-2 may be integrated into one single display module. Accordingly, the optical source 143-2 and the optical device 142-2 may be arranged on the boundary on the upper, lower, left, or right side of the transparent screen 141-2 so that the light is projected onto the transparent screen 141-2 to display information thereon 141-2. Alternatively, the optical source 143-2 and the optical device 142-2 may be implemented as a holographic type that utilizes laser as a light source. In this example, the information may be directly depicted on the transparent screen 141-2 by use of the laser.

The transparent screen 141-2 may be made from general glass. The constitution of the transparent display 140-2 of FIG. 4 may be employed, when the transparent display apparatus 100 is applied for use in windows of mobile objects such as vehicles, ships, or airplanes, or windows of ordinary houses or show windows of shops. As explained above, the transparent display apparatus 100 may be implemented in various environments, at various positions for sensing positions of the user and the objects, constructing a screen based on the perceived positions, and displaying the resultant image.

The controller 130 may determine the transmissive area based on the positions of the user and the object. The method for determining the transmissive area will be explained below.

Figure 5:
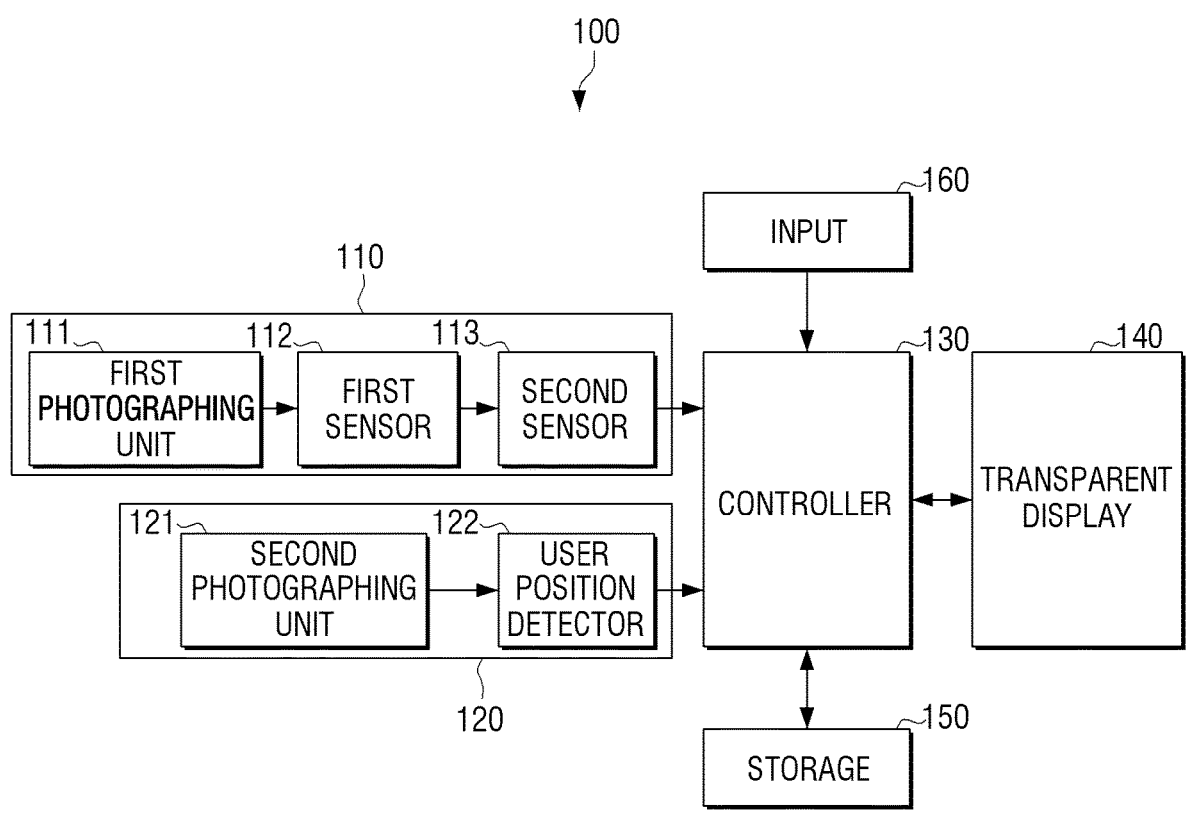
FIG. 5 is a block diagram of a transparent display apparatus according to an exemplary embodiment.

As explained above, the position of the user and the position of the object may be determined in various manners. FIG. 5 illustrates a transparent display apparatus that detects the positions of the user and the object by using a photographing unit, such as a camera.

FIG. 5 is a block diagram of a transparent display apparatus according to an exemplary embodiment. Referring to FIG. 5, the transparent display apparatus 100 may include a first sensor 110, a second sensor 120, a controller 130, a transparent display 140, a storage 150, and an input 160.

The first sensor 110 senses the position of an object. The first sensor 110 may include a first photographing unit 111, a first detector 112, and a second detector 113.

The first photographing unit 111 performs photographing in the first direction of the transparent display apparatus 100. Accordingly, the first photographing unit 111 may photograph one or more objects including the object in the first direction. For convenience of explanation, the image photographed by the first photographing unit 111 will be referred to as a 'background image'.

The first detector 112 may detect edges of the respective objects using respective image pixel information of the background image. Sensing edges may be performed according to various detection algorithms.

In one exemplary embodiment, the first detector 112 may divide the background image into a plurality of blocks in (m*n) pixel units. The first detector 112 may detect representative values of the respective blocks. The representative blocks may be average pixel values of the entire pixels within a block, the highest pixel value among the pixel values of the respective pixels within a block, or the total pixel value obtained as a result of adding up the pixel values of the respective pixels. The first detector 112 may compare the respective sensed representative values with each other and determine if there are blocks having similar representative values that are consecutively arranged with each other. Blocks included in the area of photographing the same object may have similar ranges of representative values.

The first detector 112, if determining the consecutive similar blocks, may detect the edge based on the blocks that correspond to a boundary with blocks with a different representative value from that of the determined similar blocks.

Using the sensed edge, the second detector 113 may identify an object from among the objects photographed by the first photographing unit 111, and detect the position of the distinguished object and the identifying area on the photographed image. By way of example, if the edge sensed at the first detector 112 forms a closed curve, the second detector 113 may detect the position of the object based on the position of the particular blocks included in the closed curve from among the entire blocks of the background image. The second detector 113 may then compare the background image with the entire area of the transparent display 140 and detect the identifying area at which the object is identified from the entire area of the transparent display 140.

Meanwhile, the transparent display apparatus 100 may detect the position of the object and the identifying area based on the characteristics of the respective objects. The information about the characteristics may be provided directly from the objects via short-range wireless communication or other communication manners, or provided from other sources. For example, if the respective objects are equipped with NFC tags and the transparent display apparatus 100 is equipped with an NFC reader, it is possible to receive the information about the characteristics of the objects by tagging the objects to the NFC reader. The characteristics may include color, shape, size, or position of arrangement of the objects. The second detector 113 may distinguish the respective objects included in the background image based on the edges sensed on the background image. Accordingly, among the identified objects, the second detector 113 may perceive a specific object matching the characteristics to be the object 20 and detect the position of the object 20. For example, if the object 20 is on an object display stand, the display stand may also be included in the background image of the photographed image. In this case, the second detector 113 may detect the position of the corresponding object 20 based on the area having the image pixel information matching the color of the object 20.

Alternatively, it is possible to receive information about the characteristics of the objects from a server or a terminal of a supplier of the object, or directly input the characteristic information via input means connected to the transparent display apparatus 100. As explained above, the second detector 113 may accurately detect the transmissive area of the object, using the characteristic information provided via various sources.

The second sensor 120 may include a second photographing unit 121 and a user position detector 122. The second photographing unit 121 may perform photography in the second direction with respect to the transparent display apparatus 100. As a result, the foreground image is acquired.

The user position detector 122 may detect the position of the user by analyzing the foreground image as captured by the second photographing unit 121. The method for sensing the position of the user may be implemented in the same manner as that used above to detect the position of the object by the first detector 112.

Further, the characteristics related to the user may also be registered in advance, or provided from a user terminal or a tag including a short-range wireless communication module equipped by the user. Accordingly, it is possible to accurately detect the position of the user based on the characteristic information of the user.

Meanwhile, the time for the first and second sensors 110, 120 to perform detection may be determined in various manners depending on embodiments.

In one example, the controller 130 may drive the first and second sensors 110, 120 according to an external input made by a person who places, brings, or uses the object. For example, the controller 130 may drive the first and second sensors 110, 120 to detect the positions of the object and the user, if the user touches the surface of the transparent display 140, or if a predetermined input signal is inputted via separately provided input means. If the transparent display apparatus 100 includes a voice recognition module or a motion recognition module, the first and second sensors 110, 120 may also be driven in response to a predetermined voice or gesture. An exemplary embodiment illustrated in FIG. 5 depicts a situation in which the first and second sensors 110, 120 detect the positions of the object and the user by utilizing photographing. However, various manners other than photographing, such as optical sensor, NFC, or direct setting by the user, etc., may be implemented for the operation of the first and second sensors 110, 120. For example, the positions may be sensed via photographing, optical sensing, NFC, or area designating by the user, in response to a user command to perform position recognition.

In another exemplary embodiment, if the transparent display apparatus 100 includes a motion sensor, the controller 130 may detect a movement of the user or the object using the motion sensor, and drive the first and second sensors 110, 120 to detect the positions of the object and the user if the movement stops for longer than a predetermined time. This may prevent unnecessary power consumption.

In yet another exemplary embodiment, if the transparent display apparatus 100 includes an NFC module, upon tagging, the first and second sensors 110, 120 may be driven to detect the positions of the object and the user. To be specific, objects may be arranged in a shop and an NFC module may be equipped in the shop or the transparent display apparatus 100. In this case, upon tagging of a user's NFC reader to the NFC module equipped inside the shop or in the transparent display apparatus 100, the controller 130 may activate the first and second sensors 110, 120.

The controller 130 may determine the transmissive area based on the positions of the object and the user sensed by the first and second sensors 110, 120.

The controller 130 may segment the entire area of the transparent display 140 into a plurality of areas and determine the transmissive area based on an area where the object is seen from the position of the user. The controller 130 may change the position of displayed information, if the information is displayed within the transmissive area, or may control the transparent display 140 to display information once the position of the user is detected if information is not initially displayed in absence of the user's presence.

The storage 150 may store images photographed by the first and second photographing units 111, 121, information regarding the positions of the object and the user, various other information, various settings as set by the user regarding the operations of the transparent display apparatus 100, system operating software, or various application programs.

The input 160 receives user commands concerning the operation of the transparent display apparatus 100. The input 160 may be implemented in various forms, including a touch screen implemented on the transparent display 140, various buttons provided on a main body of the transparent display apparatus 100, a keyboard connected to the transparent display apparatus 100, or an input/output (I/O) interface, such as a mouse to receive various input signals from an external input. The user may enable or disable the functionality of adjusting displayed information via the input 160, or set conditions for when displayed information should be adjusted or a manner of changing displayed information attributes.

The controller 130 may perform the above operation according to a user command inputted via the input 160. That is, if the user enables the functionality to move the position of displayed information, the controller 130 may control the first and second sensors 110, 120 to detect the positions of the object and the user, and store the result of detection at the storage 150. Based on the stored result, the controller 130 may determine the transmissive area and adjust the area of the displayed information that is within the transmissive area to outside the transmissive area.

Figure 6:
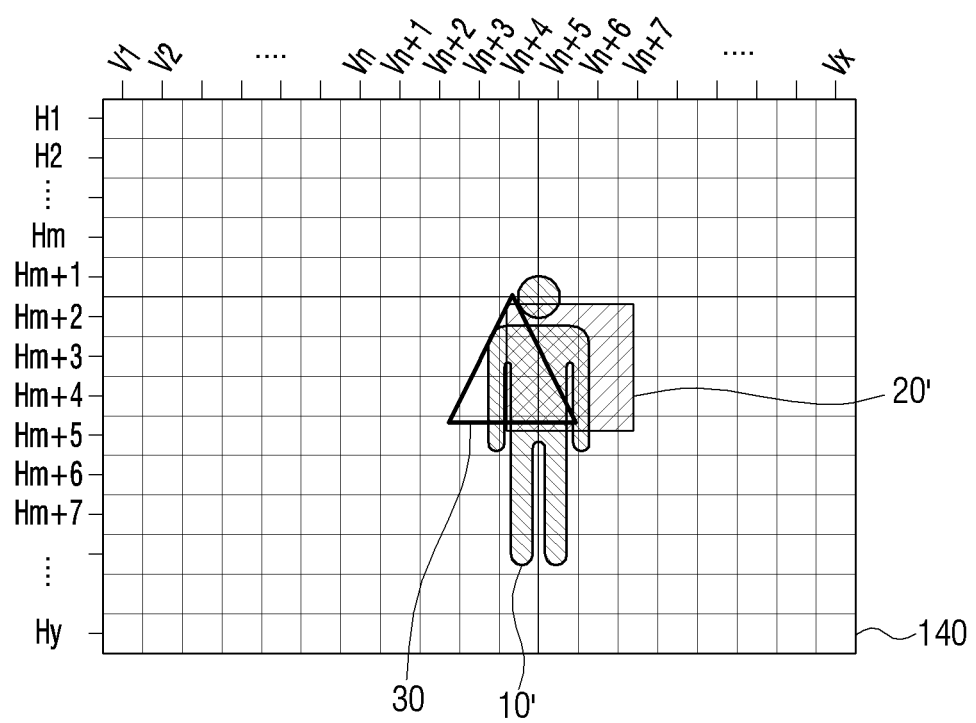
FIG. 6 illustrates a transparent display segmented into a plurality of areas.

FIG. 6 is a view provided to explain a state in which the area of the transparent display 140 is segmented into a plurality of blocks.

Referring to FIG. 6, the transparent display 140 may be divided into virtual segment areas according to a plurality of vertical lines ($V_1$~$V_x$) and a plurality of horizontal lines ($H_1$~$H_y$). The virtual segment areas may be implemented in the form of a matrix.

For high resolution, the cells of the matrix may be one-pixel each. However, considering an increased operational burden of the large number of cells, the cells may be the size of a plurality of pixels. In other exemplary embodiments, the virtual segment areas may be formed by dividing the entire area of the transparent display 140 by 4, 6, 9, or, 12, etc.

The controller 130 may match the positions of the user and the object to corresponding areas of the transparent display 140, respectively. Referring to FIG. 6, the object 20 is seen through areas ($V_{n+4}$, $H_{m+2}$), ($V_{n+5}$, $H_{m+2}$), ($V_{n+6}$, $H_{m+2}$), ($V_{n+7}$, $H_{m+2}$), ($V_{n+4}$, $H_{m+3}$), ($V_{n+5}$, $H_{m+3}$), ($V_{n+6}$, $H_{m+3}$), ($V_{n+7}$, $H_{m+3}$), ($V_{n+4}$, $H_{m+4}$), ($V_{n+5}$, $H_{m+4}$), ($V_{n+6}$, $H_{m+4}$), ($V_{n+7}$, $H_{m+4}$), ($V_{n+4}$, $H_{m+5}$), ($V_{n+5}$, $H_{m+5}$), ($V_{n+6}$, $H_{m+5}$), ($V_{n+7}$, $H_{m+5}$). Hereinbelow, the area through which the object 20 is seen on the transparent display 140 will be referred to by reference numeral 20'.

The position of the user is seen through areas ($V_{n+3}$, $H_{m+1}$), ($V_{n+4}$, $H_{m+1}$), ($V_{n+5}$, $H_{m+1}$), ($V_{n+6}$, $H_{m+1}$), ($V_{n+3}$, $H_{m+2}$), ($V_{n+4}$, $H_{m+2}$), ($V_{n+5}$, $H_{m+2}$), ($V_{n+6}$, $H_{m+2}$), ($V_{n+3}$, $H_{m+3}$), ($V_{n+4}$, $H_{m+3}$), ($V_{n+5}$, $H_{m+3}$), ($V_{n+6}$, $H_{m+3}$), ($V_{n+3}$, $H_{m+4}$), ($V_{n+4}$, $H_{m+4}$), ($V_{n+5}$, $H_{m+4}$), ($V_{n+6}$, $H_{m+4}$), ($V_{n+3}$, $H_{m+5}$), ($V_{n+4}$, $H_{m+5}$), ($V_{n+5}$, $H_{m+5}$), ($V_{n+6}$, $H_{m+5}$), ($V_{n+4}$, $H_{m+6}$), ($V_{n+5}$, $H_{m+6}$), ($V_{n+4}$, $H_{m+7}$), ($V_{n+5}$, $H_{m+7}$), ($V_{n+4}$, $H_{m+8}$), ($V_{n+5}$, $H_{m+8}$). Hereinbelow, the areas through which the user 10 is seen on the transparent display 140 will be referred to by reference numeral 10'. FIG. 6 illustrates a situation in which the information 30 is displayed on a position at which the object matching area 20' and the user matching area 10' partially overlap.

The controller 130 may record the object position sensed at the first sensor 110 and the user position sensed at the second sensor 120 to a matrix table stored at the storage 150, respectively. Accordingly, the overlapping portion of the two positions is determined to be the transmissive area.

Alternatively, the controller 130 may directly project the object 20 onto the transparent display 140 in a perpendicular relation to determine the object matching area 20' and also project the user 10 in a perpendicular relation to determine the user matching area 10'. In this case, the transmissive area (i.e., the area where the object is seen at the position of the user) may be formed between the object matching area 20' and the user matching area 10'. The controller 130 may determine the transmissive area depending on the distance between the object and the transparent display 140, distance between the user and the transparent display 140, and ratio of the distances. That is, the controller 130 may consider the shape and size of the object with reference to a point which perpendicularly connects the surface of the transparent display 140 to the object, to determine the object matching area 20'. The controller 130 may also determine the user matching area 10' by considering the shape and size of the user with reference to a point which perpendicularly connects the user to the surface of the transparent display 140. In this case, if the object and the user are perpendicularly symmetrical to each other with reference to the surface of the transparent display 140, the overlapping area between the user matching area 10' and the object matching area 20' may be directly determined to be the transmissive area.

On the other hand, if the object and the user area positioned at 45° inclination with reference to the transparent display 140, the center area of the area between the user matching area 10' and the object matching area 20' may be determined to be the transmissive area. As explained above, the transmissive area may be calculated according to distances and angles of the user and the objects. This will be explained in detail below.

Meanwhile, if change of a user or object, or appearance of a new user or new object is sensed, the controller 130 may update the matrix table according to the result of detection.

FIG. 7 illustrates an example of a matrix table stored in the storage 150. Referring to FIG. 7, the matrix table 700 may be constructed in the same manner as illustrated in FIG. 6, in which the transparent display 140 is segmented into a plurality of areas. That is, the matrix table 700 may be formed by a plurality of vertical lines ($V_1$~$V_x$) and a plurality of horizontal lines ($H_1$~$H_y$), and data may be recorded to cells at the intersections of the vertical and horizontal lines.

Referring to FIG. 7, basic values may be recorded in the respective cells of the matrix table 700, and the cell corresponding to the position of the object is recorded with a first value, while the cell corresponding to the position of the user is recorded with a second value. Although the basic value, the first and the second values are set to 0, 1, 2 in FIG. 7, the values are randomly set for convenience of explanation and therefore, should not be construed as limiting.

Depending on the result of the detection by the first sensor 110, the controller 130 records '2' in the cells ($V_{n+4}$, $H_{m+2}$), ($V_{n+5}$, $H_{m+2}$), ($V_{n+6}$, $H_{m+2}$), ($V_{n+7}$, $H_{m+2}$), ($V_{n+4}$, $H_{m+3}$), ($V_{n+5}$, $H_{m+3}$), ($V_{n+6}$, $H_{m+3}$), ($V_{n+7}$, $H_{m+3}$), ($V_{n+4}$, $H_{m+4}$), ($V_{n+5}$, $H_{m+4}$), ($V_{n+6}$, $H_{m+4}$), ($V_{n+7}$, $H_{m+4}$), ($V_{n+4}$, $H_{m+5}$), ($V_{n+5}$, $H_{m+5}$), ($V_{n+6}$, $H_{m+5}$), ($V_{n+7}$, $H_{m+5}$) of the matrix table 700.

Further, depending on the result of detection by the second sensor 120, the controller 130 records '1' in the cells ($V_{n+3}$, $H_{m+1}$), ($V_{n+4}$, $H_{m+1}$), ($V_{n+5}$, $H_{m+1}$), ($V_{n+6}$, $H_{m+1}$), ($V_{n+3}$, $H_{m+2}$), ($V_{n+4}$, $H_{m+2}$), ($V_{n+5}$, $H_{m+2}$), ($V_{n+6}$, $H_{m+2}$), ($V_{n+3}$, $H_{m+3}$), ($V_{n+4}$, $H_{m+3}$), ($V_{n+5}$, $H_{m+3}$), ($V_{n+6}$, $H_{m+3}$), ($V_{n+3}$, $H_{m+4}$), ($V_{n+4}$, $H_{m+4}$), ($V_{n+5}$, $H_{m+4}$), ($V_{n+6}$, $H_{m+4}$), ($V_{n+3}$, $H_{m+5}$), ($V_{n+4}$, $H_{m+5}$), ($V_{n+5}$, $H_{m+5}$), ($V_{n+6}$, $H_{m+5}$), ($V_{n+4}$, $H_{m+6}$), ($V_{n+5}$, $H_{m+6}$), ($V_{n+4}$, $H_{m+7}$), ($V_{n+5}$, $H_{m+7}$), ($V_{n+4}$, $H_{m+8}$), ($V_{n+5}$, $H_{m+8}$) of the matrix table 700.

The controller 130 may record ('3') a sum of '1' and '2' in the cells ($V_{n+4}$, $H_{m+2}$), ($V_{n+5}$, $H_{m+2}$), ($V_{n+6}$, $H_{m+2}$), ($V_{n+4}$, $H_{m+3}$), ($V_{n+5}$, $H_{m+3}$), ($V_{n+6}$, $H_{m+3}$), ($V_{n+4}$, $H_{m+4}$), ($V_{n+5}$, $H_{m+4}$), ($V_{n+6}$, $H_{m+4}$), ($V_{n+4}$, $H_{m+5}$), ($V_{n+5}$, $H_{m+5}$), ($V_{n+6}$, $H_{m+5}$) that are the overlapping areas among the two areas.

The above is only an example and should not be construed as limiting. Accordingly, a third value other than the sum of the two values may be recorded in the cells corresponding to the overlapping areas, to thereby indicate that the cells correspond to the overlapping areas.

The controller 130 may compare the areas on which the information 30 will be displayed on the transparent display 140, with the matrix table 700. Accordingly, the controller 130 may move the position of displaying information 30, if the cells recorded with '3' (i.e., cells corresponding to intersection) of the matrix table partially or wholly overlap with the position of display information. Depending on implementation, the position of displayed information may be moved if the information 30 is placed on a cell (corresponding to union of the sets) of the matrix table recorded with at least one of 1, 2 and 3.

Figure 8:
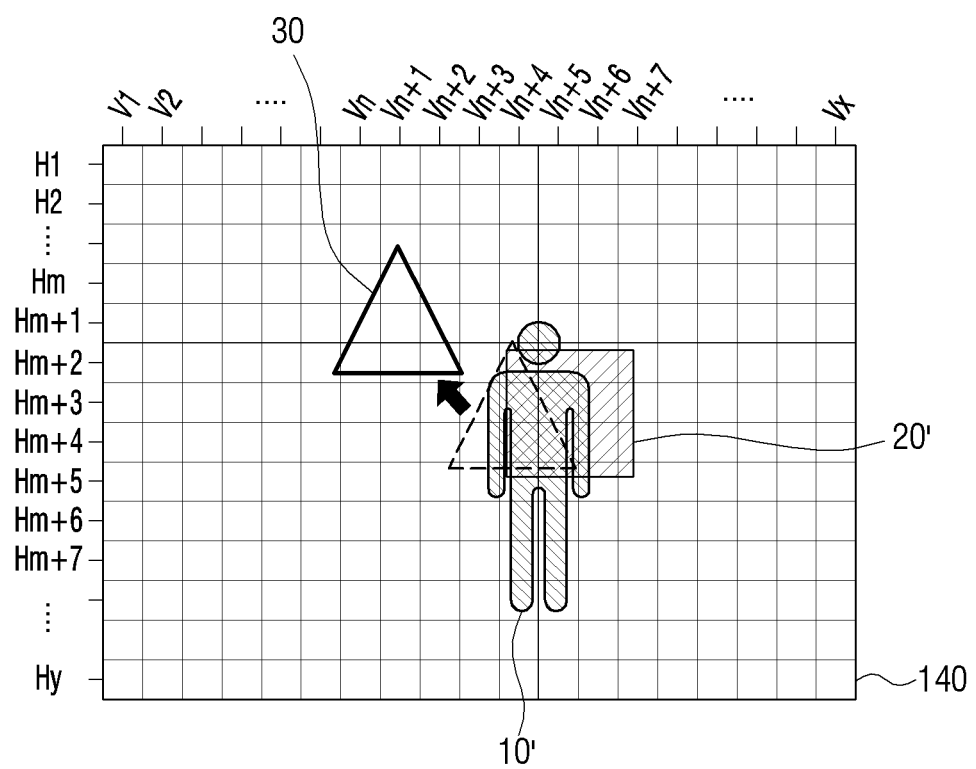
FIG. 8 is a view provided to explain a method for moving an object using the matrix table of FIG. 7.

FIG. 8 illustrates a situation in which the position of displayed information is changed by the controller 130. Referring to FIG. 8, the information 30 is moved away from the cells having values of 1, 2 and 3, and the information 30 is displayed at new areas ($V_{n+1}$, $H_{m-1}$), ($V_n$, $H_m$), ($V_{n+1}$, $H_m$), ($V_{n+2}$, $H_m$), ($V_n$, $H_{m+1}$), ($V_{n+1}$, $H_{m+1}$), ($V_{n+2}$, $H_{m+1}$), ($V_{n-1}$, $H_{m+2}$), ($V_n$, $H_{m+2}$), ($V_{n+1}$, $H_{m+2}$), ($V_{n+2}$, $H_{m+2}$), ($V_{n+3}$, $H_{m+2}$).

The controller 130 may determine a distance and a direction of moving the information 30, based on information, such as distance between the overlapping point between the transmissive area and the information displaying area, to another area in the vicinity at which the visibility is not deteriorated. Although FIG. 8 illustrates an example where the information 30 is shifted from the original position upwards and to the left by three or four areas and displayed a predetermined distance from the transmissive area, this is only an example and should not be construed as limiting. Accordingly, the information 30 may be moved to an area as close as possible to the original position that does not overlap.

Alternatively, the direction of moving the information 30 may be predetermined by a user. For example, the information 30 may be set to be moved in a predetermined direction, such as upward, downward, leftward, rightward or diagonal direction with reference to the position of the object, the position of the user, or the field of vision of the user.

Although the position of the object, the position of the user and the position of the information may be collectively determined by use of one matrix table 700, as explained above with reference to FIG. 7, separate matrix tables may be generated for the object, the user and the information, in which case the transmissive area may be determined by comparing the matrix tables.

Alternatively, instead of preparing a matrix table, the controller 130 may combine a photographed image frame of the user and a photographed image frame of the object with different layers, and may determine a certain area to be the transmissive area among the overlapping area or the intermediate area between the user and the object areas in the combined state. In this case, it is possible to determine whether the information overlaps the transmissive area by directly comparing the combined frames with the image frame containing the information.

Figure 9:
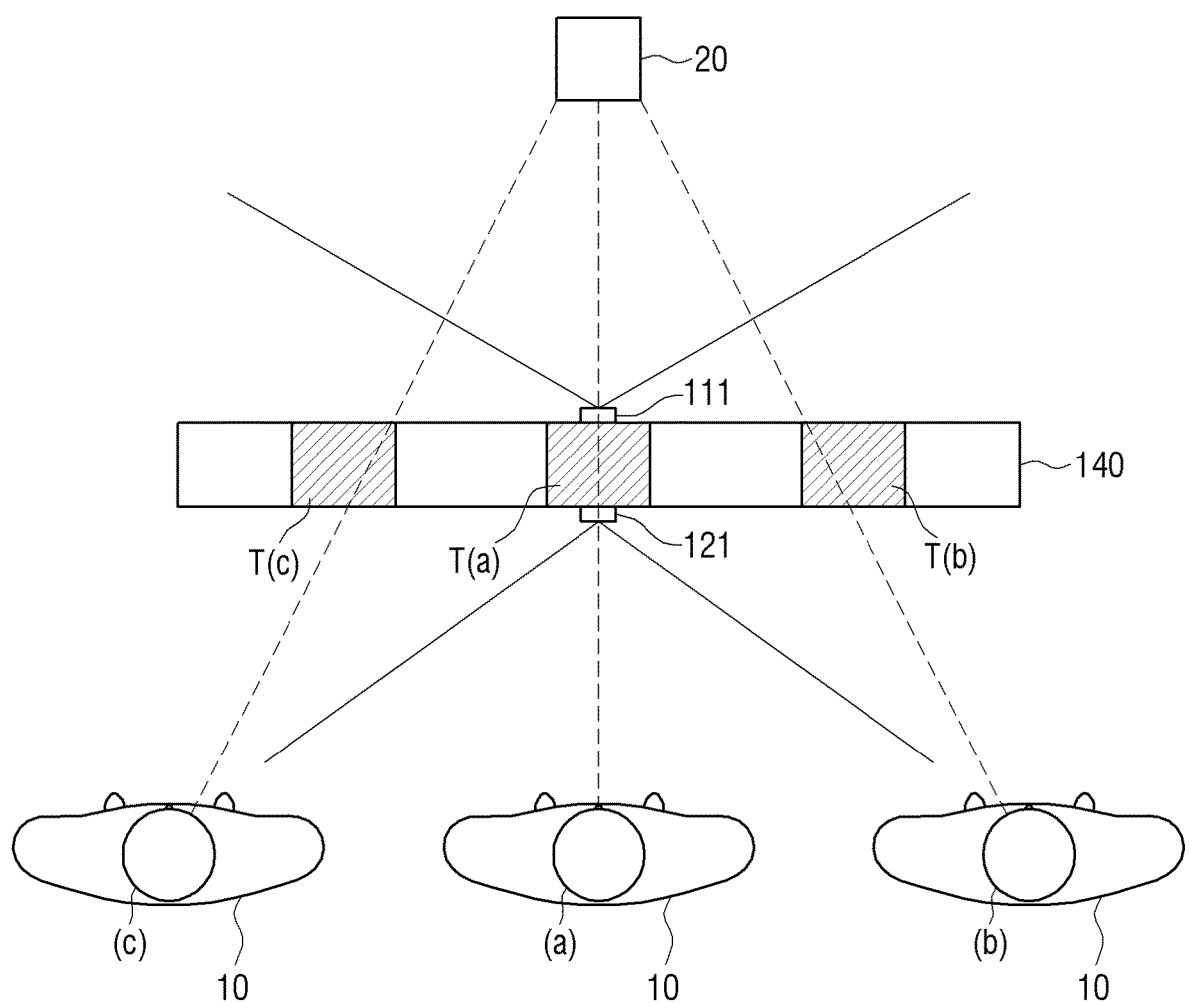
FIG. 9 illustrates a transparent display apparatus having a photographing unit to photograph a user and an object, according to an exemplary embodiment.

FIG. 9 is a plan view provided to explain the first and second photographing units 111, 121 photographing the user 10 and the object 20.

Referring to FIG. 9, the first photographing unit 111 may be attached to an upper portion of the transparent display apparatus 100, and oriented to photograph the object 20. On the contrary, the second photographing unit 121 may be attached to the transparent display apparatus 100 and oriented to photograph the user 10.

Referring to FIG. 9, there may be one first photographing unit 111 and one second photographing unit 121, which may be installed at upper middle portion of the transparent display apparatus.

Referring to FIG. 9, if the user 10 is positioned at location (a), in which case the user 10 and the object 20 are in parallel relationship with respect to the transparent display apparatus 100, the transmissive area on the transparent display apparatus 100 may be formed at a location T(a) at which a line of sight between the user 10 and the object 20 intersects the transparent display 140. Accordingly, the transparent display apparatus 100 may display the information on an area other than the transmissive area T(a).

Because the transparent display apparatus 100 transparently shows the object 20, the position where the image of the object 20 is converged and the shape of the object 20 on the transparent display 140 may vary, depending on the position of the user. That is, referring to FIG. 9, if the user is positioned at location (b), the transmissive area is formed at T(b), while if the user is positioned at location (c), the transmissive area is formed at T(c). Similarly, although it is described that the user 10 changes position, the object 20 may change position, and both the user 10 and the object 20 may change position. Further, if the object 20 is cube shaped, and if the user 10 is at (a) and the eye level of the user 10 at a level of the object 20, the object 20 is viewed as a square. However, if the object 20 is at (b) or (c), the shape may appear to be rectangle or diamond shaped. Accordingly, it is necessary to accurately identify the object 20 relative to the movement of the user.

Figure 10:
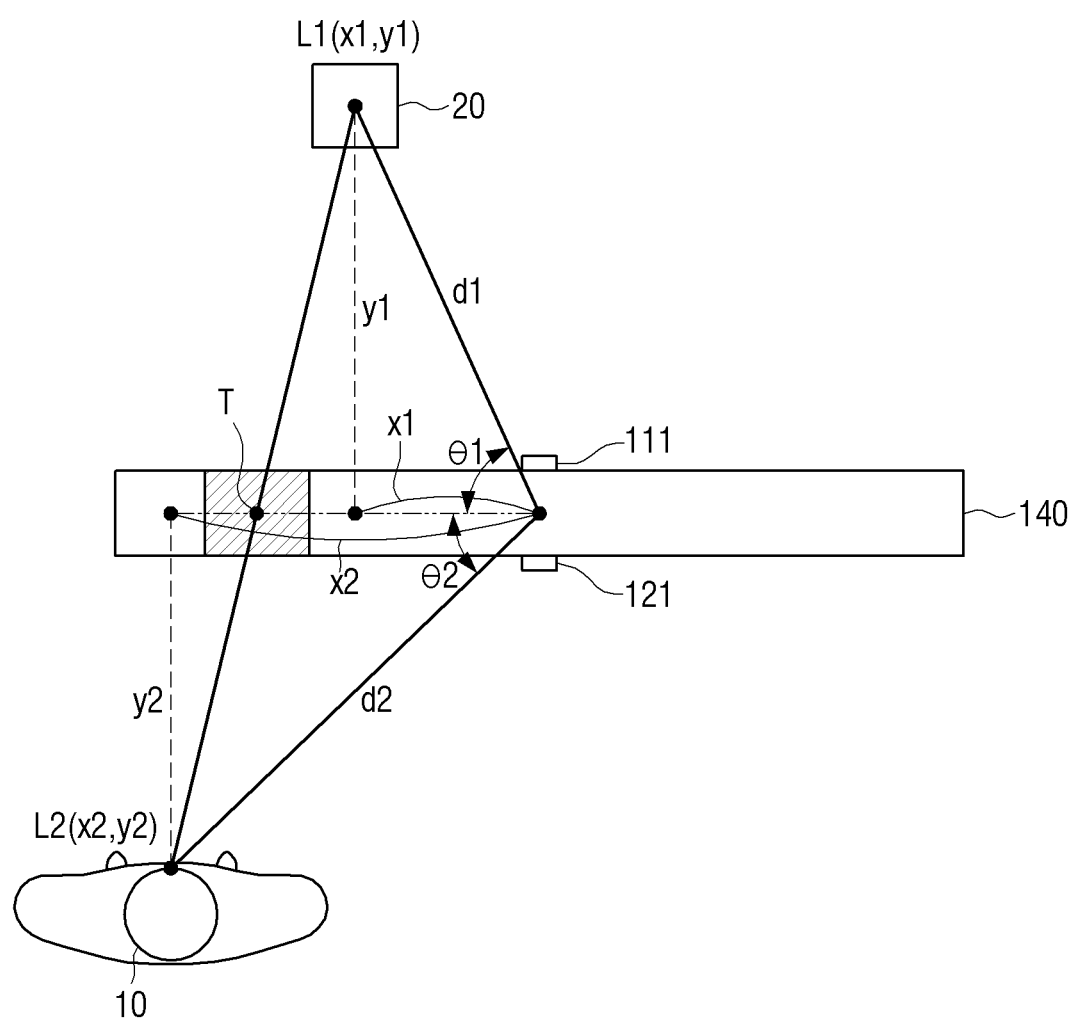
FIG. 10 is a view provided to explain a method for calculating a transmissive area based on the positions of the user and the object.

FIG. 10 is a view provided to explain a method for calculating a transmissive area based on the positions of the user and the object. Referring to FIG. 10, a method for estimating the transmissive area of the using a trigonometrical function when the user shifts position will be explained. That is, referring to FIG. 10, an exemplary embodiment will be explained regarding a method of measuring distance to an object, or angle of the object, by a depth camera or a distance sensor.

Referring to FIG. 10, the first and second photographing units 111, 121 may be installed at the upper center portion of the transparent display apparatus 100. With the first and second photographing units 111, 121 being placed correspondingly to each other, a point centered on a line between the photographing units 111, 121 is the origin (0, 0), and it is assumed that the actual position of the object 20 is L1(x1, y1) and the actual position of the user 10 is L2(x2, y2).

If the first and second photographing units 111, 121 are depth cameras, the first detector 112 may detect a distance (d1) to the object and an angle (θ1) between the direction of the object and the surface of the transparent display apparatus 100, using the background image photographed at the first photographing unit 111. Further, using the foreground image photographed at the second photographing unit 121, the second detector 122 may detect a distance (d2) to the user and an angle (θ2) between the direction of the user and the surface of the transparent display apparatus 100. Although two photographing units 111, 121 are described, a single depth camera may be employed to determine the positions of the transparent display apparatus 100, the user 10, and the object 20 relative to the single depth camera, and hence the positions of the user 10 and the object 20 relative to the transparent display apparatus 100 may be determined.

The controller 130 may calculate x1, y1, x2, y2 using the trigometrical function. That is, $d1*\sin\theta1=y1$, $d1*\cos\theta1=x1$, and $d2*\sin\theta2=y2$, $d2*\cos\theta2=x2$. With x1, y1, x2, y2 calculated, a linearized equation connecting L1 and L2 is obtained. That is, the equation such as $y=(y1-y2)*x/(x1-x2)+y1-(y1-y2)*x1/(x1-x2)$ can be obtained. As a result, the point (T) where the object is seen on the transparent display 140 may be calculated to be $((x2y1-x1y2)/(y1-y2), 0)$. The controller 130 may move the information to be displayed away from the calculated point T.

Although T may be expressed as one coordinate value (FIG. 10), this is described for convenience of explanation. Accordingly, in actual implementation, all the areas within a predetermined distance with respect to point T may be estimated to be the transmissive area, using the size of the object and a linear distance between the user and the object.

Although FIGS. 9 and 10 illustrate an example in which one first photographing unit 111 and one second photographing unit 121 are prepared, there may be a plurality of photographing units 111, 121. That is, if there are a plurality of photographing units, even when the user changes position, it is possible to estimate the position of the object, using the photographing unit having a position closest to the position to which the move moves. As a result, accurate estimation of the user's position is enabled.

Figure 11:
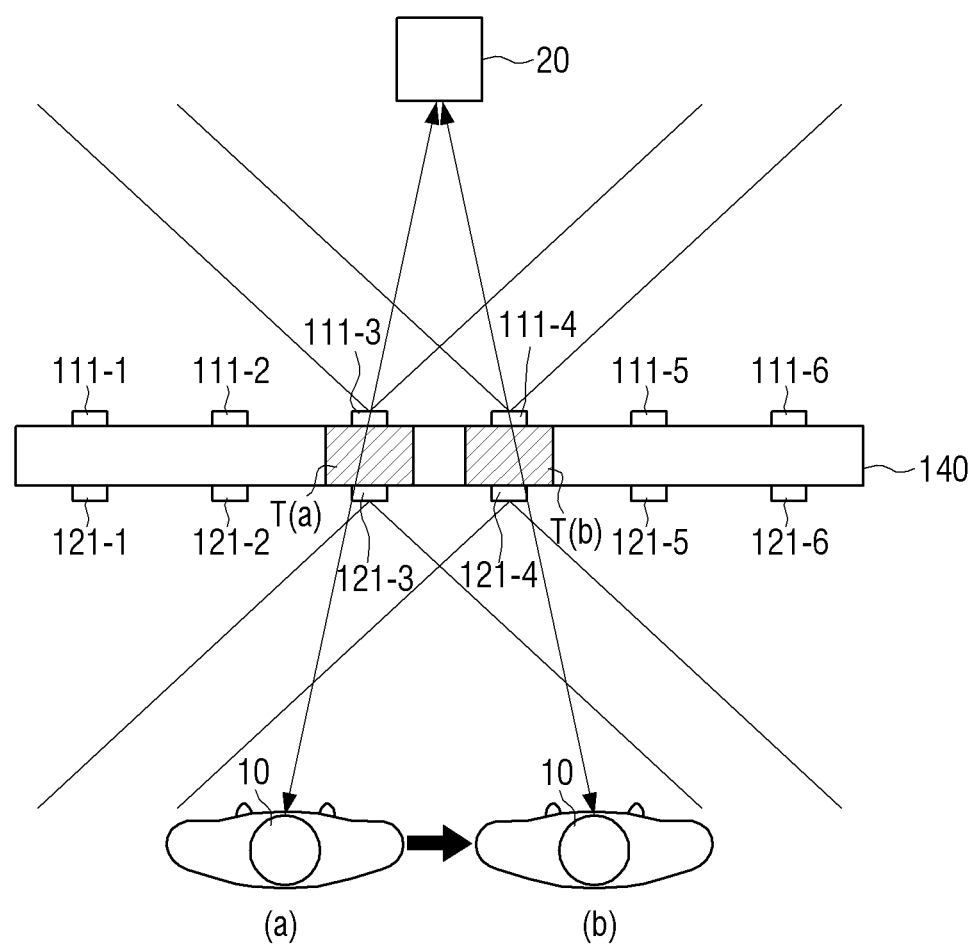
FIG. 11 illustrates a transparent display apparatus including a plurality of photographing units which operate adaptively according to a position of a user.

FIG. 11 illustrates a constitution of a transparent display apparatus including a plurality of photographing units according to an exemplary embodiment.

Referring to FIG. 11, six first photographing units 111-1~111-6 and six second photographing units 121-1~121-6 may be symmetrically arranged opposite to each other. The first and second photographing units at opposite positions may operate in association with each other. That is, if the user is at point (a), the transmissive area T(a) may be determined by using the images captured at the first photographing unit 111-3 and the second photographing unit 121-3. Then if the user moves to (b), the transmissive area T(b) may be determined by using the images captured at the first photographing unit 111-4 and the second photographing unit 121-4.

The position of the user may be sensed using a separately-provided motion sensor (not illustrated), or the position of the user may be analyzed using the images captured at the second photographing units 121-1~121-6 and the position of the object may be determined by selectively operating the corresponding first photographing unit 111-1~111-6.

For example, if the user is photographed at the second photographing unit 121-1, the controller 130 may calculate motion vectors of the user by comparing the photographed frames of the user. Accordingly, if a direction of movement of the user is determined, the next photographing unit present in the moving direction may be activated to perform photographing. That is, if the user 10 is currently moving in a rightward direction (FIG. 11), the controller 130 may predict the movement direction based on the images captured at the second photographing unit 121-1, and then activate the first photographing unit 111-2 and the second photographing unit 121-2 to perform photographing of the user 10 and object 20 predicting the user's continued movement towards the rightward direction. If the user keeps moving to rightward direction, then the controller 130 may activate subsequent first and second photographing units 111-3, 121-3 in the rightward direction to perform photographing. The controller 130 may determine the transmissive area based on the images captured at the photographing units.

Using a plurality of first and second photographing units 111-1~111-6, 121-1~121-6 as explained above, the transmissive area can be determined even when the user changes the direction because the transmissive area can be accurately and continuously perceived.

Meanwhile, in a modified exemplary embodiment, without requiring intervention of the controller 130, the direction of the user's movement may be notified to the counterpart photographing units via wired or wireless communication protocol between the first and second photographing units 111-1~111-6, 121-1~121-6. For example, if the user is photographed at the second photographing unit 121-1, the second photographing unit 121-1 may transmit a user sense signal to the first photographing unit 111-1. The first photographing unit 111-1 may photograph the object 20 according to the user sense signal and provide the image to the controller 130. Then if the user moves to the rightward direction, the second photographing unit 121-1 may transmit a user sense signal to the first and second photographing units 111-2, 121-2, respectively. In doing so, it is possible to accurately detect the transmissive area by adaptively responding to the movement of the user and adjust the displayed information 30 accordingly.

Although there may be a plurality of first photographing units and a plurality of second photographing units, as explained above with reference to FIG. 11, this is not limiting. Accordingly, it is possible to provide a plurality of first photographing units and one second photographing unit, or vice versa.

The respective photographing units may be implemented in various forms, such as video cameras, still image cameras, depth cameras, or the like. The 'depth camera' as used herein refers to a camera that irradiates infrared (IR) patterns and receives IR patterns reflected from the surrounding objects, to acquire IR images. The controller 130 may analyze IR images to determine distances to the respective objects in the surrounding environment.

The controller 130 may calibrate the position of the object or the user captured by the respective photographing units by considering the distance to the object or distance to the user. Accordingly, accurate calculation of transmissive area is enabled.

Although a plurality of photographing units may be used as explained above (FIG. 11), in another exemplary embodiment, the photographing unit may be rotated to adjust the angle of photography according to the gaze direction of the user. If a plurality of photographing units are prepared, a photographing unit on, or near to a straight line connecting the position of the user 10 and the position of the object 20 may be selected to perform photography. In one exemplary embodiment, the selected photographing unit may be rotated to parallel a direction of the straight line. That is, it is possible to adjust the angle of rotation of the photographing unit. Accordingly, even when the user moves so that the direction of his gaze direction changes, the transmissive area matching the new direction can be determined.

Figure 12:
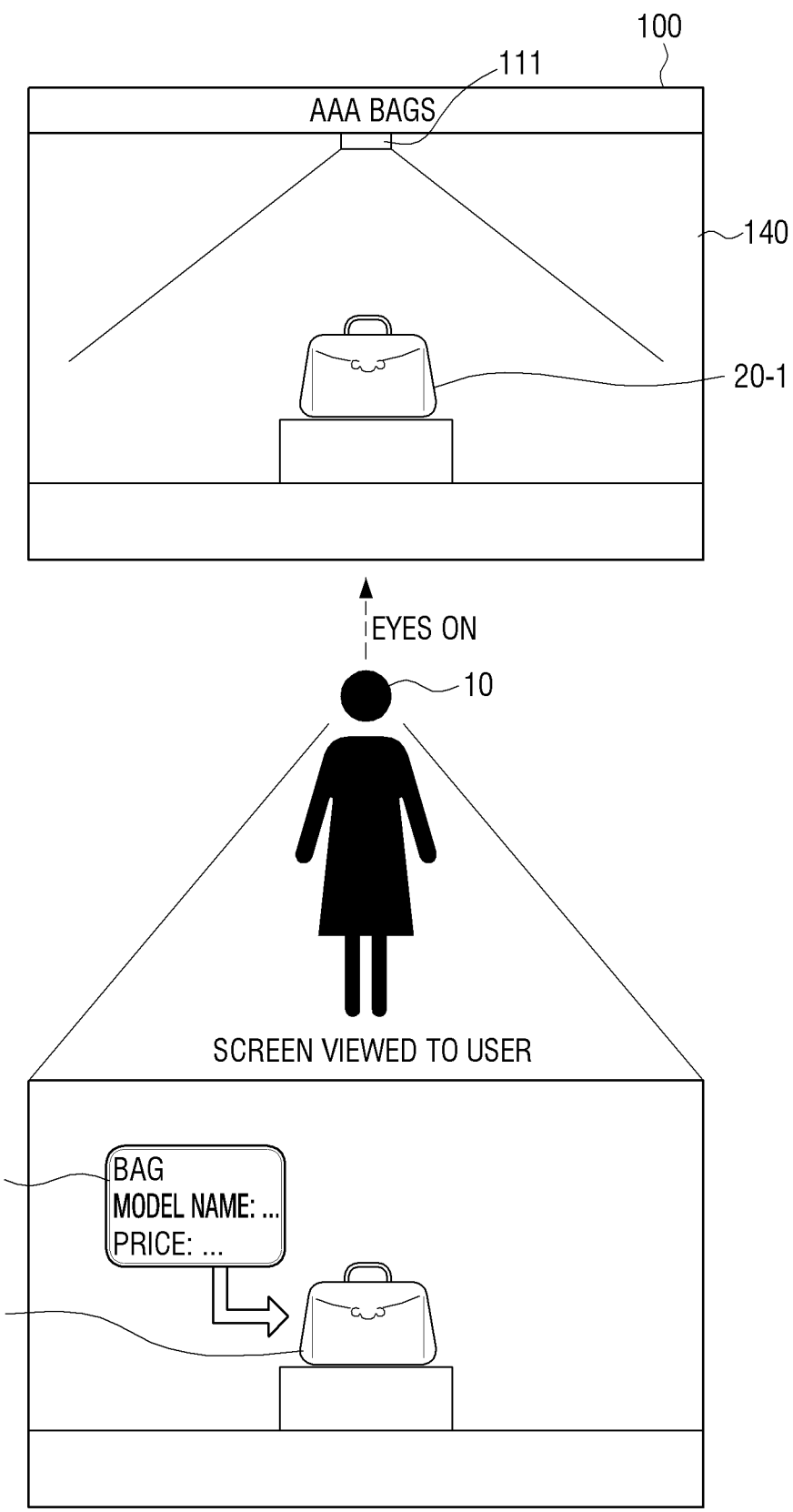
FIGS. 12 and 13 are views provided to explain a method of tracking eye movement of a user.
Figure 13:
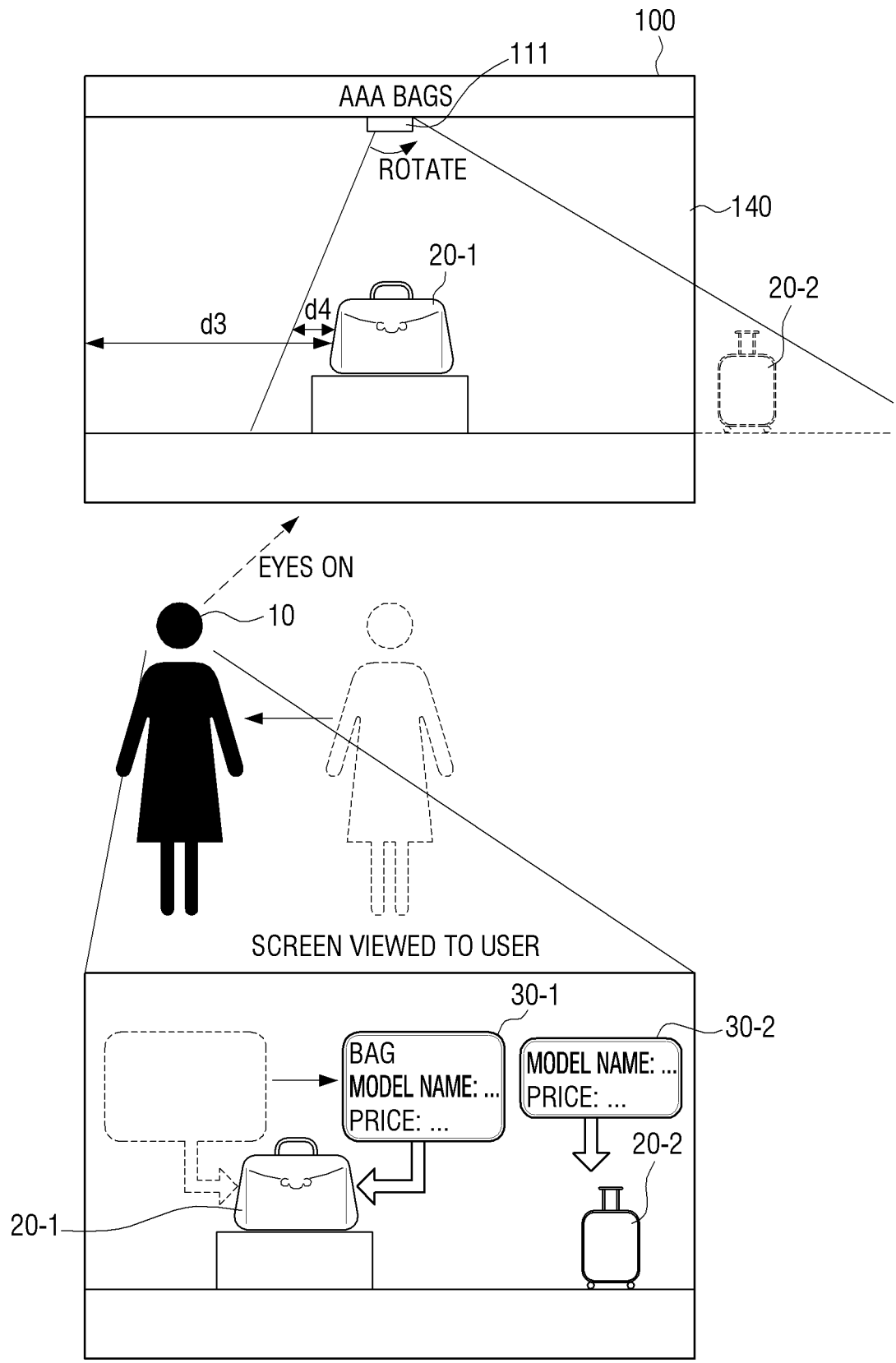

FIGS. 12 and 13 illustrate constitution of a transparent display apparatus which rotates the photographing unit to perceive the position of the object to suit the gaze direction of the user, according to an exemplary embodiment. FIGS. 12 and 13 illustrate an example where the transparent display apparatus 100 is implemented as a show window.

Referring first to FIG. 12, if the user 10 stands at a center outside the show window, watching an object 20-1 (e.g., bag) placed in the show window, the first photographing unit 111 arranged on an upper end of the center portion may perform photographing at a reference position. The information 30-1 may be displayed on an area which does not overlap with the position of the object 20-1 as viewed by the user 10. In the implementation of the show window (FIG. 12), the information 30-1 may be information about the object 20-1, an advertisement for the shop, or the like. A manager of the transparent display apparatus 100 may set the content of the information 30-1 via the input provided on the transparent display apparatus 100, or construct the information using terminal of the user and transmit the information to the transparent display apparatus 100.

If the user moves in a certain direction, the first photographing unit 111 may be rotated to suit the direction so that it is possible to accurately estimate the position of the object 20-1 as viewed from the position of the user 10.

FIG. 13 illustrates a situation when the user 10 moves in a leftward direction. In this case, the first photographing unit 111 rotates to the rightward direction. Accordingly, the transmissive area between the object 20-1 and the user 10 on the transparent display 140 changes, and new object 20-2, which was not seen by the user 10 at the user's previous position, may enter into the user's view. The transparent display apparatus 100 may change the position of displayed information 30-1 from the vicinity of the object 20-1 according to the change of the user's position. In this case, the form, layout, or content of the displayed information 30-1 may also change to suit the changed position. Further, the transparent display apparatus 100 may additionally display new information 30-2 about the new object 20-2.

Referring to FIG. 13, an actual distance d3 between the object 20-1 and the edge of the show window may be different from the distance d4 between the object 20-1 and the edge thereof on the photographed image provided by the photographing unit 111.

In the above case, the controller 130 may correct the cell values of the matrix table by reflecting the ratio between the actual distance d3 and distance d4 on the image.

Figure 14:
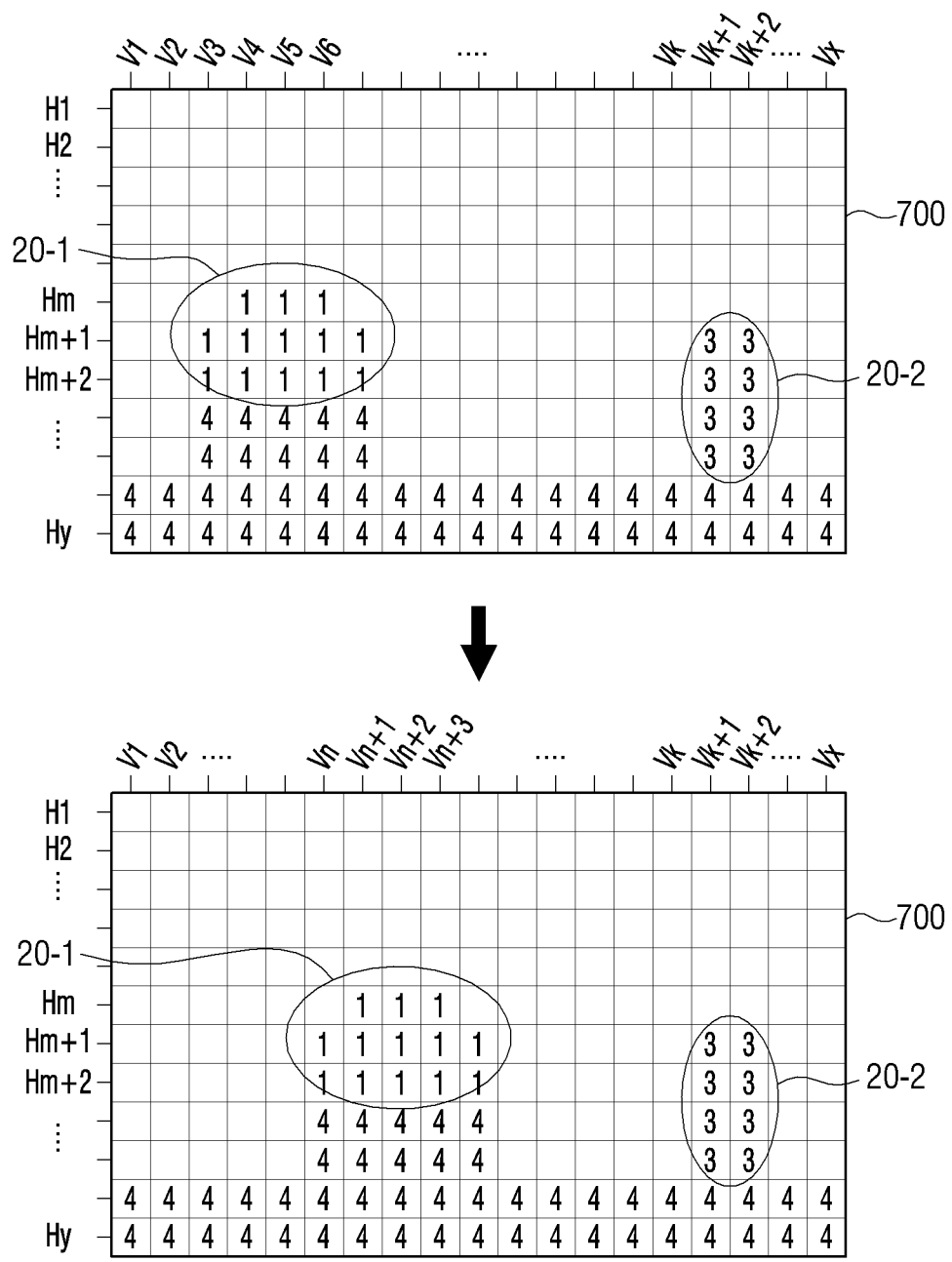
FIG. 14 is a view provided to explain a method for modifying a matrix table.

FIG. 14 is a view provided to explain a method for correcting respective cell values of the matrix table. Referring to FIG. 14, according to the actual photographed image within the photography range of the photographing unit 111, a value '1' corresponding to the first object 20-1 is recorded in the intersecting cell between lines V2, V3, V4, and lines Hm, Hm+1, Hm+2, and value '3' corresponding to the second object 20-2 is recorded in the intersecting cell between lines Vk, Vk+1 and lines Hm, Hm+1, Hm+2, Hm+3, Hm+4.

However, the controller 130 may correct the respective cell values of the matrix table 700 to shift the position of the first object 20-1 to rightward direction for a distance corresponding to the ratio between d3 and d4, and to fix the position of the second object 20-2.

The distance of shifting may be acquired from a database which records optimum values acquired from repeated experiments.

As explained above, the distance and direction of such movement may be determined depending on the position information overlapping with the transmissive area. Hereinbelow, various embodiments of adjusting display information will be explained.

Figure 15:
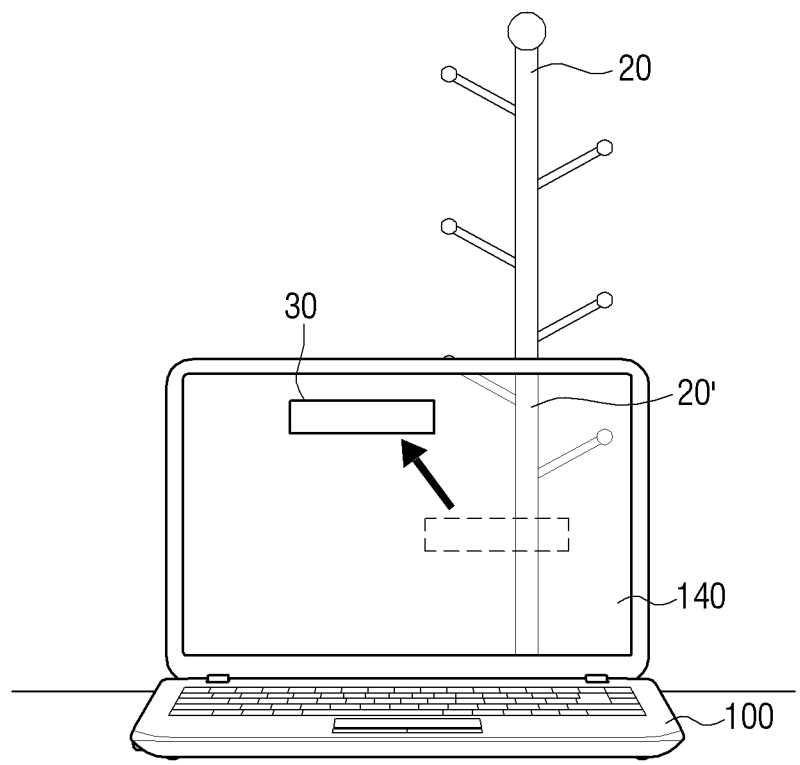
FIG. 15 is a view provided to explain an operation of a transparent display apparatus implemented to a form of laptop computer.

FIG. 15 illustrates an example in which the transparent display apparatus 100 is implemented as a laptop computer. Referring to FIG. 15, the transparent display 140 of the transparent display apparatus 100 transparently shows the object 20.

Accordingly, the transmissive area 20' is determined depending on the actual position of the user 10 and the position of the object 20. The transparent display apparatus 100 may change the position of displayed information 30 within the transmissive area 20' to another area.

Figure 16:
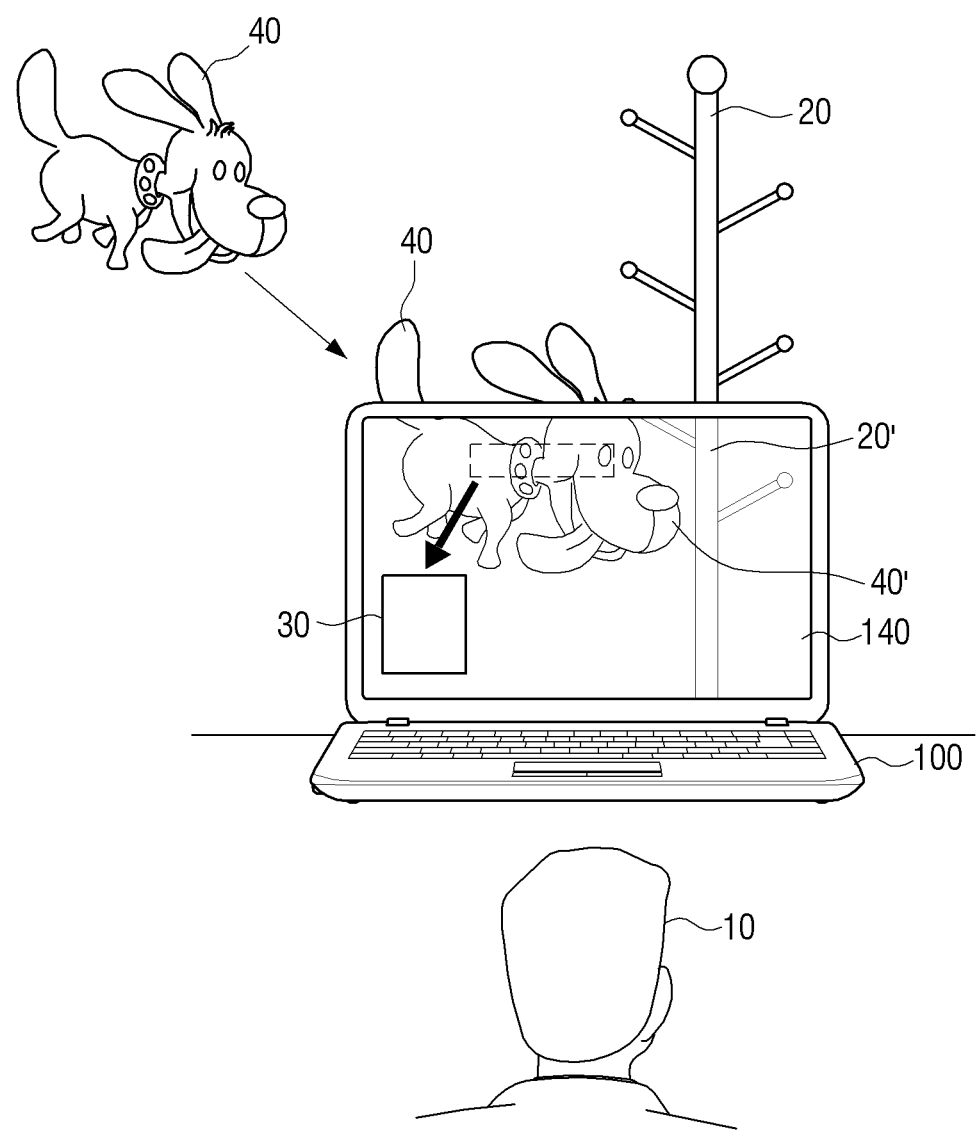
FIG. 16 is a view provided to explain movement of an object.

FIG. 16 illustrates an example in which a new object enters the user's view. Referring to FIG. 16, if the new object 40 moves into view, and thus overlaps with the position of displayed information 30, the position of displaying information 30 is again changed to another position. The form of displaying information 30 may also be changed to suit the form and position of the areas where visibility is not deteriorated. Referring to FIG. 16, the form of displaying information 30 is changed from the horizontally elongated rectangle to the vertically elongated rectangle.

The transparent display apparatus 100 may postpone determination of interference in the transmissive area as long as the new object 40 moves. The transparent display apparatus 100 may determine the transmissive area if movement of the new object 40 is not detected for a more than a predetermined time (e.g., 5 sec).

Figure 17:
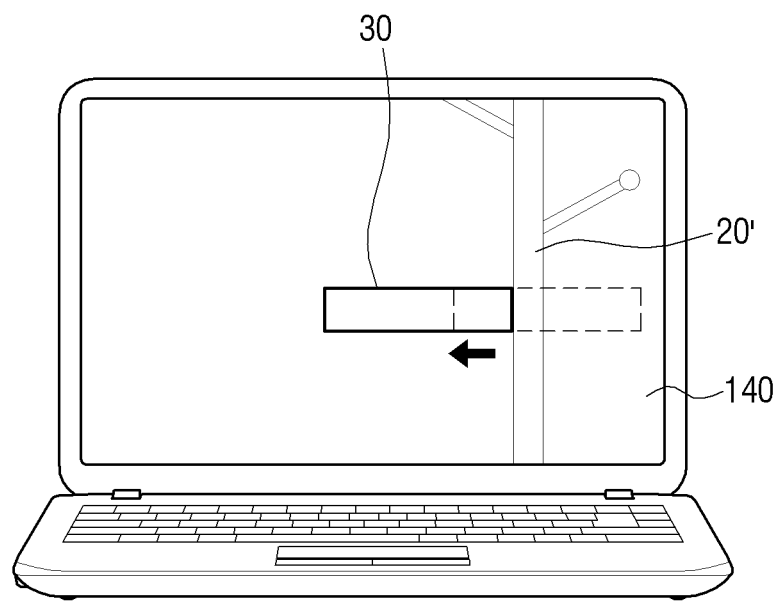
FIG. 17 is a view provided to explain displaying information overlap.

FIG. 17 is a view provided to explain displaying information overlap. Referring to FIG. 17, if only part of the information 30 overlaps the transmissive area 20', the transparent display apparatus 100 may move the information 30 a distance corresponding to the width of such overlapping area. The direction of movement may be towards an area of the information 30 that does not overlap the transmissive area 20'. Since the right portion of the information 30 overlaps the transmissive area 20' in FIG. 17, the position of the information 30 may be adjusted in the leftward direction.

As illustrated in FIG. 17, the movement direction of the displayed information may be determined depending on the overlapping within the transmissive area 20'. For example, if the information 30 is completely included within the transmissive area 20', the movement direction may be determined by considering distances from the respective boundaries of the transmissive area 20' to the information 30. By way of example, if the information 30 is displayed closest to the lower boundary of the transmissive area 20', the movement direction may be a downward direction. Further, the distance of the movement may be determined to be greater than a distance from the lower boundary of the transmissive area 20' to the upper boundary of the information 30.

Alternatively, the direction of moving the displayed information may be determined based on various reference points, including reference to the object, the user, the display, or the field of vision.

For example, if the movement direction is determined with reference to the object, the movement direction may first be set to be one of the upper, lower, leftward, rightward, left-upper, left-lower, right-upper, right-lower directions from the transmissive area. The other directions may be prioritized. If no space is available in the direction of the highest priority, then the movement direction may be the direction of the second-highest priority. If the information 30 and the transmissive area 20' overlap as illustrated in FIG. 17, even when the rightward direction is set to a highest priority, the information 30 may not be moved right because of a lack of space in the right direction. In this case, if the movement direction having the second-highest priority is the leftward direction, the movement direction may selected as the leftward direction, as illustrated in FIG. 17.

If the movement direction is determined with reference to the position of the user, the priority may be set based on the directions of the user with reference to the transmissive area. In one exemplary embodiment, the priority may be set for lower, leftward, rightward, left-upper, left-lower, right-upper, and right-lower directions. Accordingly, it is first considered that the position is moved in the direction having the highest priority, but if the movement is impossible due to lack of space in that direction, movement is determined according to the priority order.

Alternatively, the position of displayed information may be moved with reference to priorities set based on an absolute direction on the display surface of the transparent display 140, or if the field of vision of vision of the user is taken into consideration, the movement direction may be set to one of upper, lower, leftward, rightward, left-upper, left-lower, right-upper, right-lower directions.

Alternatively, instead of setting the transmissive area as the reference, the entire display surface may be set to be the reference, in which case the position for displaying information may be moved to the upper, lower, leftward or rightward edge, or to the respective corners.

Meanwhile, the layout of the information may change accordingly, if the size and shape of the changed area for displaying information are different from those of the original area at which the information was originally displayed.

Figure 18:
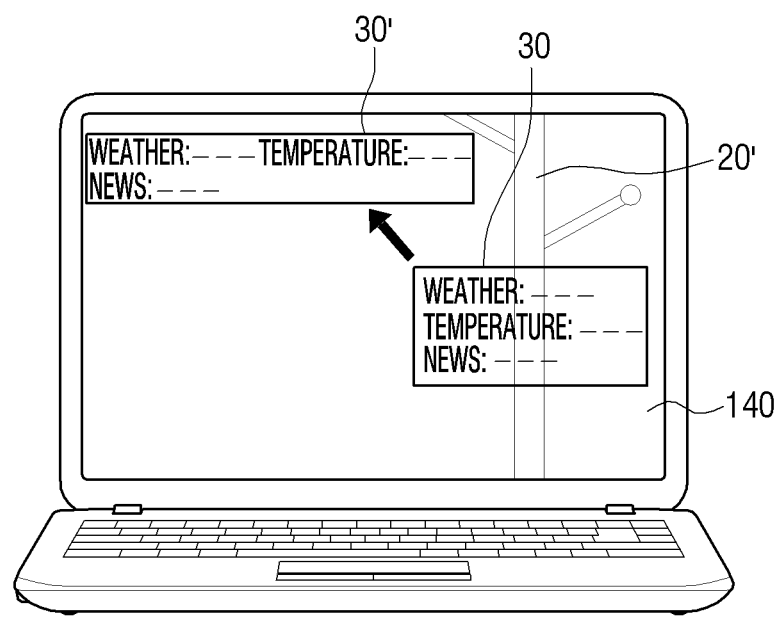
FIG. 18 is a view provided to explain changing a layout of information.

FIG. 18 illustrates a method for changing layout of the information 30 according to the size and shape of the area in which the visibility of the information 30 is not deteriorated. Referring to FIG. 18, if the transmissive area 20' and the information 30 overlap so that the information 30 is moved to the upper-most portion on the left side, the current size and shape of the information 30 may be different. In this case, the size and shape of the information 30 may be changed to suit the size and shape of the new position, with the layout within the information 30 being changed to new information 30'.

The position of the displayed information may also change according input of the user.

If the transparent display apparatus 100 is implemented as a laptop computer, the position of the user may not significantly change. That is, a user of the laptop computer is usually within a close distance to the front side of the laptop computer. Accordingly, the transmissive area may be estimated without having to detect the position of the user. Likewise, the position of the user may be less meaningful in the devices with relatively compact-sized devices and which are used at a close distance, such as cameras, mobile phones, PDAs, MP3 players, electronic books, or electronic notes. In the above examples, the second sensor may be omitted. In this case, the transparent display apparatus 100 may photograph an object behind the transparent display apparatus 100 to determine position and distance of the object, and thus estimate the transmissive area. Further, the information may be displayed in consideration of the estimated transmissive area. In one exemplary embodiment, the transparent display apparatus 100 may be equipped with a camera to photograph the user for the purpose of telephony or the like, in which case it is possible to estimate the transmissive area by sensing the position of the user or gaze direction of the user using the camera.

The transparent display apparatus 100 may be implemented as a bulletin board, a billboard, or kiosk installed at places with high population of people. In this case, it would be difficult to change the status of displaying information by responding to every movement of the passers-by. Accordingly, in areas where many people may be present, the transparent display apparatus 100 may apply algorithms to determine a person among many people that is viewing the transparent display apparatus 100. The transparent display apparatus 100 may determine one or more persons viewing the transparent display apparatus by tracking a user's movement, a user's head movement, or a user's eye movement. When a user views the transparent display apparatus 100, and another user passes between the user and the transparent display apparatus 100, it may be presumed that the user continues to view the transparent display apparatus 100.

The transparent display apparatus 100 may prioritize between the one or more persons, and display information according to the priority. Information for a highest priority user may be displayed at a central position or in a largest font, and information for a lower priority user may be displayed at edges of the transparent display apparatus 100 or in smaller font.

If two people are determined to view the transparent display apparatus 100, a closest viewer may be prioritized or viewers within an effective space of the transparent display apparatus 100 may be prioritized. The effective space may be a space at which information is viewable based on size of font, or a space in which both information and a product behind the transparent display apparatus 100 may be accurately viewed. Alternatively, a viewer that views the transparent display apparatus 100 for a longer or shorter time may be prioritized. A most recent viewer may be prioritized, or viewers may be prioritized according to a product. For example, a man who views a sports item positioned behind the transparent display apparatus 100 may be prioritized over a woman, and a woman who views a dress positioned behind the transparent display apparatus 100 may be prioritized over a man.

Figure 19:
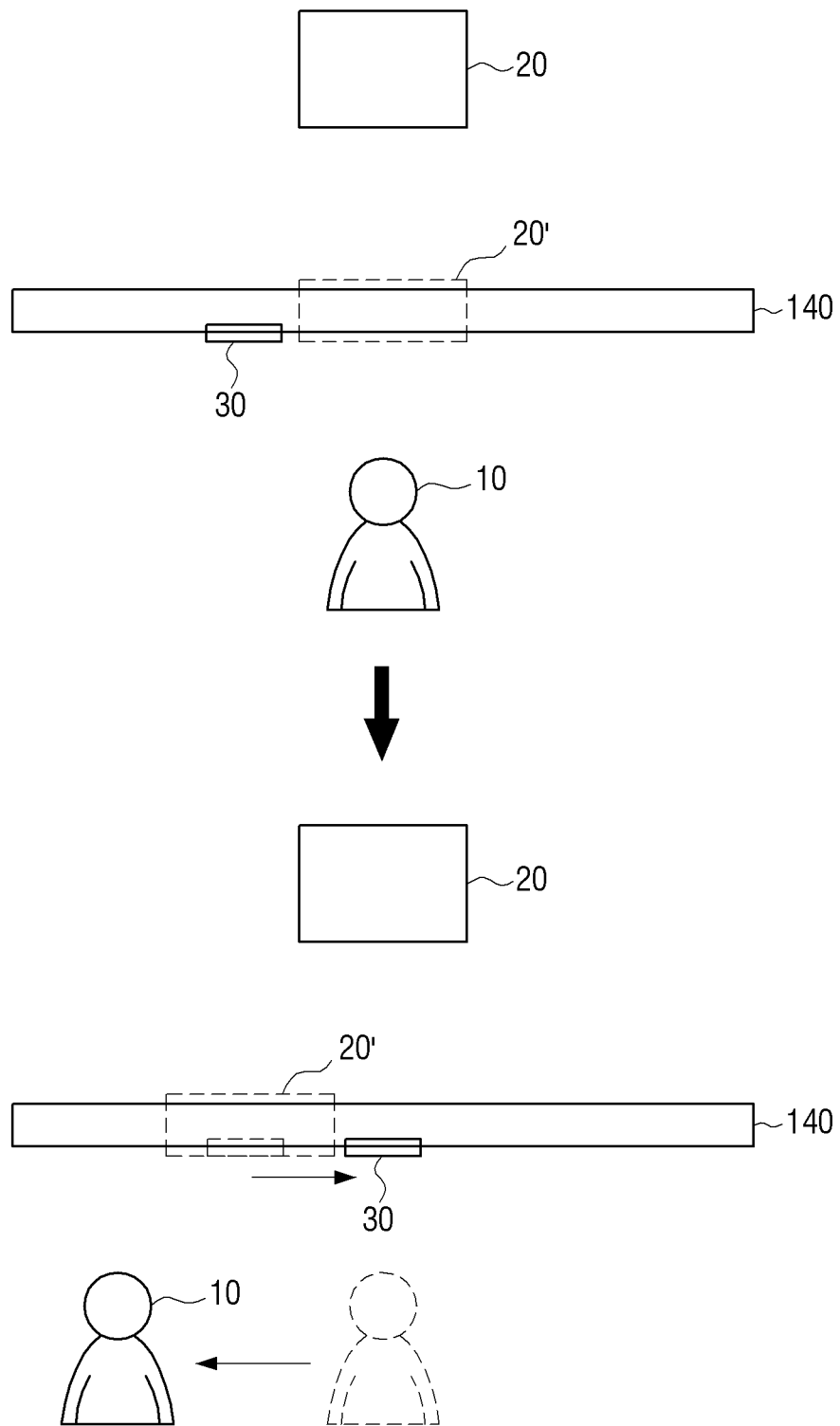
FIG. 19 is a view provided to explain an embodiment in which displayed information moves according to movement of a user.

FIG. 19 illustrates an example in which the position of displayed information is changed in consideration of the movement of users.

Referring to FIG. 19, if the user 10 is in front of the object 20 with the transparent display 140 interposed therebetween, the information 30 may be displayed on one side of the transmissive area 20'.

In this state, if the user moves to a certain direction, the transmissive area 20' changes according to the user's position. Accordingly, as the area which originally displays the information 30 overlaps with the transmissive area 20', the position of the displayed information 30 changes again. Changing the position of displaying information 30 may not be executed, if the user continues moving, but waits until the user stops moving.

Figure 20:
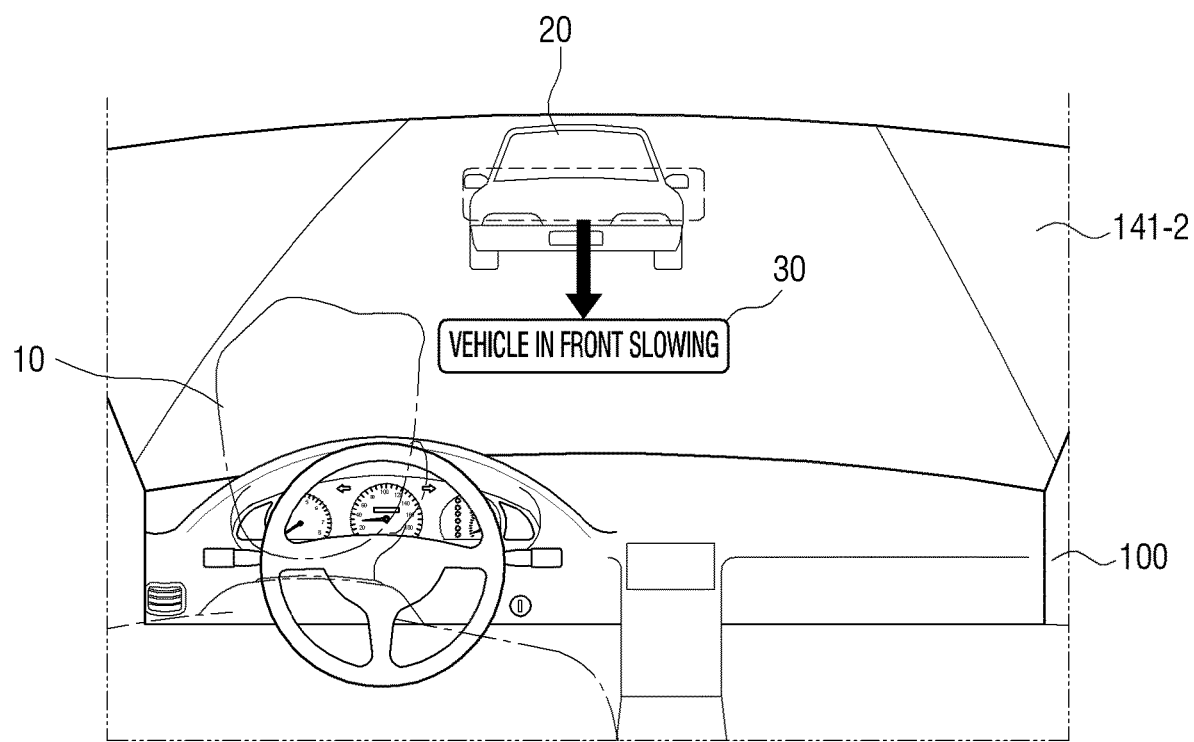
FIG. 20 is a view provided to explain an operation of a transparent display apparatus implemented in a vehicle.

FIG. 20 illustrates an example in which the transparent display apparatus 100 is implemented in a vehicle. To be specific, the transparent display 140 is implemented on the front glass of the vehicle.

Referring to FIG. 20, information appears on the front glass while the user 10 drives the vehicle. The information 30 in one exemplary embodiment may be information related to condition of the vehicle, a driving condition, the surrounding environment, etc. For example, GPS information, fuel status, speed, RPM, traffic, or other vehicle information may be displayed on the front glass.

The transparent display 140 of FIG. 20 may be implemented as a projection type, as illustrated in FIG. 4. In this case, the front glass of the vehicle may be a transparent screen 141-2. The transparent display apparatus 100 may determine the transmissive area based on the area of the front glass through which the object 20 in front of the vehicle is seen, and display the information 30 away from the transmissive area. In the case of the vehicle, the transparent display 140 (i.e., front glass) may be small size since the user generally maintains a fixed posture in the driver's seat and movement of the user is not significant. Further, the second sensor for sensing the position of the user may be omitted. Accordingly, the transmissive area may be determined by considering only the position of the object 20 relative to the glass 141-2.

Alternatively, the second sensor may be provided, in which case the second sensor may trace the gaze of the user and the position of displayed information 30 may be moved according to the user's gaze. In this case, the second sensor 120 may photograph a facial area of the user using the second photographing unit 121, which may be arranged on a room mirror, or above driver's seat, or on glasses worn on the user. The photographed images may then be analyzed using image processing technique, to detect the iris area of the user. The changes in the position of the iris area may be followed to determine the gaze of the user. If the gaze of the user is determined, the controller 130 may display the information 30 on a position that suits the determined direction of the gaze.

Figure 21:
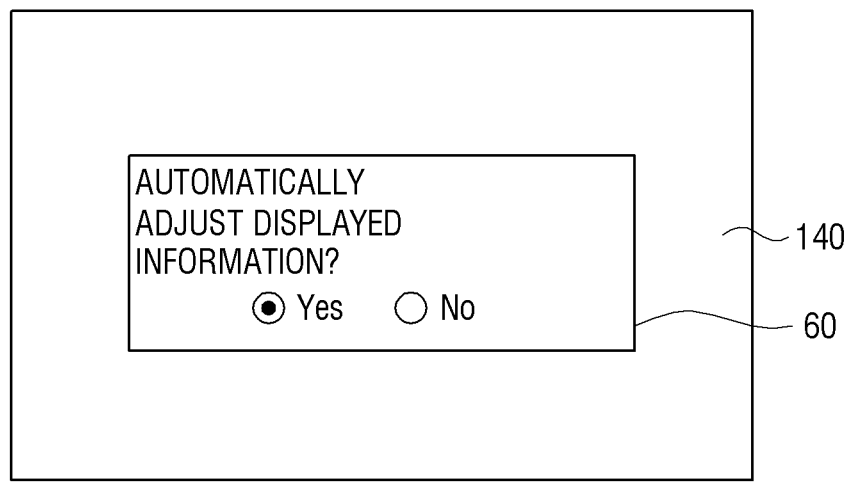
FIG. 21 illustrates a setup screen, according to an exemplary embodiment.

Meanwhile, in various exemplary embodiments, the transparent display apparatus 100 may selectively adjust the position of displayed information depending on a user's. FIG. 21 illustrates an example of a setup screen.

FIG. 21 illustrates a user interface (UI) screen 60 for setting a function to control the transparent display 140. Although FIG. 21 only illustrates the menu to enable or disable the adjusting function, other menus, such as a menu for setting conditions for executing the adjusting function or setting attributes of displaying information, may also be displayed on the UI screen 60 for the selection by the user. For example, the user may select a duration the information is displayed in the transmissive before adjusting the position of the displayed information, a distance the displayed information will be moved, and an adjustment of the size, shape, color, font, thickness. The user may set the above-mentioned settings for every application that displays information.

If the input 160 is implemented as a touch screen, the user may directly touch the UI screen 60 to set the function. The settings made by the user may be stored in the storage 150.

Accordingly, the transparent display apparatus 100 may execute the function of moving the displayed information according to the pre-stored settings in the storage 150, when an application is executed to display information.

Figure 22:
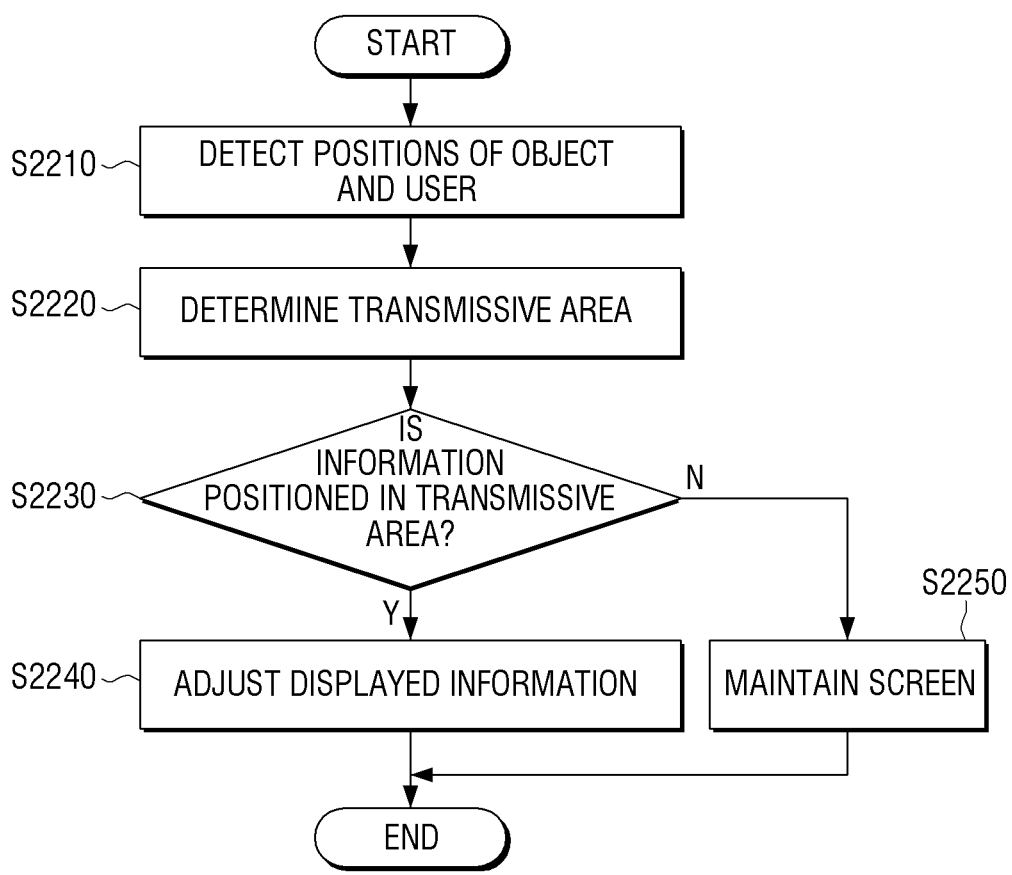
FIGS. 22 and 23 are flowcharts provided to explain operations of displaying information on a transparent display apparatus according to an exemplary embodiment.

FIG. 22 is a flowchart provided to explain a method of displaying information on a transparent display apparatus according to an exemplary embodiment.

Referring to FIG. 22, at S2210, the position of the object and the position of the user are sensed, and at S2220 the transmissive area is determined with reference to the sensed positions.

The positions of the object and the user may be sensed based on the photographed images of the object and the user, or alternatively, may be sensed by sensing intensities of the light passing the transparent display using a separately provided optical sensor.

The transmissive area may be determined based on an intersection area or a union area between the area on the transparent display 140 through which the object is seen, and the area where the user matches the transparent display 140. As explained above, the matrix table may be used to determine the transmissive area.

At S2230, the transparent display apparatus may determine whether the information is included in the transmissive area. To be specific, the position for displaying information may be matched with the matrix table, and the matching cells and the cells corresponding to the transmissive area may be compared with each other so that it is determined that the information is included in the transmissive area if there is at least partial overlapping of the cells.

Accordingly, at S2240, if the information is determined to be within the transmissive area in step S2230-Y, the transparent display apparatus may move the position for displaying information to another area. To be specific, cells that are not matched with either of the object or the user within the matrix table are determined, and the cells closest to the current position of displaying information are sensed, and the information is displayed on the area corresponding to the sensed cells. Alternatively, as discussed above, the displayed information may instead be adjusted in size, transparency, color, or otherwise adjusted to minimize impact of the object on the displayed information in the transmissive area. The displayed information might be both moved in addition to a property of the displayed information being adjusted.

On the contrary, at 52250, if the information is not included in the transmissive area in step S2230-N, the information is displayed without adjustment.

As a result, since conflict between the displayed information and the object in the transmissive area is minimized, the transparent display apparatus 100 can provide increased visibility of the information.

Figure 23:
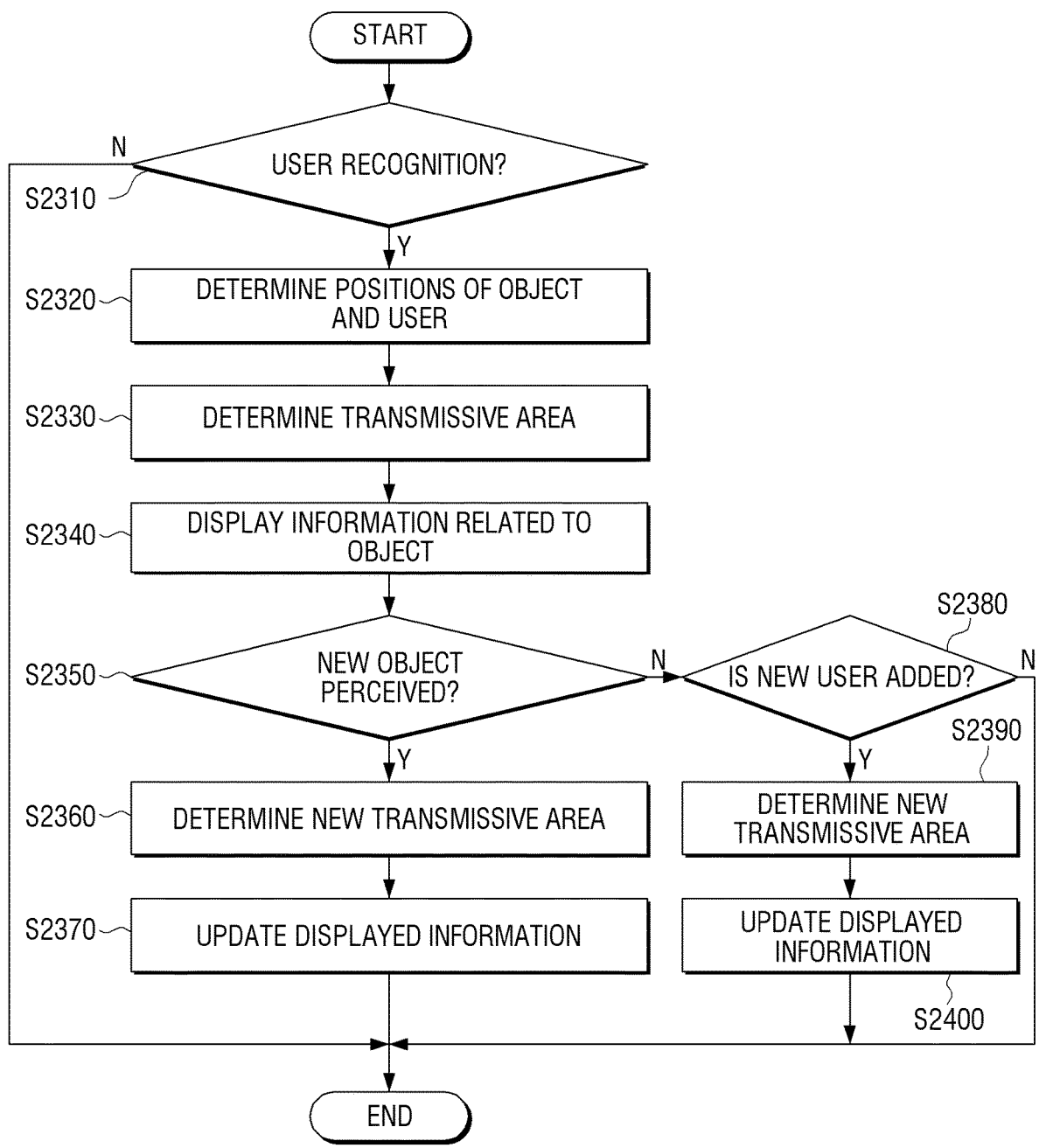

FIG. 23 is a flowchart provided to explain a method of displaying information on a transparent display apparatus according to an exemplary embodiment.

Referring to FIG. 23, the transparent display apparatus 100 does not display any information unless sensing a user in the vicinity. The transparent display apparatus 100 may display the information related to the object upon sensing a user.

According to the display method of FIG. 23, at S2310, if sensing that a user moves to the vicinity, at S2320, the position of the object and the position of the user are determined.

At S2330, the transmissive area is determined based on the positions of the object and the user. Since the methods for determining positions and transmissive area are explained above, explanation thereof will be omitted for the sake of brevity.

At S2340, the transparent display apparatus 100 displays the information related to the object in the vicinity of the transmissive area. The information may be related to the object and may be previously set. For example, if implemented on a show window of a shop, the transparent display apparatus 100 may display a name, a price, or specification of the object. If the transparent display apparatus 100 has a communication function, the information related to the object may be received from a server connected via a network.

At S2350-Y, if a new object is perceived in the field of view of the user through the transparent display apparatus 100 due to movement of the user or movement of the new object, at S2360, the transparent display apparatus 100 determines the transmissive area of the user and the new object.

Accordingly, at S2370, if the new transmissive area and the position of displayed information overlap, the position of the displayed information is changed, and new information about the new object may be additionally displayed on an area which does not overlap with the transmissive area of the user and the original object or the transmissive area of the user and the new object.

At S2390, if no new object perceived in step S2350-N, but there is a new user added in step S2380-Y, at S2400, the transmissive area for the object and the new user is determined when the new user views the object.

At S2400, the displayed information is updated so as not to overlap with the transmissive area of the object and the new user. If the original user and the new user both view the object, the displayed information may be adjusted based on the transmissive area of the object and the original user and the transmissive area of the object and the new user.

If a new object or a new user is detected for a short amount of time less than a preset threshold time, then the displayed information may be maintained.

As explained above, the transparent display apparatus may display information at an appropriate position or move the position of displaying information by adaptively responding to the position of the user or the object. Alternatively, as discussed above, the displayed information may instead be adjusted in size, transparency, color, or otherwise adjusted to minimize impact of the object on the displayed information in the transmissive area. The displayed information might be both moved in addition to a property of the displayed information being adjusted.

Although the position of displayed information may be changed when the information is included in the transmissive area in various embodiments, other modified exemplary embodiments are also possible. To be specific, since the nature of the transparent display apparatus 100 is to allow the object seen therethrough, while also displaying information thereon, the transparent display apparatus 100 may sometimes need to transparently display the object therethrough, while displaying the information in an overlapping manner with the position of displaying the object. Taking a large-sized map for example, in order to display information to locate a certain area on the map, the area through which object is seen and the position of displayed information will generally overlap. The method of increasing visibility in the above case will be explained below with reference to FIG. 24.

Figure 24:
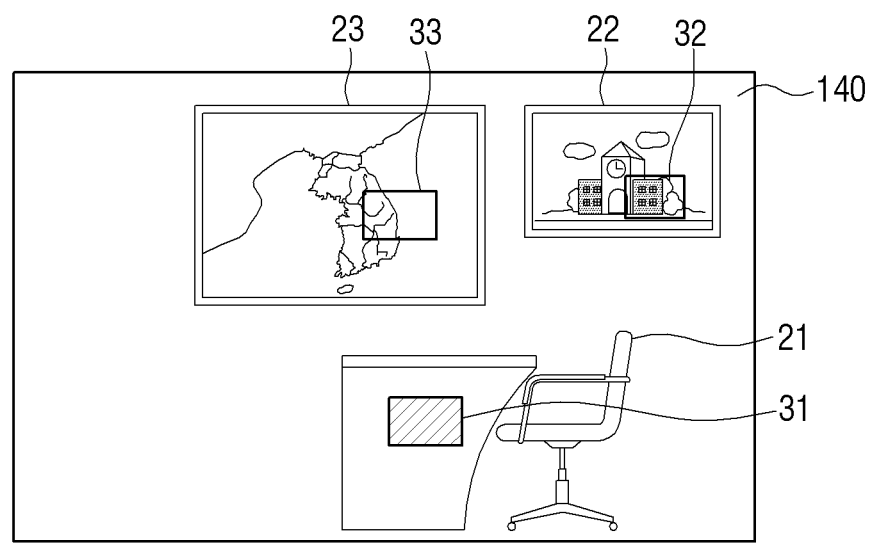
FIG. 24 is a view provided to explain an operation of a transparent display apparatus according to an exemplary embodiment.
Figure 24:
Figure 24:
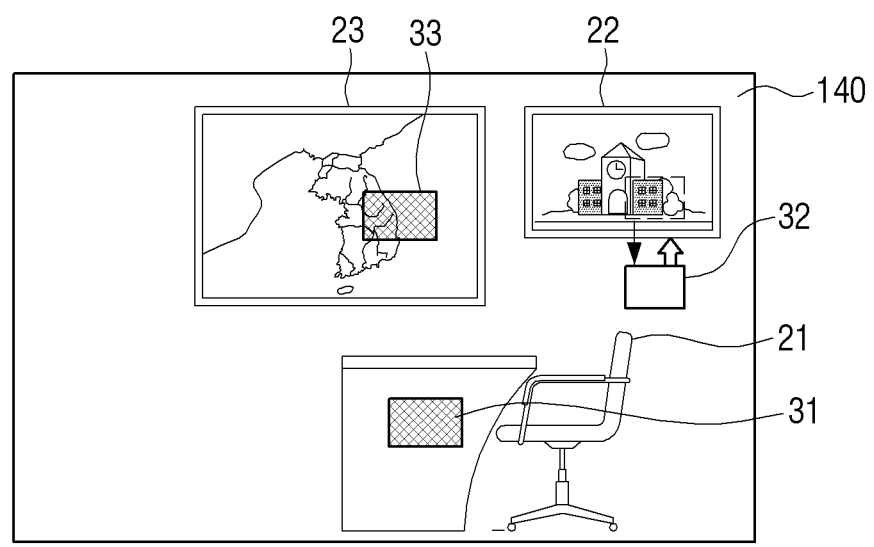

FIG. 24 is a view provided to explain an operation of a transparent display apparatus according to an exemplary embodiment.

Referring to FIG. 24, there are a plurality of objects 21, 22, 23 behind the transparent display apparatus 140, and the information 31, 32, 33 corresponding to the respective objects displayed.

The transparent display apparatus of FIG. 24 improves visibility by moving the position of displayed information or changing attributes of displayed information according to the type and characteristics of the objects.

Referring to FIG. 24, concerning the object 21 in single color, whether or not visibility is deteriorated is determined by analyzing the attributes of the object 21 and the information 31, and the status of displaying the information 31 may be changed according to the result of determination. If the object 21 is in red color, and if the color of the information 31 is in red or similar color and included in the transmissive area, it is determined that the visibility deteriorates. Accordingly, the attributes of displayed information 31 may be changed. In one exemplary embodiment, the color may be changed to complementary color to that of the object 31.

Further, both color and position may be changed instead of changing color alone. On the contrary, if the object 20 and the information 30 are different colors from each other, the attributes of the displayed information 30 may remain even when the information 30 is included in the transmissive area.

Further, if the object is a map 23, the position of displaying information 33 overlapping with the map 23 may not be moved, but changed to primary color with higher visibility to thus increase visibility.

If the object is a picture 22 or wallpaper splashed with colorful patterns, the position of displaying information 32 overlapping with the object may be changed to another area.

To this purpose, a manager may determine respective objects in the back that should not be obscured by information, determine whether or not to perform movement of position of displaying information for the objects, and set whether or not to change the attributes of displayed information associated with the objects.

Referring to FIG. 24, reference areas of the objects 21, 22, 23 may be set based on the areas which are viewed when the transparent display 140 is viewed from a front direction at an exactly matching position and height. The candidate areas may be set including the reference areas added with margins in upper, lower, leftward and rightward directions. The margins may be added in consideration of the horizontal and vertical lengths of the transparent display 140, and the positions of the reference areas on the entire area of the transparent display 140, differently on the upper, lower, leftward and rightward directions. That is, if distance to the boundary on the right side is two times longer than distance to the boundary on the left side, the right-side margin may be at least two times greater than the left-side margin. If the candidate areas with respect to the respective objects are set, it is determine whether or not to move the position of displayed information from the candidate areas or to change the attributes of displayed information.

Alternatively, the transparent display apparatus 100 may detect the edge of the object sensed on the background image and determine if there is more than a threshold number of areas in size exceeding a predetermined area and in different colors from each other within the sensed edge. That is, the transparent display apparatus 100 may detect whether the object is colorful or not. For example, if the threshold number is set to 5, the information displayed on the picture of wallpaper including five or more colors may be changed, or otherwise, the attributes of displaying may be changed to maintain visibility. Taking an instance of a map, it may be determined to change the attributes of displayed information, considering that the names or lines on the map are generally below a predetermined size, while the overall color is constant.

As explained above with reference to FIG. 24, since it is possible to adaptively move the position of displayed information or change attributes of displayed information by considering characteristics of the information and the object, the utilization of the transparent display apparatus 100 is increased. Meanwhile, although only the color is explained above with reference to FIG. 24, one will understand that it is also possible to change attributes such as shape, size, thickness, transparency, brightness, or font, and the like.

The transparent display apparatus 100 may additionally display new information, in addition to the operation of moving the position of displayed information according to the position of the user.

Figure 25:
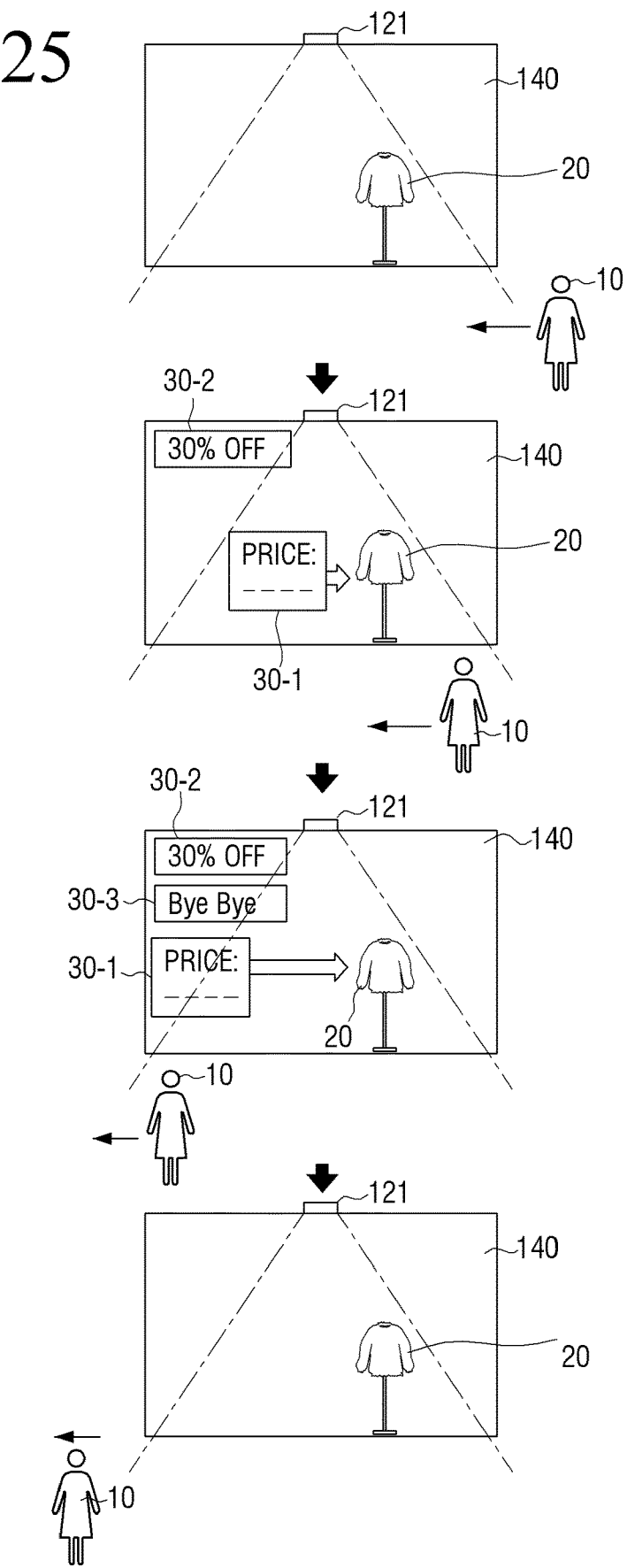
FIG. 25 is a view provided to explain an operation of a transparent display apparatus according to an exemplary embodiment.

FIG. 25 is a view provided to explain an operation of a transparent display apparatus according to an exemplary embodiment. Referring to FIG. 25, the transparent display apparatus may display various information or move displayed information to intrigue the user.

Referring to FIG. 25, if the user 10 is not sensed, the transparent display apparatus 100 does not display any information. If an object 20 is not detected, the transparent display apparatus 100 may not display information. Alternatively, information may be displayed when one of the user 10 and the object 20 is detected, or only when both the user 10 and the object 20 are detected.

Then, as the user 10 enters the detection range of the transparent display apparatus 100, information 30-1 including explanation about the currently-displaying product 20 is displayed in the vicinity of the product 20. At the same time, information 30-2 including advertisement phrases may be displayed on a predetermined area of the transparent display 140. Unlike the information 30-1 including explanation, the information 30-2 including advertisement phrases may be flickered or periodically displayed with different display attributes to intrigue the user.

If the user 10 continuously moves within the detection range of the transparent display apparatus, the positions of displayed information 30-1, 30-2 are changed according to the movement of the user. Referring to FIG. 25, the information 30-1, 30-2 may be moved to the area on the transparent display 140 in a direction the user is moving, so that the user is able to see the information 30-1, 30-2 even at an angle that the user does not accurately see the product 20.

If the transparent display apparatus 100 determines that the user will exit the detection range of the transparent display apparatus 100 in consideration of the direction the user is moving, new information 30-3 suitable for such event may additionally be displayed.

If it is determined that the user 10 exits the range of photography, the transparent display apparatus 100 may remove the information 30-1, 30-2, 30-3 from the display 140. Although the information 30-1, 30-2, 30-3 is removed in FIG. 25, alternative examples are also possible. For example, the information 30-2 may be fixed at a reference position.

As illustrated in FIG. 25, the transparent display apparatus 100 may be implemented in shops and utilized in various manners.

Meanwhile, in various exemplary embodiments, information input by a user, information received from an external device, or information according to implementation of an application may be displayed as the 'information' 30, but is not limited thereto. Accordingly, if user information is acquirable, the information related to the user information may also be displayed as the 'information'.

Figure 26:
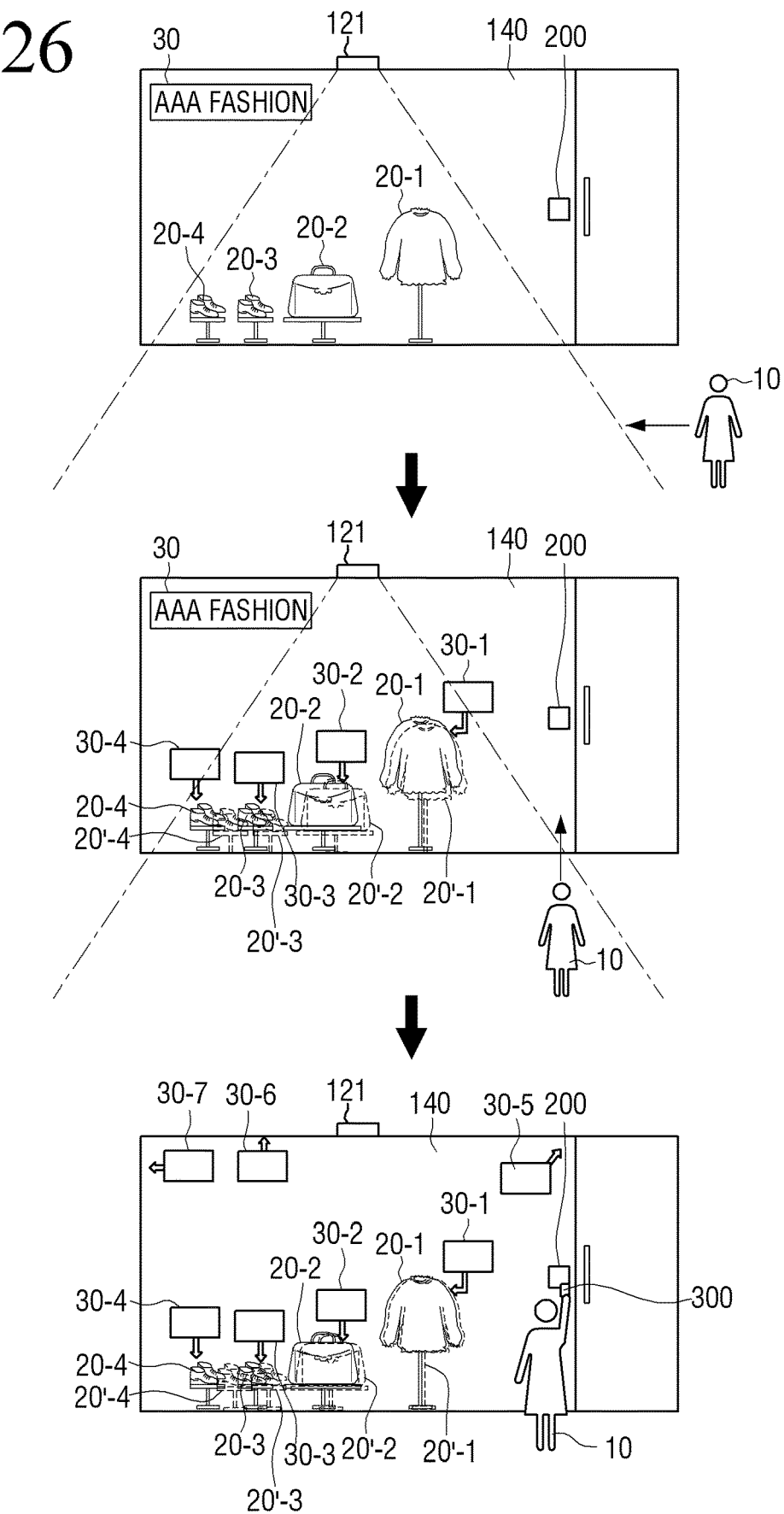
FIG. 26 is a view provided to explain displaying information according to user information.

FIG. 26 is a view provided to explain an exemplary embodiment in which the transparent display apparatus receives user information and adaptively displays information corresponding to the received information.

Referring to FIG. 26, the transparent display apparatus 100 may additionally include a short-range wireless communication module 200. The short-range wireless communication module 200 may be implemented as a module including a short-range wireless communication tag, short-range wireless communication reader, or both. In one exemplary embodiment, a near field communication (NFC) module may be used.

Referring to FIG. 26, the transparent display apparatus 100 may be implemented in a show window where a plurality of goods 20-1, 20-2, 20-3, 20-4 are displayed. The transparent display 140 (i.e., show window) may display information 30 including the advertising phrases. The information 30 may be continuously displayed even when the user 10 is not within a detection range of the transparent display apparatus 100.

If the user 10 enters the detection range of the transparent display apparatus 100, information 30-1, 30-2, 30-3, 30-4 corresponding to the goods is displayed in the vicinity of areas 20'-1, 20'-2, 20'-3, 20'-4 on the transparent display 140 through which the respective goods 20-1, 20-2, 20-3, 20-4 are viewed. The position of displayed information 30-1, 30-2, 30-3, 30-4 may be changed according to the movement of the user 10.

If the user 10 tags his own user terminal 300, equipped with NFC module, to the NFC module 200, the user information is sensed. The NFC module 200 equipped in the transparent display apparatus 100 may be a NFC reader, and the NFC module 200 equipped in the user terminal 300 may be an NFC tag.

If the user information is provided from the user terminal 300 according to the NFC method, the transparent display apparatus 100 utilizes the provided user information to display various types of information on the transparent display 140.

By way of example, if the user, who holds a user terminal 300 or a card equipped with NFC module therein, approaches to a range of communication and tags with the NFC module 200, the user information included in the NFC module is received. The user information may include identification information such as a name, an ID, a gender, or an age, etc. of the user.

The transparent display apparatus 100 may request a server for information matching the received user information. Accordingly, a shopping history, a wish list previously selected by the user, or job a of the user may be received. Using the additional information received from the server and the identification information sensed at the NFC module, the transparent display apparatus 100 may determine goods in which the user may be interested.

If determining that there is a product that would be interesting for the user among the displayed products on the show window, the information including an explanation about the corresponding product may be displayed on the transparent display 140 (i.e., on the show window).

On the contrary, if the transparent display apparatus 100 determines that the product that may be interesting for the user is not displayed on the show window, the transparent display apparatus 100 may display information including information about a corresponding product on the transparent display 140 (i.e., on the show window).

Referring to FIG. 26, the information 30-5, 30-6, 30-7 on the products in the shop, but not in the show window, may be newly displayed, in addition to the information 30-1, 30-2, 30-3, 30-4 related to the displayed products 20-1, 20-2, 20-3, 20-4. The newly displayed information 30-5, 30-6, 30-7 may include an arrow mark to indicate the location of the corresponding product inside the store.

To this purpose, the storage 150 of the transparent display apparatus 100 may store brief explanations about the products in the inventory of the shop, information regarding a location of the product, or information regarding attributes to represent the information. These groups of information may be categorized according to various criteria including hobbies, specialties, jobs, etc. Accordingly, the controller 150 may search for information within each group as mapped to the additional information on the user and display the result.

As an alternative to the examples explained above, the additional information itself may be directly provided from the user terminal 300, in which case the additional information may be directly utilized so that the related information may be displayed on the transparent display 140.

If the new information is additionally displayed, the originally displayed information 30-1, 30-2, 30-3, 30-4 may be either deleted, adjusted, or moved so that some of the information 30-1 may not overlap with the new information 30-5. Changing position of the information may be performed based on the matrix table constructed in the manner explained above. That is, the positions of the information may be also recorded in the matrix table for use as a reference when the movement of the information is performed.

Further, although in some exemplary embodiments the user information may be confirmed using the NFC module, the transparent display apparatus 100 may receive user information from the user terminal using other wireless communication manners including WiFi, Blutooth, Zigbee, etc. In this case, the user information may additionally include shopping history, or a wish list in addition to the identification information, such as a user name, an ID, or a social security number.

As explained above, the transparent display apparatus 100 may include not only the general on screen display (OSD) message and graphic image, but also the screens of executing various applications, content reproduction screens, or web pages. The controller 130 may generate the information by executing the previously stored various applications.

For example, concerning the content playing screen, the controller 130 may read out the content data stored at the storage 150 or receive the content data from an external source. The controller 130 may then perform decoding, rendering, or scaling in sequence on the content data to generate the content playing screen.

If the transparent display 140 is implemented as a transparent OLED, the controller 130 may turn on and off the transparent thin layer transistors provided at the respective cells inside the transparent display 140 according to the generated content playing screen to express the respective pixels of the content playing screen. As explained above with reference to various exemplary embodiments, to move the position of displayed information, the controller 130 may differently change the pixel coordinates to display the content playing screen so that the content playing screen is displayed on the changed position. On the contrary, in order to change the attributes of displayed information, the controller 130 may change the same using a renderer or a scaler. The detailed constitution of the transparent display apparatus 100 including the controller 130 will be explained below with reference to FIG. 27.

Figure 27:
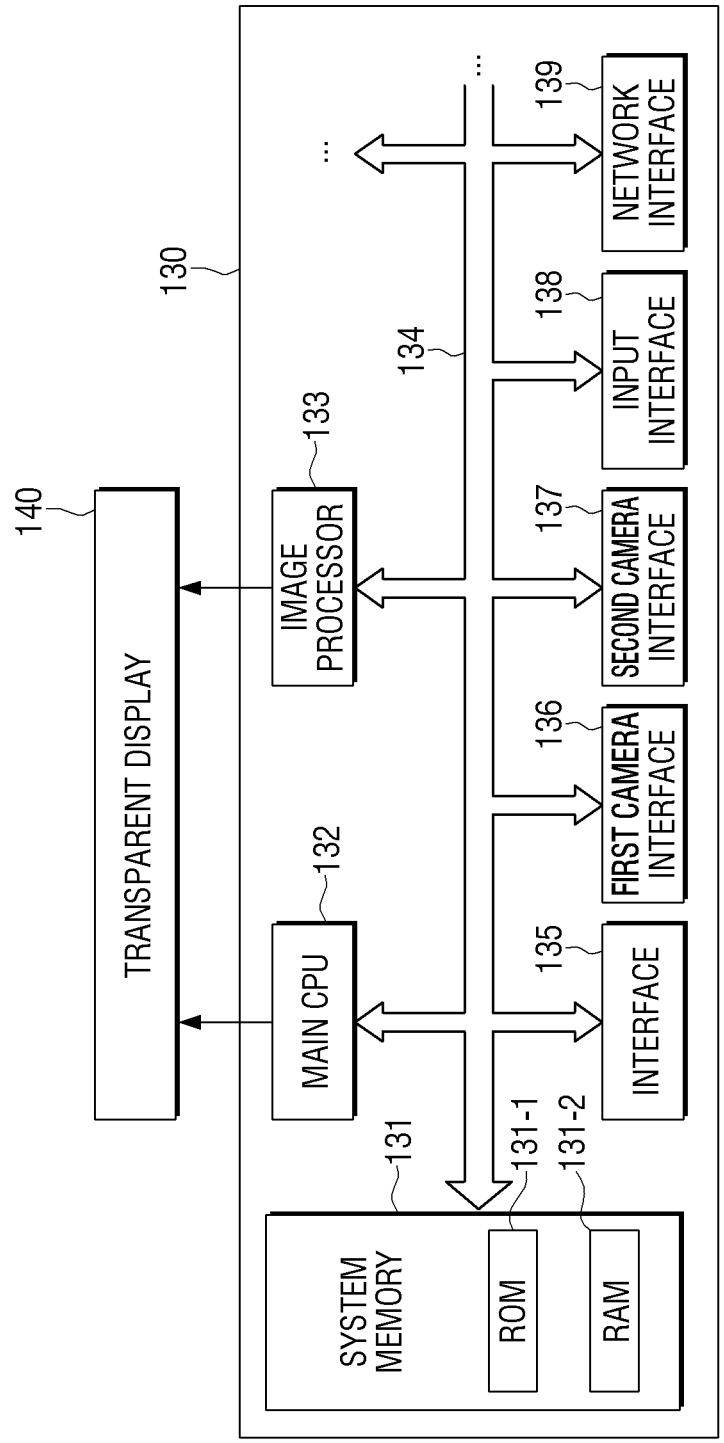
FIG. 27 is a detailed block diagram of a controller of a transparent display apparatus according to an exemplary embodiment.

FIG. 27 illustrates a detailed constitution of the controller 130 employed in the transparent display apparatus 100 according to an exemplary embodiment. Referring to FIG. 27, the controller 130 may include a system memory 131, a main CPU 132, an image processor 133, a system bus 134, an interface 135, a first camera interface 136, a second camera interface 137, an input interface 138, and a network interface 139.

The system memory 131, the main CPU 132, the image processor 133 and the various interfaces 135, 136, 137, 138, 39 may be connected to each other via the system bus 134 to transmit and receive data or signals.

The interface 135 may be connected to the storage 150 to transmit and receive various programs, contents, or data. In one exemplary embodiment, if the user inputs a command to check the content stored at the storage 150, the main CPU 132 may access the storage 150 via the interface 135, generate a list of stored contents, and display the generated list on the transparent display 140. If the user selects content and inputs a command to play back the same, the main CPU 132 executes a content play program stored in the storage 150. The main CPU 132 may control the image processor 133 according to the command included in the content play program to construct the content playing screen.

The image processor 133 may include a decoder, a renderer, or a scaler, etc. Accordingly, the image processor 133 may decode the stored content, render the decoded content data to construct frames, and scale the size of the constructed frames to suit the information displaying area.

In the event of having to move the position of displayed information, as explained above, the main CPU 132 changes the pixel coordinate value to display the frames generated at the image processor 133. The information is then displayed on the display area corresponding to the changed pixel coordinate value, on the transparent display 140.

The first and second camera interfaces 136, 137 may be connected to the cameras, respectively. In some exemplary embodiments, the first and second sensors 110, 120 may detect the position of the object and the position of the user, respectively. However, in an alternative exemplary embodiment, the first and the second sensors 110, 120 may be implemented as the cameras. That is, the main CPU 132 may receive input of the photographed images captured at the respective cameras via the first and second camera interfaces 136, 137 and execute an image analysis program stored in the storage 150 to determine the positions of the object and the user included in the respective images.

The input interface 138 may be connected to the input 160 to receive various signals input by the user. Referring to FIG. 27, one input interface 138 is illustrated. However, if the input 160 includes various input tools, such as keyboard, mouse or joystick, the number of input interfaces 138 may correspond to that of the input tools. The main CPU 132 may display the information on the transparent display 140 according to a user signal input via the input interface 138 or perform the operation of displaying UI screen 60 to set up the function of displaying information.

The network interface 139 is connected to the external devices via the network. If the web browser program is executed, the main CPU 132 may access the web server via the network interface 139. If the web page data is received from the web server, the main CPU 132 may control the image processor 133 to construct a web page screen and display the constructed web page screen on the transparent display 140.

The system memory 131 may include a ROM 131-1 and a RAM 131-2. The ROM 131-1 may store a set of commands for system booting. If power is supplied, according to the commands stored at the ROM 131-1, the main CPU 132 may copy the O/S stored at the storage 150 onto the RAM 131-2 and boot the system by executing the O/S. Upon completion of booting, the main CPU 132 copies various application programs stored at the storage 150 onto the RAM 131-2 and performs various operations by executing the application programs copied onto the RAM 131-2.

As explained above, the main CPU 132 may generate various types of information and display the same on the transparent display 140 according to the implementation of the application programs stored in the storage 150.

Meanwhile, in another exemplary embodiment, the movement of the user may be sensed so that a proper object may be displayed on an area of the transparent display 140 that corresponds to the position to which user moves.

As explained above, the controller 130 may copy the programs stored at the storage 150 onto the system memory 131 and execute the same to thus perform various operations.

Figure 28:
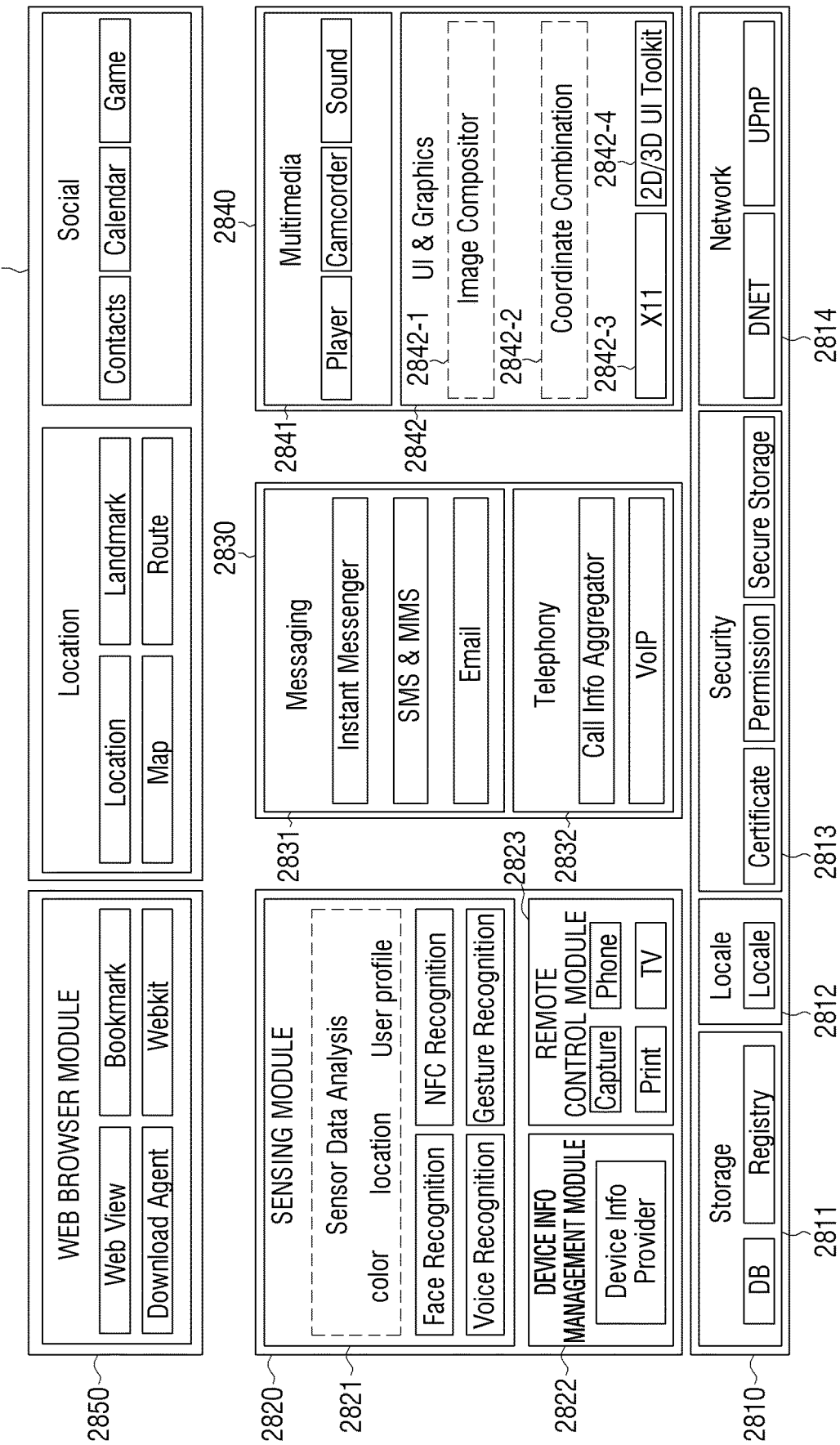
FIG. 28 illustrates software hierarchy for use by a controller.

FIG. 28 is a view provided to explain hierarchy of the software stored at the storage 150. Referring to FIG. 28, the storage 150 may include a base module 2810, a device management module 2820, a communication module 2830, a presentation module 2840, a web browser module 2850, and a service module 2860.

The base module 2810 processes the signals transmitted from the respective hardware included in the transparent display apparatus 100 and transmits the processed signals to the upper layer module.

The base module 2810 may include a storage module 2811, a position-based module 2812, a security module 2813, or a network module 2814.

The storage module 2811 is a program module that manages database DB or registry. The position-based module 2812 is a program module that supports the position-based services in association with the hardware, such as GPS chip. The security module 2813 is a program module that supports certification, permission, or secure storage of the hardware, and the network module 2814 supports networking and may include DNET module or UPnP module.

The device management module 2820 manages external input and information regarding external device. The device management module 2820 may include a sensing module 2821, a device information management module 2822, or a remote control module 2823. The sensing module 2821 analyzes sensor data provided from various sensors including the first and second sensors 110, 120. To be specific, the sensing module 2821 is a program module that performs operation of sensing position of the object, or position, color, shape, size and other profiles of the user. The sensing module 2821 may also include a face recognition module, voice recognition module, motion recognition module, or NFC recognition module. The device information management module 2822 provides information about various devices, and the remote control module 2823 is a program module that performs operation of remote controlling the surrounding devices, such as a telephone, a TV, a printer, a camera, or an air conditioner, etc.

The communication module 2830 is provided for communication with external devices. The communication module 2830 may include a messaging module 2831, such as a messenger program, a short message service (SMS) & multimedia message service (MMS) program, or an e-mail program, or a telephone module 2832 including a call info aggregator program module, or VoIP module.

The presentation module 2840 is provided to construct a display screen. The presentation module 2840 may include a multimedia module 2841 to playback and output multimedia content, and a UI & graphic module 2842 to process UI and graphics. The multimedia module 2841 may include a player module, a camcorder module, or a sound processing module. Accordingly, the multimedia module 2841 operates to playback various multimedia contents to generate screen and sound and play the same. The UI & graphic module 2842 may include an image compositor module 2842-1 which composites images, a coordinate combination module 2842-2 which combines and generates coordinates on the screen on which the image is to be displayed, an X11 module 2842-3 which receives various events from the hardware, or a 2D/3D UI toolkit 2842-4 which provides tools to construct the 2D or 3D UI.

The web browser module 2850 accesses the web server by implementing web browsing. The web browser module 2850 may include various modules including a web view module which construct a web page, a download agent module which performs downloading, a bookmark module, or a Webkit module.

Additionally, the service module 2860 is an application module that provides various services. By way of example, the service module 2860 may include various modules including a navigation service module to provide a map, a current location, a landmark, or route information, or a game module, or an advertisement application module.

The main CPU 132 inside the controller 130 may access the storage 150 via the interface 135 to copy the various modules stored at the storage 150 onto the RAM 131-2 and perform operations according to the operations of the copied modules.

To be specific, the main CPU 132 may detect the position of the object and the position of the user and determine a transmissive area according to the operation of the sensing module 2821. Then by executing the presentation module 2840, the main CPU 132 causes the information to be displayed on the area other than the transmissive area. To be specific, using the coordinate combination module 2842-2, the main CPU 132 may generate coordinates of a new position for information, and display the information on the new position corresponding to the coordinates. Further, the main CPU 132 may change various attributes such as size, color, shape or layout of the information using the image compositor module 2842-1.

The information for display may be multimedia content to be played by the multimedia module 2841, or various UI or graphic image or text generated at the UI & graphic module 2842.

Further, the main CPU 132 may execute the messaging module 2841 to receive a messenger, an SMS message, an MMS message, or an e-mail from a node in communicating status. The received messages may be displayed on the transparent display 140.

Referring to FIGS. 25 and 26, if the transparent display apparatus is implemented on the show window of a store, the main CPU 132 may execute the UI & graphic module 2842 to display various advertisement images or phrases. The advertisement images or phrases may be received via a web server or other network devices. The main CPU 132 may execute the web browser module 2850 to access an external web server via the network interface 139, receive the web page data from the web server, and display the screen according to the web page data. The transparent display apparatus may communicate with the server, and the server may control the transparent display apparatus in conjunction with other transparent display apparatuses to collectively display information.

As explained above, the storage 150 may store various structures of programs therein and the controller 130 may perform operations according to various exemplary embodiments using the programs stored at the storage 150.

Figure 29:
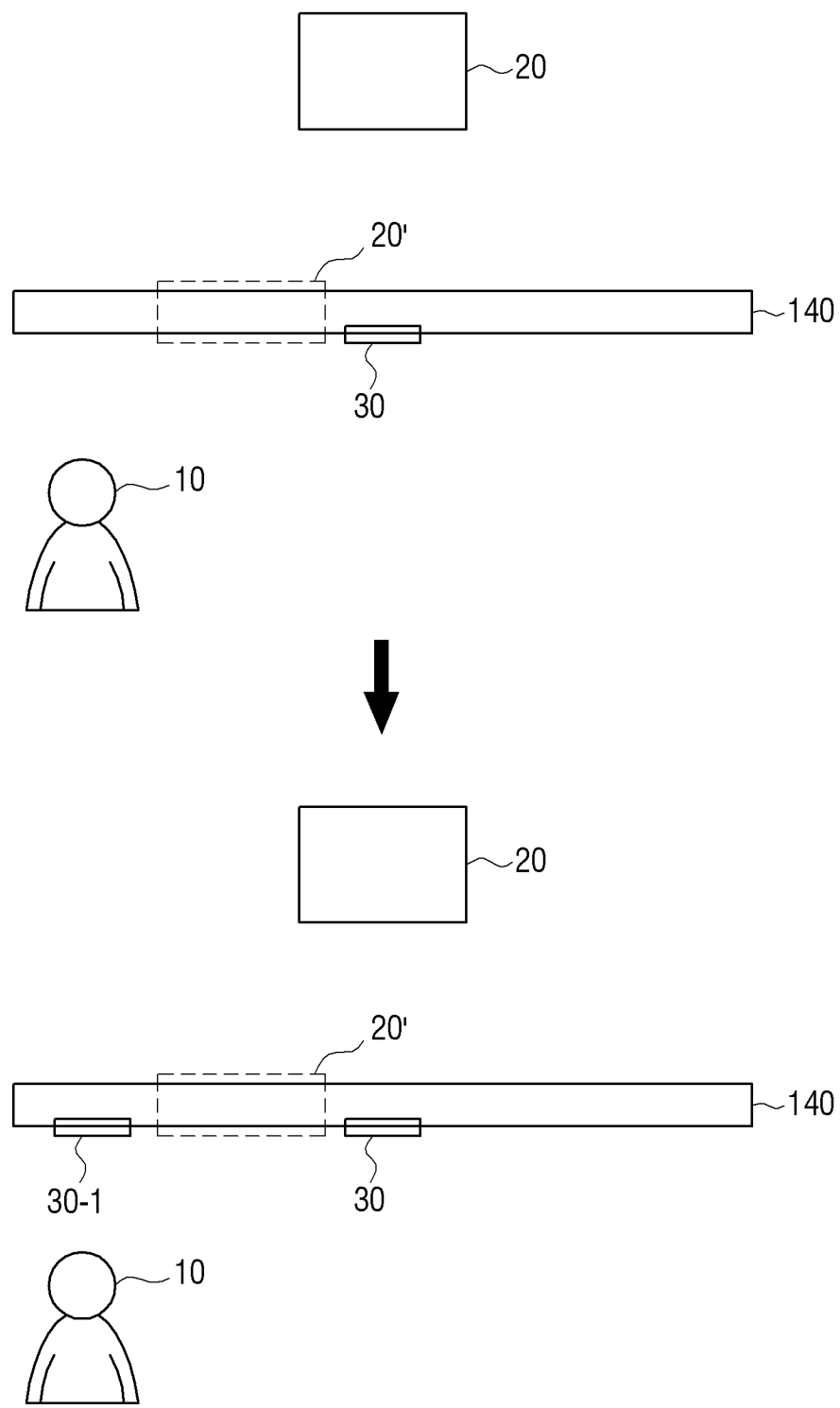
FIG. 29 illustrates displaying a user interface (UI) screen according to movement of a user.

FIG. 29 illustrates displaying a user interface (UI) screen on an area corresponding to the position of the user.

Referring to FIG. 29, if the user moves a certain direction in a state that an object 20 is opposed to the user with the transparent display 140 interposed therebetween, the transmissive area 20' is changed according to the changed position and the information 30 is displayed on an appropriate position considering the changed position.

In this situation, if the transparent display apparatus 100 determines that the user approaches to within a predetermined distance of the transparent display 140, the transparent display apparatus 100 displays a user UI on an area corresponding to the position of the user 10. The user UI may include information about the object 20, information about the environment (e.g., shop) in which the transparent display apparatus 100 is implemented, menus to change the information 30 to other information, or menus to change attributes of displayed information 30. The user 10 may check the information regarding the other products in the inventory of the shop, or contact the store.

Figure 30:
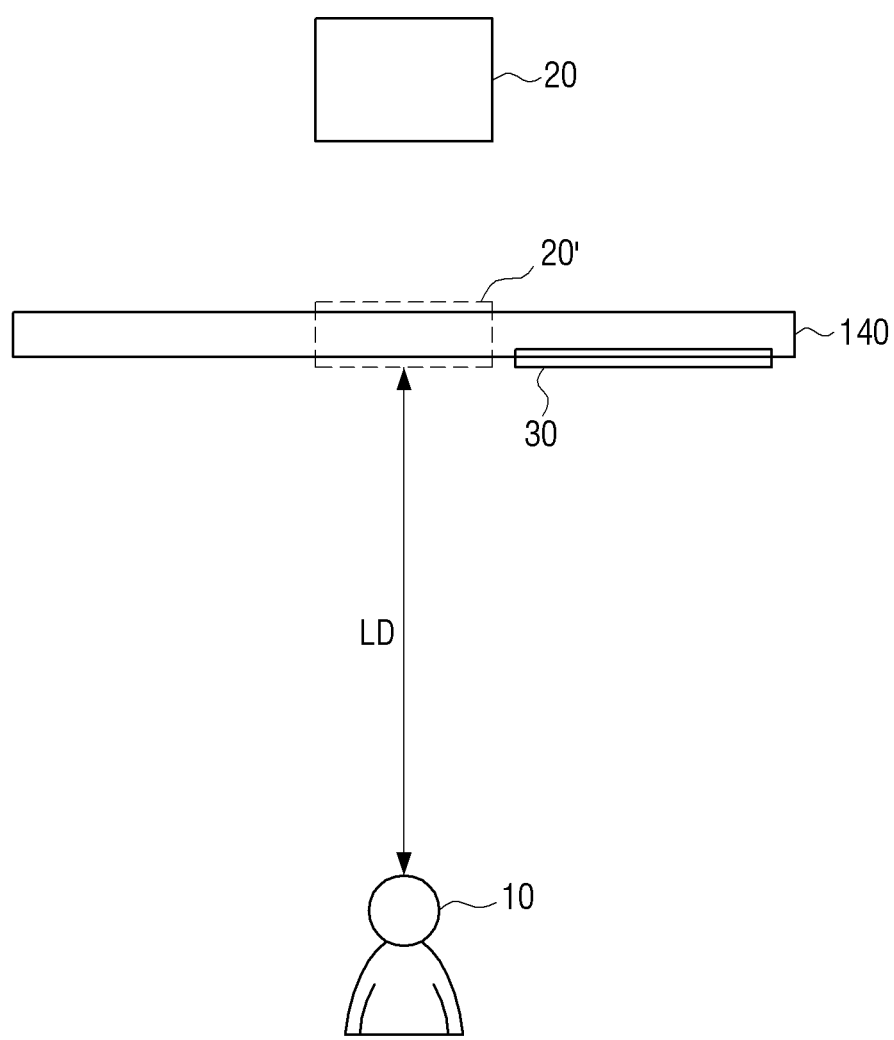
FIGS. 30 and 31 are views illustrating adjusting a size of an information displaying area according to a distance to a user.
Figure 31:
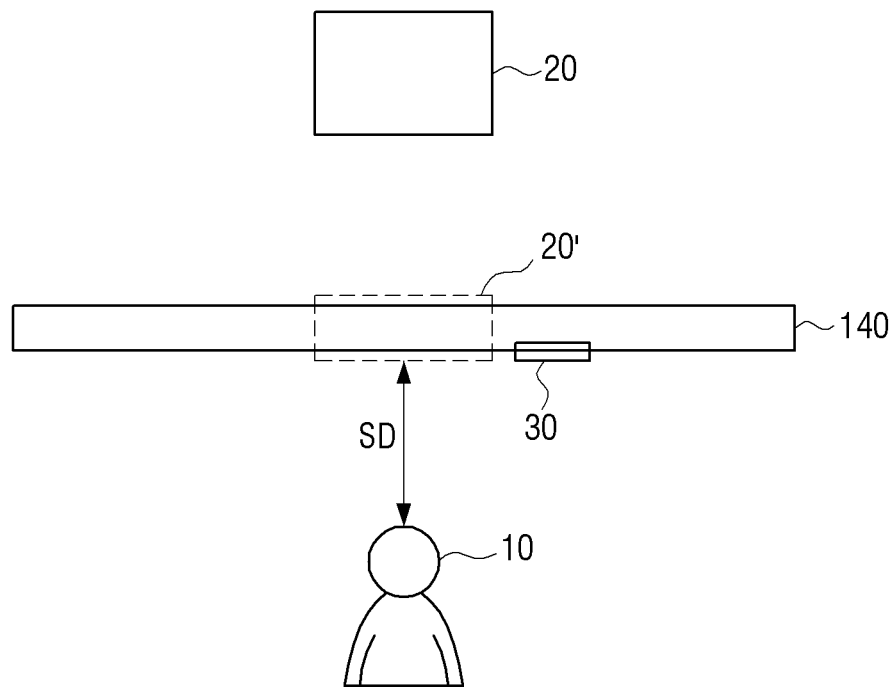

Further, as explained above, the attributes of displayed information may change depending on the position of the user. FIGS. 30 and 31 are views illustrating an exemplary embodiment of adjusting the size of the information displaying area, depending on a distance between the user and the transparent display.

Referring to FIG. 30, if the user is at a distance (LD), the information 30 is displayed on one side of the transmissive area 20' in a relatively large size.

On the contrary, referring to FIG. 31, if the user is at a distance (SD) which is shorter than the distance (LD), the information 30 is displayed in size which is reduced in proportion to the difference.

Accordingly, irrespective of the distance, the user is able to discern the information conveniently.

Figure 32:
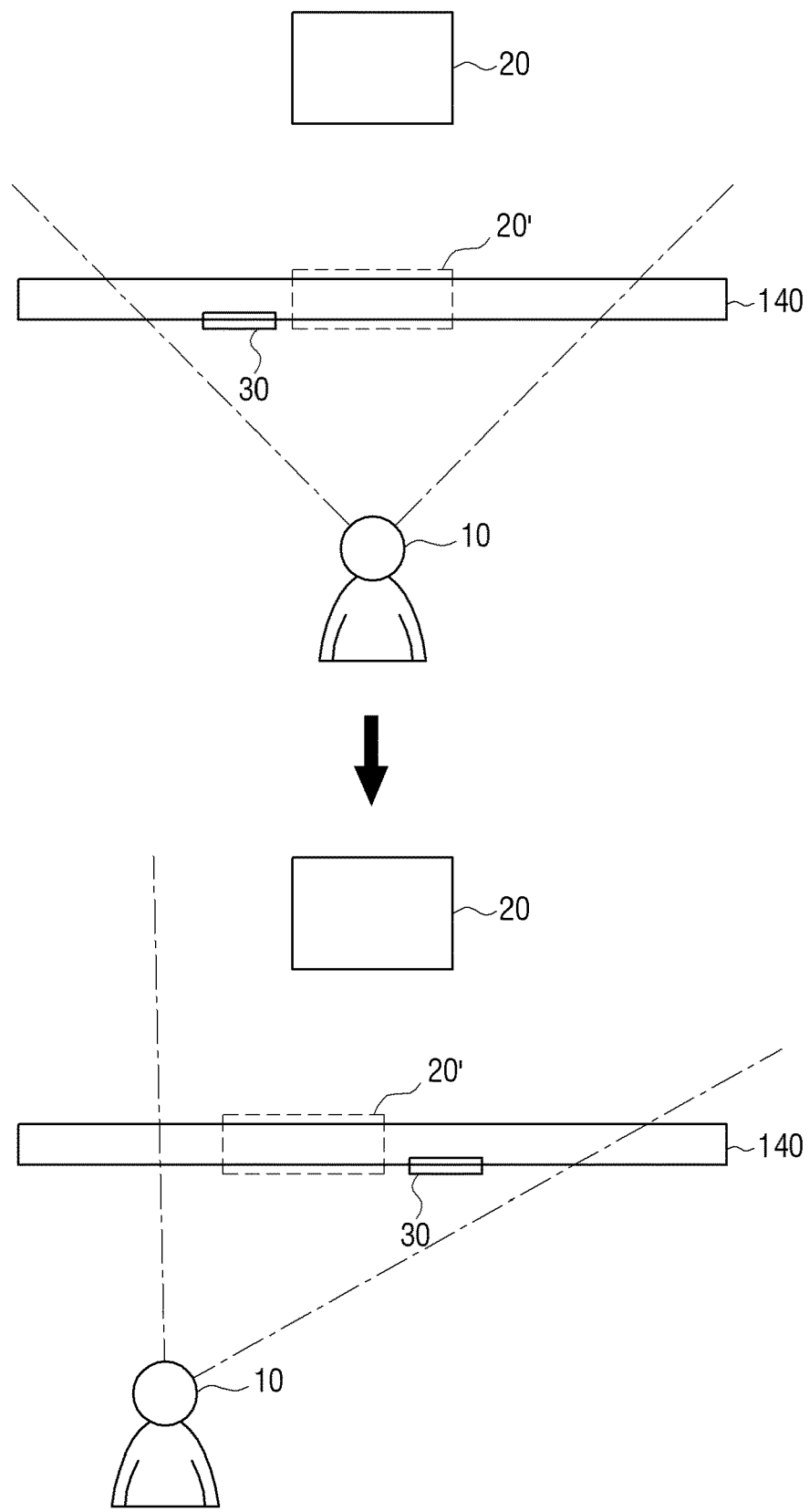
FIG. 32 is a view provided to explain a method for changing position of an information displaying area according to a change in a user's field of vision.

FIG. 32 illustrates a method for adjusting position of displayed information 30 according to field of vision of the user.

Referring to FIG. 32, if the user looks at the object 20 from the front direction of the transparent display apparatus 100, the transmissive area 20' is formed on the front, and the information 30 displayed on a side.

Then, if the user moves in the leftward direction so that the user's field of vision changes, the transparent display apparatus 100 displays the information 30 by avoiding the transmissive area 20' within the user's field of vision.

The field of vision may be calculated by photographing a user and tracking a direction of the user's face or gaze. Further, the field of vision may also be calculated based on a line that connects the position of the user to the position of the object 20, such as a line of sight, within a range of sight of an ordinary person at the position of the user.

Meanwhile, if there are a plurality of objects, information may be adaptively displayed only for the object corresponding to the position of the user.

Further, if there are plurality of information to be displayed, the respective information may be taken into consideration to the display area corresponding to the position of the user.

Meanwhile, as explained above, it is possible to change the attributes of displayed information as well as the position of displayed information. If the result of evaluating a previous status with a current status indicates that the environment is same, the attributes of displayed information may be maintained, while the position is simply moved. If an object or a user moves without any change in the user or the object, since the transmissive area changes according to the changed position, the same attribute information is displayed on the other area away from the changed transmissive area.

On the contrary, if the space to avoid the transmissive area is not enough due to relatively large size of the transmissive area, only the color of the information may be changed to a color distinguishing from the object. Alternatively, if the color of the object is similar to that of the information so that visibility deterioration is likely even after moving the position of the displayed information, the position of the displayed information may be changed and at the same time, the color of the information may be changed. Alternatively, the information of the object closest to the user and the information displayed closest to the user or the information displayed at an area that meets the gaze of the user, due to the movement of the position, may be displayed in the changed color.

The thickness may be changed in the manner similar as the color. For example, information on the object at a remote distance from the user or the information displayed on a remote display area may be displayed in thick line, while the information displayed at a near distance may be displayed in a thin line. Or, the information displayed at an area that meets the user's gaze may be displayed in thick line. However, the above examples may change depending on the settings. For example, the information at a remote distance from the user may be set to be displayed with thin thickness.

The same applies to the size. That is, the size of the information may be adaptively set if the information is about an object remotely placed from the user, if the information is displayed remotely from the user, or if the distance between the user and the transparent is near or far.

Various other attributes such as language or font may also be set differently, in addition to the color, size or thickness explained above.

Although the attributes may vary depending on the positions of the user and the object or the display environment, in an alternative exemplary embodiments, the information may also be differently set according to information about the user obtained by a short-range wireless communication or other communications.

That is, if user information is provided by short-range wireless communication, the thickness, color, size, language or font of the information may be adjusted based on the user information, and even the type or level of the information may also be differently displayed. For example, certain information may be displayed in greater thickness and size.

Figure 33:
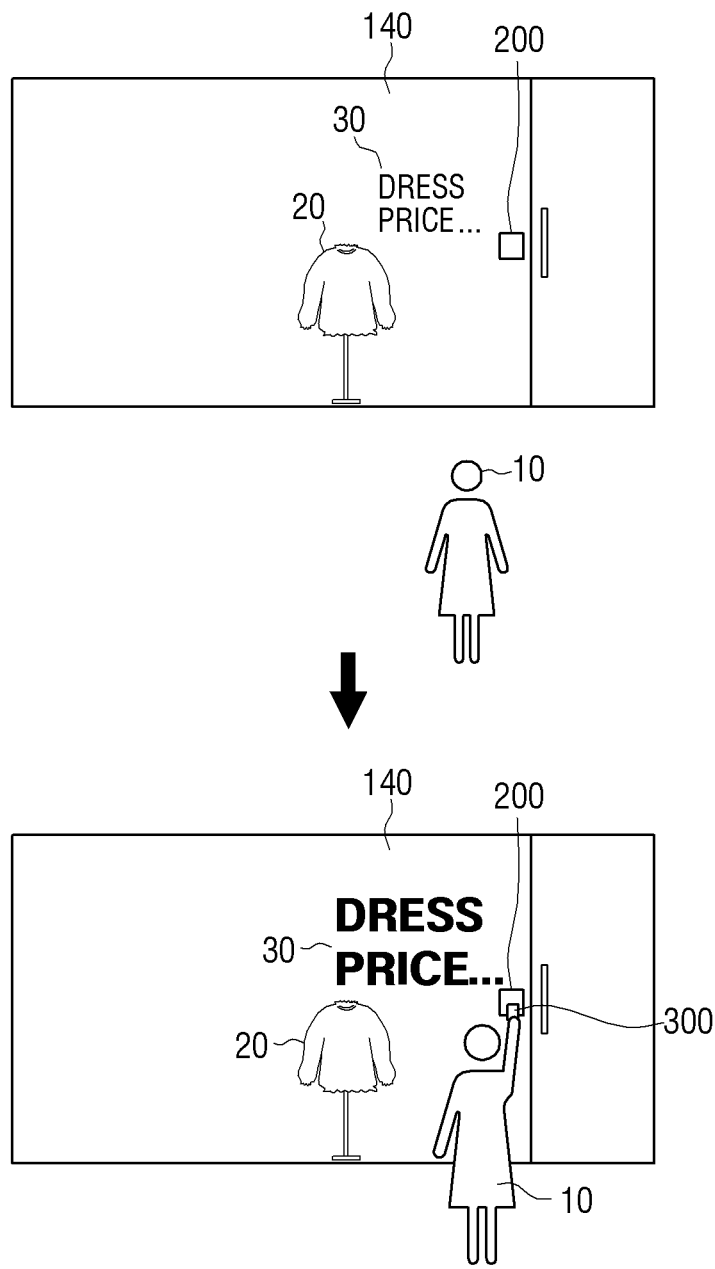
FIG. 33 is a view provided to explain a method for changing attributes of displayed information based on user information.

FIG. 33 illustrates an embodiment of changing the attributes of displayed information according to the user information provided by short-range wireless communication.

Referring to FIG. 33, even if the user 10 is an aged person or a foreigner, the information 30 is first displayed at an appropriate position considering the position of the user 10 and the position of the object 20. Then if the user tags his own user terminal 300 to the NFC module 200, the NFC module 200 receives the user information. The user information may include name, gender, age or nationality of the user.

The transparent display apparatus 100, if receiving the user information, determines the attributes that suit the user information.

FIG. 33 illustrates an example in which an aged woman tags. The transparent display apparatus 100 displays the information having increased thickness and size than the originally displayed form. Accordingly, even an aged person with poor eyesight can easily perceive the information 30.

If the user is a foreigner, the information may be displayed in various language including English, Japanese, French, or Chinese depending on the nationality of the user.

Beside the attributes of displayed information, the content and level of the information may be differently changed. For example, if a housewife in her 40's tags, information that may intrigue housewives in their 40's may be displayed, or if a student in his 10's tags, information may not be displayed if this is related to content targeted on adults.

Further, although the user information was received using NFC and the information is changed appropriately in the exemplary embodiment illustrated in FIG. 33, other wireless communication methods including WiFi, Blutooth, Zigbee may also be used. Alternatively, the user may be enabled to directly input the user's own information via a terminal provided on the transparent display 140.

Alternatively, instead of using wireless communication, the transparent display apparatus 100 may determine the user characteristics by directly photographing the user image and analyzing the photographed image.

Figure 34:
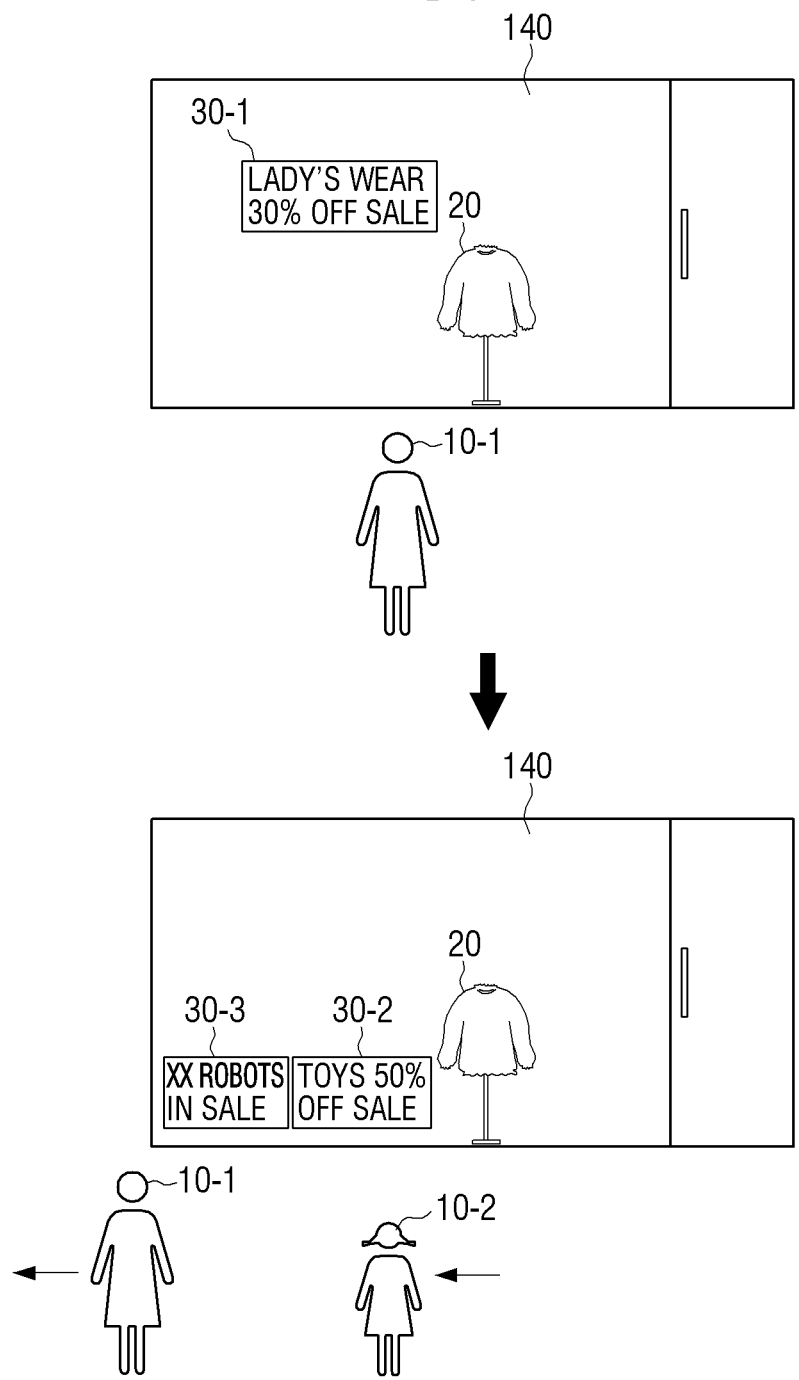
FIG. 34 is a view provided to explain a method for changing content of information according to user information.

FIG. 34 illustrates an embodiment of determining characteristics of the user by photographing the user and changing information display status according to the characteristics.

Referring to FIG. 34, if the first user 10-1 stands in front of the transparent display 140, the image of the first user 10-1 is acquired by photographing. The transparent display apparatus 100 determines if the user is an adult or a child by analyzing the acquired image. To be specific, using a vertical length of the acquired image, a vertical length of the area corresponding to the first user 10-1 on the image, and a distance between the transparent display 140 and the first user 10-1, the height of the first user 10-1 may be proportionally calculated. Accordingly, if the calculated height exceeds a threshold, the first user 10-1 is considered to be an adult.

If the first user 10-1 is determined to be an adult, the transparent display apparatus 100 displays the information 30-1 prepared for the adults at a level of eyes of the adult 10-1.

Then if the first user 10-1 exits the range of photography and the second user 10-2 enters the range of photography, the image of the second user 10-2 is acquired by photographing and it is again determined whether the second user 10-2 is an adult or a child by analyzing the acquired image. Accordingly, if the second user 10-2 is determined to be a child, the previous information 30-1 is deleted and information 30-2, 30-3 prepared for children is displayed at the eye levels of the children.

As a result, various information in sufficient visibility can be adaptively provided to the user.

In various exemplary embodiments explained above, the information is displayed in box-like form. However, this is written for convenience of explanation, and other examples are possible. For example, the information may be displayed as text only. Alternatively, the background color of the area of displaying information may be processed to be non-transparent, to clearly distinguish the information from the background image.

Meanwhile, the methods according to various exemplary embodiments explained above may be implemented in almost all types of devices that are capable of transparent display. For example, the methods may be implemented in various devices including window, head up display (HUD) system, a helmet mount display (MHD) system, a laptop computer, a PC monitor, a TV, a PDA, an electronic frame, a tablet PC or a camera etc.

Figure 35:
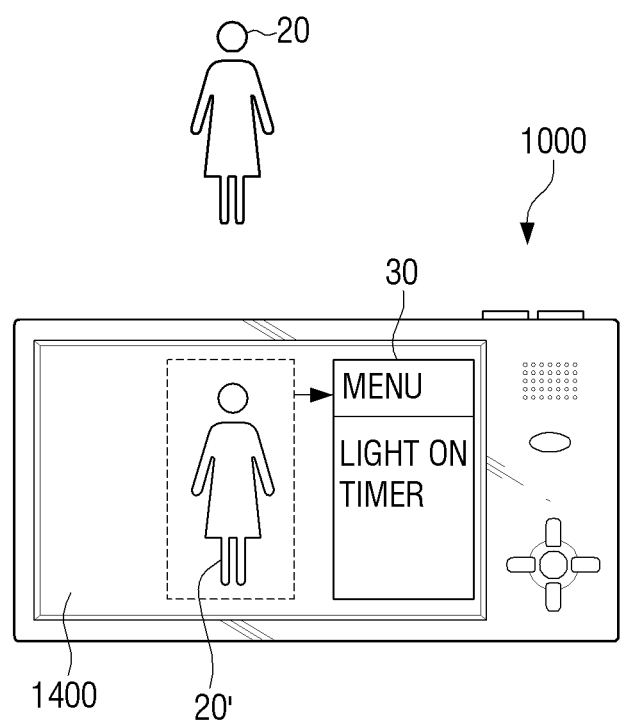
FIG. 35 is a view provided to explain an operation of a transparent display apparatus implemented in a camera.

FIG. 35 illustrates a transparent display apparatus implemented in a camera. Referring to FIG. 35, the camera 1000 may include a transparent display 1400. The transparent display 1400 may be equipped as a substitute at a location of a general display unit that displays a live view in a conventional camera device. Accordingly, instead of watching live view captured at a photographing device, such as a charge coupled device (CCD), the user is able to photograph while viewing the actual foreground in front of the camera transparently viewed through the transparent display 140.

In one exemplary embodiment, the transparent display 1400 may detect the position of the object 20 placed in the foreground, using a photographing device which is facing forward. The camera 1000 may detect a distance between the object and the camera 1000 using a depth camera or a distance sensor. The camera 1000 may determine transmissive area through which the object is viewed, based on the sensed distance and position of the object. In an embodiment that employs the camera 1000, the transmissive area may also be determined without requiring an operation of sensing the position of the user, i.e., by using statistical distance or angle between the user and the camera 1000 that the user of the camera 1000 may be positioned with reference to the camera 1000. Further, by sensing the position and/or gaze of the user who intends to use the camera 1000, it is possible to estimate the object 20 corresponding to the user's gaze, the position of the corresponding object 20 and/or the transmissive area of the object 200. Accordingly, the transmissive area on the transparent display 1400, through which the object is viewed, may be determined based on the position of the user, the gaze of the user, the position of the corresponding object 20 and/or the identifying area of the object 20.

If the transmissive area 20' is determined, the camera 1000 displays the information 30 on an area other than the transmissive area 20' on the transparent display 1400. Although FIG. 35 illustrates a situation in which the information 30 regarding the selectable menus are displayed, alternatively, other various information, such as camera 1000 battery power, operation mode or memory capacity, may also be displayed, and the information may be displayed on areas other than the transmissive area 20' to increase visibility.

As explained above, the transparent display apparatus 1000 may be implemented as a camera.

Meanwhile, in some exemplary embodiments, a plurality of photographing units or a rotatable photographing unit may be used to ensure that the transmissive area is accurately determined according to the movement of the user. However, alternative embodiments may be possible. For example, the photographing unit may be so designed as to move according to the movement of the user.

Figure 36:
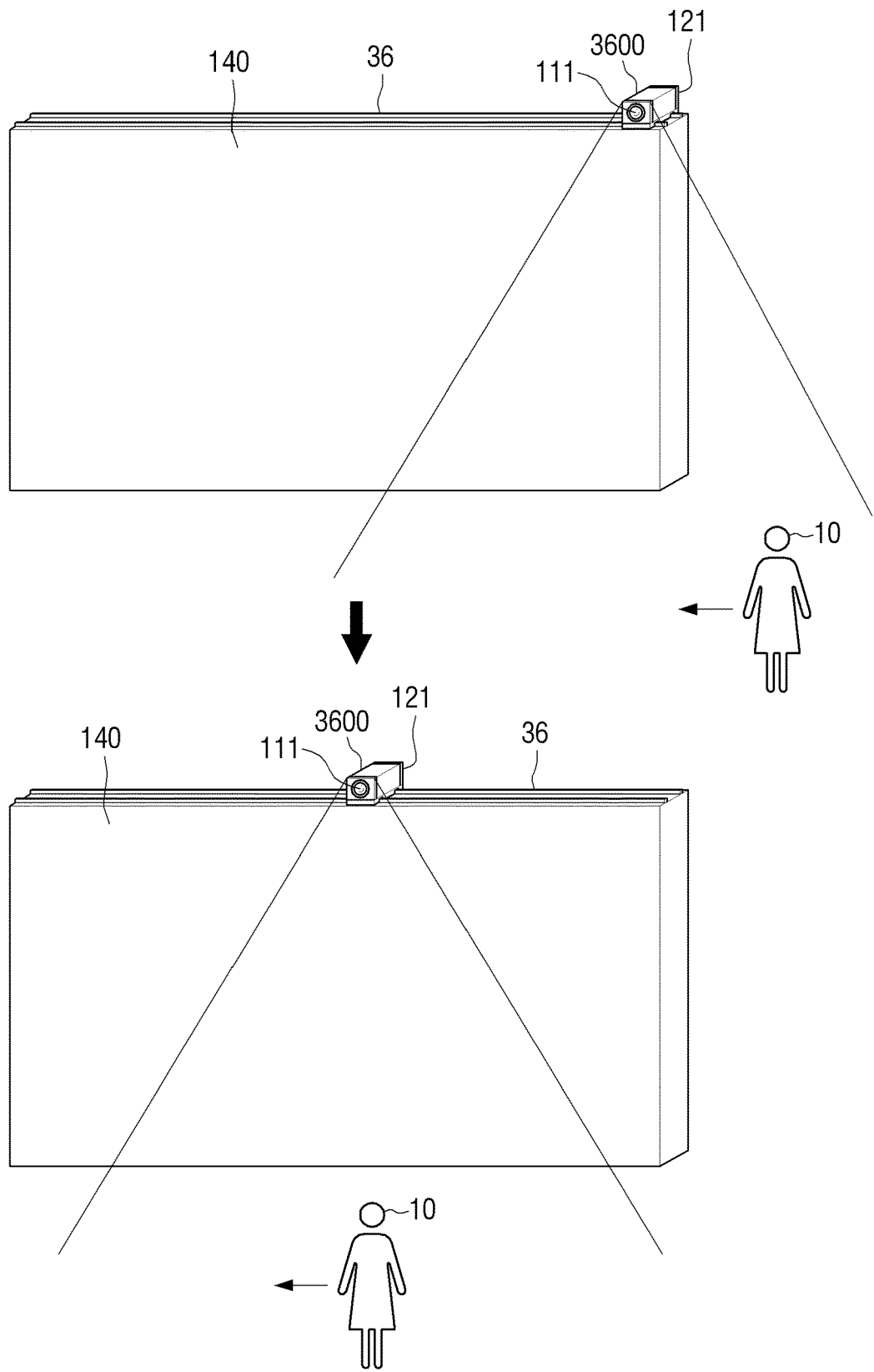
FIG. 36 illustrates a transparent display apparatus according to an exemplary embodiment.

FIG. 36 illustrates a transparent display apparatus according to an exemplary embodiment. Referring to FIG. 36, the transparent display apparatus 1000 may include a rail 36 and a movable body 3600 movable along the rail 36.

The first and second photographing units 111, 121 may be attached to the movable body 3600 while facing the directions opposite each other. The movable body 3600 moves according to the user's position.

In a standby mode in which there is no user present, the movable body 3600 may stand by in a fixed position at a center or at one end of the transparent display 140.

Taking an example of when the movable body 3600 is at the center of the transparent display 140 in standby mode, the controller 130 determines the position of the user within an image, if initially sensing the user in the image photographed at the second photographing unit 121. If determining the position of the user, the controller 130 continuously performs photographing while moving the movable body 3600 in the direction at which the user is positioned with reference to the center of the image. If the image of the user at the center is acquired as a result, from then on, the controller 130 moves the movable body 3600 according to the direction in which the user is moving and the speed of such movement. Since the first and second photographing units 111, 121 are attached to the movable body 3600, respectively, the range of photography of the first photographing unit 110 changes according to the movement of the movable body 3600. Accordingly, the identifying area of the object as sensed from the image captured through the first photographing unit 110 is in agreement with the transmissive area as perceived at the eyes of the user.

Alternatively, referring to FIG. 36, if the user enters the range of photographing in a state that the movable body 3600 is standing by on one end, the controller 130 keeps the movable body 3600 in the standby mode until an image of the user at the center is acquired. In this situation, motion vectors are calculated based on the comparison with the position of the user in the consecutively photographed images. If the image of the user 10 at the center is acquired, the controller 130 moves the movable body 3600 according to the motion vectors. Accordingly, the identifying area of the object as sensed in the photographed image of the first photographing unit 110 is in agreement with the transmissive area as perceived by the user's eyes.

Additionally, the movable body 3600 may stand by at a position to which the movable body 3600 moves, when the user moves away backward, instead of passing by to the right or left. Alternatively, the movable body 3600 may stand by and reciprocate to the left and right periodically to detect the presence of a user. The movable body 3600 may perceive an object entering within the user's field of vision upon sensing the presence of the user, thus determining a corresponding transmissive area and display information accordingly.

As explained above, in various exemplary embodiments, information can be more efficiently delivered in consideration of the position of the user and the position of the object.

Meanwhile, the methods according to various exemplary embodiments may be programmed and stored at various storage media. Accordingly, the methods according to various exemplary embodiments may be implemented on a variety of types of electronic apparatus which execute the storage media.

To be specific, in an exemplary embodiment, a non-transitory computer readable medium storing therein a program may be provided, in which the program performs, in sequence, sensing positions of an object and a user, respectively, estimating a transmissive area based on the sensed positions, and moving a position of displaying information included in the estimated transmissive area.

The non-transitory computer readable medium may semi-permanently store data and may be read by a device. That is, the above-mentioned various applications or programs may be stored and provided on a non-transitory computer readable medium such as a CD, a DVD, a hard disk, a Blu-ray disk, a USB, a memory card, or a ROM.

Further, the foregoing exemplary embodiments and advantages are merely exemplary and are not to be construed as limiting. The present teaching can be readily applied to other types of apparatuses. Also, the description of the exemplary embodiments of the present inventive concept is intended to be illustrative, and not to limit the scope of the claims.

What is claimed is:

1. A transparent display apparatus comprising:
 a transparent display;
 a first camera configured to obtain image data by photographing a front direction of the transparent display and a second camera configured to obtain image data by photographing a rear direction of the transparent display; and
 a controller configured to:
 control the transparent display to display information on an object sensed through image data obtained by the second camera,
 based on a changing of a position of a user being sensed through image data obtained by the first camera, control the second camera to change a photographing direction based on the position of the user, and
 based on at least one object being sensed through image data obtained by the second camera corresponding to the changed photographing direction, control the transparent display to display information on the at least one object sensed through the changed photographing direction on a partial region of the transparent display, the partial region being determined based on the position of the user and a position of the at least one object sensed through the changed photographing direction.

2. The transparent display apparatus of claim 1, wherein the position of the at least one object sensed through the changed photographing direction is a position relative to a position of the transparent display apparatus, and the position of the user is a position relative to the position of the transparent display apparatus.

3. The transparent display apparatus of claim 1, wherein the controller is further configured to identify a line of sight between the user and the at least one object sensed through the changed photographing direction based on the position of the user and the position of the at least one object sensed through the changed photographing direction.

4. The transparent display apparatus of claim 3, wherein the controller is further configured to:
 determine a first area of the transparent display based on the line of sight, and
 control the transparent display to display the information on the at least one object sensed through the changed photographing direction on a second area of the transparent display which does not overlap with the first area.

5. The transparent display apparatus of claim 1, wherein the controller is further configured to display the information in a first color that is different from a second color of the at least one object sensed through the changed photographing direction.

6. The transparent display apparatus of claim 1, wherein the transparent display apparatus is interposed between the object and the user.

7. The transparent display apparatus of claim 1, wherein the controller is further configured to adjust an attribute of the information according to the position of the user.

8. The transparent display apparatus of claim 7, wherein the attribute is color, and the controller is further configured to display the information in a first color that is different from a second color of the at least one object sensed through the changed photographing direction.

9. The transparent display apparatus of claim 7, wherein the attribute is at least one of size, color, font, opacity, thickness, and a background color.

10. A method of displaying information of a transparent display apparatus, the method comprising:
   sensing a position of a user;
   displaying information on an object sensed through image data obtained by a camera on a transparent display;
   based on the position of the user being changed, changing a photographing direction of the camera based on the position of the user; and
   based on at least one object being sensed through image data obtained by the camera corresponding to the changed photographing direction, displaying information on the at least one object sensed through the changed photographing direction on a partial region of the transparent display, the partial region being determined based on the position of the user and a position of the at least one object sensed through the changed photographing direction.

11. The method of claim 10, wherein the position of the at least one object sensed through the changed photographing direction is a position relative to a position of the transparent display apparatus, and the position of the user is a position relative to the position of the transparent display apparatus.

12. The method of claim 10, wherein the sensing the position of the object and the position of the user comprises photographing the object and the user, sensing the position of the object based on a photograph of the object, and sensing the position of the user based on a photograph of the user.

13. The method of claim 10, further comprising:
   identifying a line of sight between the user and the at least one object sensed through the changed photographing direction based on the position of the user and the position of the at least one object sensed through the changed photographing direction.

14. The method of claim 13, wherein the displaying the information on the at least one object sensed through the changed photographing direction comprises:
   determining a first area of the transparent display based on the line of sight, and
   displaying the information on a second area of the transparent display which does not overlap with the first area.

15. The method of claim 10, wherein the displaying the information on the at least one object sensed through the changed photographing direction comprises displaying the information in a first color that is different from a second color of the at least one object sensed through the changed photographing direction.

16. The method of claim 10, wherein the transparent display apparatus is interposed between the object and the user.

17. The method of claim 10, further comprising:
   adjusting an attribute of the information on the at least one object sensed through the changed photographing direction according to the position of the user.

18. The method of claim 17, wherein the attribute is color, and the method further comprises:
   displaying the information in a first color that is different from a second color of the at least one object sensed through the changed photographing direction.

19. The method of claim 17, wherein the attribute is at least one of size, color, font, opacity, thickness, and a background color.

* * * * *